US011138857B2

(12) United States Patent
Krishnakumar et al.

(10) Patent No.: US 11,138,857 B2
(45) Date of Patent: Oct. 5, 2021

(54) SENSOR SYSTEMS AND METHODS FOR PREVENTING FALLS

(71) Applicants: Siddharth Krishnakumar, Pearland, TX (US); Srikanth Balasubramanian, Navi Mumbai (IN)

(72) Inventors: Siddharth Krishnakumar, Pearland, TX (US); Srikanth Balasubramanian, Navi Mumbai (IN)

(*) Notice: Subject to any disclaimer, the term of this patent is extended or adjusted under 35 U.S.C. 154(b) by 0 days.

(21) Appl. No.: 16/587,697

(22) Filed: Sep. 30, 2019

(65) Prior Publication Data
US 2021/0097840 A1    Apr. 1, 2021

(51) Int. Cl.
G08B 21/04 (2006.01)
H04W 4/38 (2018.01)
G08B 7/06 (2006.01)
H04W 84/04 (2009.01)
H04W 84/12 (2009.01)
H04W 4/80 (2018.01)

(52) U.S. Cl.
CPC ............ *G08B 21/0446* (2013.01); *G08B 7/06* (2013.01); *G08B 21/043* (2013.01); *H04W 4/38* (2018.02); *H04W 4/80* (2018.02); *H04W 84/042* (2013.01); *H04W 84/12* (2013.01)

(58) Field of Classification Search
CPC .... G08B 21/0446; G08B 21/043; G08B 7/06; H04W 4/38; H04W 4/80; H04W 84/042; H04W 84/12
See application file for complete search history.

(56) References Cited

U.S. PATENT DOCUMENTS

| | | | |
|---|---|---|---|
| 7,733,224 B2* | 6/2010 | Tran | A61B 5/0077 340/540 |
| 2005/0067816 A1* | 3/2005 | Buckman | A61B 5/6804 280/730.1 |
| 2006/0001545 A1* | 1/2006 | Wolf | G08B 21/0461 340/573.1 |
| 2006/0017579 A1* | 1/2006 | Albert | G08B 21/0461 340/628 |
| 2006/0049950 A1* | 3/2006 | Lockhart | A61B 5/1117 340/573.1 |
| 2013/0312168 A1* | 11/2013 | Raanan | A61B 5/1117 2/465 |
| 2018/0000385 A1* | 1/2018 | Heaton | G08B 29/186 |
| 2019/0110683 A1* | 4/2019 | Kim | A61B 5/021 |
| 2020/0276462 A1* | 9/2020 | Bornack | A62B 35/0093 |

* cited by examiner

*Primary Examiner* — Ryan W Sherwin
(74) *Attorney, Agent, or Firm* — Kay & Bee Intellectual Property Associates LLC

(57) ABSTRACT

Described here is a portable sensor for detecting a loss of balance consisting of an accelerometer, a gyroscope, an alerting signal module and a smart device in communication with a microcontroller. Also described is a wearable postural sensor for protecting a user from a fall-related injury consisting of a microcontroller, an integrated motion processing module, an alerting signal module, a smart device and an optional safety device such as an air bag. Also described is a method for preventing a fall and a fall-related injury by monitoring realtime changes in the rotation angle, planar rotation or sway velocity of the postural sensor.

22 Claims, 21 Drawing Sheets

SENSOR SYSTEMS AND METHODS FOR PREVENTING FALLS

BACKGROUND OF THE INVENTION

Field of the Invention

The present invention is in the field of balance assistive systems. More specifically, the present invention is directed to a portable balance sensors for protecting a user from a fall-related bodily injury.

Description of the Related Art

The ability of an individual to maintain balance is controlled by biomechanical factors controlled and coordinated by the brain through sensory feedback from the vestibular system, the ocular system, proprioceptors in the skeletal muscles, tendons and joints and graviceptors in the trunk. Balance maintenance is a complex process that requires integrating sensory information about the position of the body and limbs in relation to the surroundings and generating appropriate motor responses to control movement, Impairment of balance control leads to an increased risk for falls and fall-related injuries, which can be debilitating for the individual.

Falls are the leading cause of injures for people of any age, but particularly for the elderly. The risk of falls is high in individuals suffering from visual impairments, neuropathy, cardiac arrhythmias, orthostatic hypotension, neurodegenerative diseases like Parkinson's disease, and cognitive impairment from dementia and Alzheimer's disease. Among workplace related balance impairments, astronauts returning from a space mission to normal gravity display poor balance control, leading to dizziness, difficulty walking and turning corners. The duration of these impairments increases with the length of their space mission.

Advances in geriatric medicine and availability of geriatric mobility devices have increased independence among the elderly. These benefits have however been countered by an increased risk among seniors to fall-related injuries, particularly hip and upper body fractures that increase morbidity and mortality. Falls result in more than 2.8 million injuries annually, including over 800,000 hospitalizations and an excess of 27,000 deaths. The cost of managing fall-related injuries in older adults was reported at about $38 billion in 2015 and is expected to reach $67.7 billion by 2020.

Current methods for monitoring postural stability include force plate sensors and 3-dimensional motion capture. While reliable and accurate, these methods have limited practical application due to lack of portability and the need for trained operators. On the other hand, continuous monitoring using portable sensors like iPads and Tablets with embedded motion sensors while feasible in theory are inconvenient to carry. Other portable sensors for detecting posture include the Smart Slippers, which sense pressure and movement by the wearer; and the senior mobility monitor, which evaluates quantitative information on frequency, duration and type of mobility activities and qualitative information on balance function and muscle power. These devices do not restore user independence but are rather configured to alert care givers or provide trend analysis of potential fall risks to help tailor exercises for the user. Thus, currently available postural sensing technologies are limited in utility and require third party monitoring thereby restricting mobility and independence for individuals suffering from postural dysfunction.

Overall there is a deficiency in the art for improved postural detection systems and methods that could detect falls and reduce the risk of fall-related injuries without restricting user independence or requiring round-the clock monitoring by trained professionals. The present invention fulfills this longstanding need and desire in the art.

SUMMARY OF THE INVENTION

The present invention is directed to a portable sensor for alerting a user about a loss of balance. The sensor comprises a detection module comprising an acceleration sensor and an angular velocity sensor, at least one alerting signal module, a microcontroller board in electrical communication with the detection module and alerting signal module, a power source and an enclosure disposed around the detection module, the microcontroller board and the power source. The microcontroller board comprises a microcontroller, at least one non-volatile memory, at least one volatile memory and a library of algorithms tangibly stored in the non-volatile memory. The algorithms comprise microcontroller-executable instructions for detecting the loss of balance and for alerting the user about the loss of balance. The present invention is also directed to a related sensor further comprising a smart device display in wireless communication with the microcontroller board The present invention is further directed to a related sensor comprising at least one personal safety device disposed outside the enclosure in communication with the microcontroller board.

The present invention is also directed to a wearable postural sensor for protecting a user from a fall-related injury. The sensor comprises a microcontroller board, an integrated motion processing module, a wireless communication module in electrical communication with the microcontroller board, at least one alerting signal module in electrical communication with the microcontroller board, a power source and an enclosure disposed around the microcontroller board, the integrated motion processing module the wireless communication module and the power source. The microcontroller board comprises a microcontroller, at least one non-volatile memory, at least one volatile memory and a library of algorithms tangibly stored in the non-volatile memory and executable by the microcontroller. The algorithms comprise microcontroller-executable instructions for detecting a fall and for protecting a user from a fall-related injury. The integrated motion processing module comprises a micro-electromechanical triple-axis accelerometer and a micro-electromechanical triple-axis gyroscope in electrical communication with the microcontroller board. The enclosure is provided with fasteners on an outer surface to removably secure the portable sensor on the user's body. The present invention is also directed to a related wearable postural sensor further comprising a display in communication with the microcontroller board. The present invention is further directed to a related wearable postural sensor comprising at least one personal safety device disposed outside the enclosure, in communication with the microcontroller board.

The present invention is further directed to a method for preventing a fall and a fall-related injury. The method comprises the steps of removably securing the wearable postural sensor described above to a user, switching on the power source, selecting a threshold value for detecting a change in spatio-temporal parameter for the sensor; calculating a change in the spatio-temporal parameter for the sensor, actuating at least one of the alerting signal modules when the change in the spatio-temporal parameter for the sensor is greater than the threshold value, thereby alerting the user, thereby preventing the fall and the fall-related injury and repeating the calculating and actuating steps. The present invention is further directed to a related method comprising, simultaneously actuating at least one personal safety device.

Other and further aspects, features, benefits, and advantages of the present invention will be apparent from the following description of the presently preferred embodiments of the invention given for the purpose of disclosure.

BRIEF DESCRIPTION OF THE DRAWINGS

FIG. 3A is a top view of the enclosure with a top and front panel removed showing a microcontroller board, an integrated motion processing module, an auditory alerting signal module and a battery. FIG. 3B is a top view of an enclosure within which the elements of the wearable postural sensor is encompassed, showing a power switch a micro-USB communications port on a front panel and an auditory alerting signal module on a left side panel. FIG. 3C is a bottom side up view of the wearable postural sensor showing a hook-and-loop fastener with the hook portion attached to the bottom side and the loop portion detached.

FIG. 4A shows the wearable postural sensor removably attached to a right wrist of the user. FIG. 4B shows the wearable postural sensor removably attached to a lower leg of the user. FIG. 4C shows the wearable postural sensor removably attached around a waist of the user below the navel.

FIG. 7A shows a flow chart for selecting a user-specific threshold value. FIG. 7B shows a general flow chart for monitoring changes in spatio-temporal parameters for the wearable postural sensor and the subsequent action steps. FIG. 7C is a representative flow chart showing how measurements of spatio-temporal parameters are used to monitor falls. FIG. 7D is a representative flow chart showing how measurements of spatio-temporal parameters made at successive time intervals are used to monitor falls.

FIG. 8A shows a X-component of normalized acceleration (Ax). FIG. 8B shows a Y-component of normalized acceleration (Ay). FIG. 8C shows a Z-component of normalized acceleration (Az). FIG. 8D shows the X-component of normalized angular velocity (Gx). FIG. 8E shows the Y-component of normalized angular velocity (Gy). FIG. 8F shows the Z-component of normalized angular velocity (Gz). FIG. 8G shows the angle (Px) between the resultant acceleration vector and the X-component of this vector. FIG. 8H shows the angle (Py) between the resultant acceleration vector and the Y-component of this vector. FIG. 8I shows the angle (Pz) between the resultant acceleration vector and the Z-component of this vector. FIG. 8J shows the rotation (RAx) of the YZ plane of the wearable postural sensor about the X-axis. FIG. 8K shows the rotation (RAy) of the XZ plane of the wearable postural sensor about the Y-axis. FIG. 8L shows the rotation (RAz) of the XY plane of the wearable postural sensor about the Z-axis.

FIG. 9A shows a X-component of normalized acceleration (Ax). FIG. 9B shows a Y-component of normalized acceleration (Ay), FIG. 9C shows a Z-component of normalized acceleration (Az) FIG. 9D shows the X-component of normalized angular velocity (Gx). FIG. 9E shows the Y-component of normalized angular velocity (Gy). FIG. 9F shows the Z-component of normalized angular velocity (Gz). FIG. 9G shows the angle (Px) between the resultant acceleration vector and the X-component of this vector, FIG. 9H shows the angle (Py) between the resultant acceleration vector and the Y-component of this vector. FIG. 9I shows the angle (Pz) between the resultant acceleration vector and the Z-component of this vector. FIG. 9J shows the rotation of the YZ plane of the wearable postural sensor about the X-axis. FIG. 9K shows the rotation of the XZ plane of the wearable postural sensor about the Y-axis. FIG. 9L shows the rotation of the XY plane of the wearable postural sensor about the Z-axis.

FIG. 10A shows a X-component of normalized acceleration (Ax). FIG. 10B shows a Y-component of normalized acceleration (Ay). FIG. 10C shows a Z-component of normalized acceleration (Az), FIG. 10D shows the X-component of normalized angular velocity (Gx). FIG. 10E shows the Y-component of normalized angular velocity (Gy). FIG. 10F shows the Z-component of normalized angular velocity (Gz). FIG. 10G shows the angle (Px) between the resultant acceleration vector and the X-component of this vector, FIG. 10H shows the angle (Py) between the resultant acceleration vector and the Y-component of this vector. FIG. 10I shows the angle (Pz) between the resultant acceleration vector and the Z-component of this vector. FIG. 10J shows the rotation of the YZ plane of the wearable postural sensor about the X-axis. FIG. 10K shows the rotation of the XZ plane of the wearable postural sensor about the Y-axis, FIG. 10L shows the rotation of the XY plane of the wearable postural sensor about the Z-axis.

FIG. 11A shows a X-component of normalized acceleration (Ax). FIG. 11B shows a Y-component of normalized acceleration (Ay). FIG. 11C shows a Z-component of normalized acceleration (Az). FIG. 11D shows the X-component of normalized angular velocity (Gx). FIG. 11E shows the Y-component of normalized angular velocity (Gy), FIG. 11F shows the Z-component of normalized angular velocity (Gz). FIG. 11G shows the angle (Px) between the resultant acceleration vector and the X-component of this vector. FIG. 11H shows the angle (Py) between the resultant acceleration vector and the Y-component of this vector. FIG. 11I shows the angle (Pz) between the resultant acceleration vector and the Z-component of this vector. FIG. 11J shows the rotation of the YZ plane of the wearable postural sensor about the X-axis, FIG. 11K shows the rotation of the XZ plane of the wearable postural sensor about the Y-axis. FIG. 11L shows the rotation of the XY plane of the wearable postural sensor about the Z-axis.

FIG. 12A shows the difference (ΔPx) between the most recent rotation angle calculated and a prior value for rotation angle when a prior calculated difference did not exceed the threshold value as illustrated in FIG. 7C. The open circles in the graph show data points from the ΔPx vs time profile when a staggered gait (loss of balance) was detected (arrows) for a ΔPx value greater or less than the threshold value of 36°. FIG. 12B shows the difference (ΔPy) between the most recent rotation angle calculated and a prior value for rotation angle when a prior calculated difference did not exceed the threshold value. The open circles in the graph show data points from the ΔPy vs time profile when a staggered gait (loss of balance) was detected (arrows) for a ΔPy value greater or less than the threshold value of 36°. FIG. 12C shows the difference (ΔPz) between the most recent rotation angle calculated and a prior value for rotation angle when a prior calculated difference did not exceed the threshold value. The open circles in the graph show data points from the ΔPz vs time profile when a staggered gait (loss of balance) was detected (arrows) for a ΔPz value greater or less than the threshold value of 36°.

FIG. 13A shows the difference (ΔRAGx) between the most recent averaged planar rotation calculated and a prior value for averaged planar rotation when a prior calculated difference did not exceed the threshold value as illustrated in FIG. 7C. The open circles in the graph show data points from the ΔRAGx vs time profile when a staggered gait (loss of balance) was detected for a ΔRAGx value greater or less than the threshold value of 28°. FIG. 13B shows the difference (ΔRAGy) between the most recent averaged planar rotation calculated and a prior value for averaged planar rotation when a prior calculated difference did not exceed the threshold value. The open circles in the graph show data points from the ΔRAGy vs time profile when a staggered gait (loss of balance) was detected (arrows) for a ΔRAGy value greater or less than the threshold value of 25°. FIG. 13C shows the difference (ΔRAGz) between the most recent averaged planar rotation calculated and a prior value for averaged planar rotation when a prior calculated difference did not exceed the threshold value. The open circles in the graph show data points from the ΔRAGz vs time profile when a staggered gait (loss of balance) was detected (arrows) for a ΔRAGz value greater or less than the threshold value of 25°.

FIG. 14A shows the difference (ΔMSVy) between the most recent mean mediolateral sway velocity calculated and a prior value for mean mediolateral sway velocity when the prior calculated difference did not exceed the threshold value. The open circles in the graph show data points from the ΔMSVy vs time profile when a staggered gait (arrows) was detected for a ΔMSVy value greater or less than the threshold value of 500 cm/s. FIG. 14B shows the difference (ΔMSVz) between the most recent mean anteroposterior sway velocity calculated and a prior value for mean anteroposterior sway velocity when the prior calculated difference did not exceed the threshold value. The open circles in the graph show data points from the ΔMSVz vs time profile when a staggered gait (arrows) was detected for a ΔMSVz value greater or less than the threshold value of 500 cm/s.

FIG. 15A shows the difference (ΔMSVy) two successive calculations of mean mediolateral sway velocity made at successive time intervals as illustrated in FIG. 7D. The open circles in the graph show data points from the ΔMSVy vs time profile when a staggered gait (arrows) was detected for a ΔMSVy value greater or less than the threshold value of 500 cm/s. FIG. 15B shows the difference (ΔMSVz) two successive calculations of mean anteroposterior sway velocity made at successive time intervals. The open circles in the graph show data points from the ΔMSVz vs time profile when a staggered gait (arrows) was detected for a ΔMSVz value greater or less than the threshold value of 500 cm/s.

DETAILED DESCRIPTION OF THE PRESENT INVENTION

Figure 1:
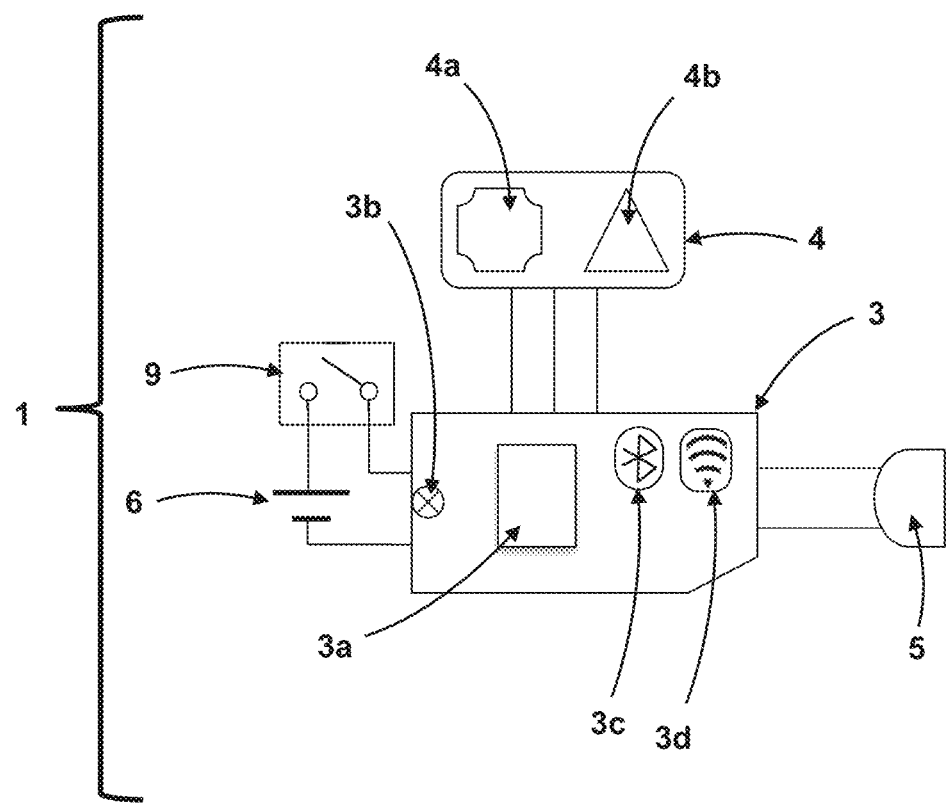
FIG. 1 is a schematic representation of one configuration of a wearable postural sensor showing an integrated motion processing module, an alerting signal module, a battery and a power switch in electrical communication with the microcontroller board.

For convenience, before further description of the present invention, certain terms employed in the specification, examples and appended claims are collected herein. These definitions should be read in light of the remainder of the disclosure and understood as by a person of skill in the art, Unless defined otherwise, all technical and scientific terms used herein have the same meaning as commonly understood by a person of ordinary skill in the art.

As used herein, the articles "a" and "an" when used in conjunction with the term "comprising" in the claims and/or the specification, may refer to "one", but it is also consistent with the meaning of "one or more", "at least one", and "one or more than one". Some embodiments of the invention may consist of or consist essentially of one or more elements, components, method steps, and/or methods of the invention. It is contemplated that any composition, component or method described herein can be implemented with respect to any other composition, component or method described herein.

As used herein, the term "or" in the claims refers to "and/or" unless explicitly indicated to refer to alternatives only or the alternatives are mutually exclusive, although the disclosure supports a definition that refers to only alternatives and "and/or".

As used herein, the terms "comprise" and "comprising" are used in the inclusive, open sense, meaning that additional elements may be included.

As used herein, the term "including" is used herein to mean "including, but not limited to", "Including" and "including but not limited to" are used interchangeably.

As used herein, the term "about" refers to a numeric value, including, for example, whole numbers, fractions, and percentages, whether or not explicitly indicated. The term "about" generally refers to a range of numerical values (e.g., +1-5-10% of the recited value) that one of ordinary skill in the art would consider equivalent to the recited value (e.g., having the same function or result). In some instances, the term "about" may include numerical values that are rounded to the nearest significant figure.

As used herein the terms "triggering", "switching on", "activating", "deploying", "actuating" and "powering on" including other forms thereof are synonymous and used to imply switching on a module or device or sensor by electrical or wireless means.

As used herein the term "breakout board" is synonymous with a circuit board that comprises the electrical and electronic elements required to operate the device for a desired result.

As used herein the term "chip" refers to an integrated circuit. As used herein the term "integrated" refers to electronic elements embedded on a single circuit board.

As used herein the term "enclosure" includes a removable case, a cover, a pouch, a sleeve, a holster, a clip, and the like for an electronic device. An enclosure may partly or fully enclose the electronic device. In some embodiments, an enclosure protects the electronic device from various elements or events, including, but not limited to fluids, weather, impacts, and collisions.

As used herein designation of "X", "Y" and "Z" axis may be interchanged in the formulae and depending on how the sensor is oriented when secured to the user.

In one embodiment of the present invention, there is a portable sensor for alerting a user about a loss of balance comprising a detection module comprising an acceleration sensor and an angular velocity sensor; at least one alerting signal module; a microcontroller board in electrical communication with the detection module and the alerting signal module, said microcontroller board comprising a microcontroller; at least one non-volatile memory; at least one volatile memory; and a library of algorithms tangibly stored in the non-volatile memory, said algorithms comprising microcontroller-executable instructions for detecting the loss of balance and for alerting the user about the loss of balance; a power source; and an enclosure disposed around the detection module, the microcontroller board and the power source.

In this embodiment, the portable sensor has a size, weight and configuration that permits a user to carry, set up at any location and operate without the need of technicians for its daily operation. In one aspect, the portable sensor is wearable and may be secured on the user's body at any location, including but not limited to, around a wrist, a leg, a waist, and a neck.

In this embodiment, the detection module detects motion of the sensor in 3-dimensional space. In one aspect, the detection module comprises an acceleration sensor and an angular velocity sensor. The acceleration sensor is any type of accelerometer including but not limited to a capacitive micro-electro-mechanical systems accelerometer, a piezoresistive accelerometer and a piezoelectric accelerometer. The accelerometer may provide a digital output or an analog output. In one aspect, the acceleration sensor is an analog capacitive micro-electro-mechanical systems accelerometer. Also in this embodiment, the angular velocity sensor is any type of gyroscope including but not limited to a micro-electro-mechanical systems gyroscope, a ring laser gyroscope, a fiber optic gyroscope and a dynamically tuned gyroscope. The gyroscope may provide a digital output or an analog output. In one aspect, the angular velocity sensor is an analog micro-electro-mechanical systems gyroscope. In another aspect of this embodiment the detection module comprises an integrated acceleration sensor and angular velocity sensor embedded on a single circuit board.

In this embodiment, the alerting signal module alerts the user when a loss of balance is detected. Any type of alerting signal module may be used including, but not limited to an auditory alerting signal module, a visual alerting signal module and a vibrotactile alerting signal module. Alternately, the sensor may comprise a combination of these alerting signal modules. In one aspect, the sensor comprises an piezoelectric alarm as the auditory alerting signal module.

In this embodiment, the sensor comprises a microcontroller board. Any commercially available types of microcontroller boards may be used including, but not limited to a 8051, a peripheral interface controllers (PICx) and, a Alf-Egil Bogen and Vegard Wollan's RISC (AVR) processor. Microcontroller boards that may be employed include, but are not limited to, a Arduino Uno, a ESP-32, a Raspberry Pi, an Intel Edison, a Udoo Neo, a LightBlue Bean, a Adafruit Flora, a Tessel, a Particle Photon and a Mediatek Linkit One.

In this embodiment, the volatile memory may comprise any random access memory (RAM) including, but not limited to a dynamic random-access memory (DRAM), a synchronous dynamic random-access memory (SDRAM) and a static random-access memory (SRAM). Also, the non-volatile memory may comprise any read only memory (ROM) including, but not limited to a flash memory, an erasable programmable read-only memory (EPROM), an electrically erasable programmable read-only memory (EEPROM), a programmable read-only memory (PROM) and a mask read only memory (MROM).

In this embodiment the library of algorithms comprises microcontroller-executable instructions for detecting the loss of balance and for alerting the user about the loss of balance. The microcontroller-executable instructions may be in a machine language compatible with the microcontroller board being used including, but not limited to C, C++, Python and JavaScript. In one aspect, the microcontroller board is a ESP-32 and the microcontroller-executable instructions are in C++. The library of algorithms may be written and stored in the non-volatile memory using commercial or open-resource programming code editors including, but not limited to Arduino Integrated Development Environment, Atom, Notepad++, Visual Studio Code and Komodo Edit. One of skill in this art would be well aware of using these programming code editors and select an editor that is compatible with the microcontroller board. In one aspect, the microcontroller board is a ESP-32, the microcontroller-executable instructions are in C++ and the programming code editor is a Arduino Integrated Development Environment (IDE) editor.

Also in this embodiment the executable instructions, among others, direct the detection module to output raw acceleration and angular velocity data for the portable sensor in the X-, Y- and Z-direction at periodic intervals, direct the microcontroller to calculate from the outputted data, a value for a position, a rotation and a sway velocity of the portable sensor in 3-dimensional space at periodic intervals (the "spatio-temporal parameter"), and direct the microcontroller to activate the alerting signal module when a change in a spatio-temporal parameter between two measurements exceeds a set threshold value.

Also in this embodiment, the microcontroller board may be in direct wired electrical communication with the elements in the portable sensor described above, or in wireless communication via a wireless communication module. Alternately, a combination of a wired, a wireless and a cloud-based communication may be used. Wired electrical communication includes, but is not limited to an electrically conductive wire, an inter-integrated circuit (I2C), a serial peripheral interface bus (SPI), an ethernet, a recommended standard 232 (RS-232), a recommended standard 485 (RS-485), an universal asynchronous receiver transmitter (UART), an universal synchronous/asynchronous receiver transmitter (USART) and an universal serial bus (USB). Wireless communication modules are configured for communication without wires and are commercially available as individual chips with specific wireless capabilities, or as integrated modules where two or more wireless communication means are embedded on a single chip. In this embodiment, wireless communication includes, but is not limited to an infrared, a broadcast radio, a microwave, a BLUETOOTH™ network, a WI-FI network or a mobile communication network that includes but is not limited to a third-generation network, a fourth-generation network and a fifth-generation network. In one aspect, the wireless communication module is an integrated BLUETOOTH™ and WI-FI combo chip embedded on the microcontroller board. Wire libraries and virtual wire libraries that use industry standard wired, wireless and cloud communication protocols are readily available and one of skill in this art would be able to add instructions in the programming code editor to incorporate these protocols in the library of algorithms.

Further in this embodiment, there is a power source for operating the sensor. The power source may be in direct electrically communication with each of the elements described above. Alternately, the power source is in direct electrical communication with the microcontroller board, which distributes power to the other elements in the sensor. The power source may be a primary power source (single use) or rechargeable power source and includes but is not limited to a Lithium-ion Polymer (Li—Po) battery, a Lithium-ion (Li-ion) battery, a Nickel Cadmium (Ni—Cd) battery and Nickel-Metal Hydride (Ni-MH) battery. The power output desired from the power source would depend on the combined power consumption of the microcontroller board and the other elements in the sensor. One of skill in this art would be able to readily establish the power requirements for the sensor and select a suitable power source from manufacturer specifications. In one aspect the power source is a Lithium-ion Polymer (Li—Po) battery in direct electrical communication with the microcontroller board and in indirect electrical communication with the detection module and the alerting signal module.

Further in this embodiment, the portable sensor comprises an enclosure that is disposed around the detection module, the microcontroller board and the power source. The enclosure serves as a housing, protecting the elements described above from damage due to fluids, weather and impact. The enclosure may have any shape and size compatible with the shape and size of the described elements and may partly or fully enclose these elements. The enclosure may be manufactured from any material including, but not limited to a polymer, a metal, a nanomaterial, a plastic composite, a metal composite and a nanocomposite. A combination of these materials may also be used. One of skill in this art would be readily able to use either a mass-produced enclosure available commercially, or fabricate by 3D printing or other means, an enclosure with a size and shape suitable for the intended location on the user's body. Also in this embodiment, the enclosure is provided with fasteners, attached on one surface, which allow the sensor to be removably secured on a user's body, clothing or clothing accessory. Any type of fastener that allows removable attachment of the sensor may be used and one skill in this art would be well aware of commercially available fasteners suitable for this purpose. In one aspect, the fastener is a hook-and-loop fastener comprising a hook portion that is attached by adhesive or screws to a surface of the enclosure and a complementary loop portion that is removably secured to the user's body, clothing or clothing accessory, thereby allowing removable attachment of the sensor to the user.

Further to this embodiment, the portable sensor comprises a display in communication with the microcontroller board. In this embodiment, the display is any kind of visual display for displaying prompts that require a user response, or for outputting data including, but not limited to text and illustration. In this embodiment, the display includes, but is not limited to a liquid crystal display (LCD), a light emitting diode display (LED), an organic light-emitting diode display (OLED), an active-matrix organic light emitting diode display (AMOLED), an electroluminescent display (ELD) and an electronic paper display. In one aspect the display includes a keypad for obtaining a user input, and both the display and the keypad are in direct electrical communication with the microcontroller board. In a second aspect, the display includes a touchscreen layer with a digitizer for obtaining a user input, and both the display and the digitizer are in direct electrical communication with the microcontroller board. In a third aspect of this embodiment, the display is a smart device in electrical or wireless communication with the microcontroller board. Non-limiting examples of such smart devices are smartphones, smartwatches, phablets, tablets, personal digital assistants (PDAs), hand-held devices, computers and any other device that can receive and transmit information either via wires, a wireless network or a cloud-based network.

Further to this embodiment, the portable sensor comprises at least one personal safety device in communication with the microcontroller board, said personal safety device disposed outside the enclosure.

In this embodiment, the personal safety device may be any type of commercially available protective device that would protect a user from being injured as a result of a loss in balance. In this embodiment, the personal safety device may be powered by the power source in the portable sensor. Alternatively, the personal safety device may be powered by an independent power source. Examples of personal safety devices include, but are not limited to a hip airbag, an airbag vest, an airbag jacket, a full-body airbag, an airbag helmet, a hip brace and a knee brace. Alternately, a combination of two or more of these personal safety device may be used.

In this embodiment, the personal safety device is configured to be deployed under the direction of the microcontroller board through instructions stored in the non-volatile memory. In one aspect, the personal safety device is in direct electrical communication with the microcontroller board. In another aspect, the personal safety device is in indirect electrical communication with the microcontroller board via a relay. In this aspect, any commercially available relay may be used including but not limited to an electromagnetic relay, a solid-state relay, a MOSFET, or a hybrid relay. In a third aspect, the personal safety device is in wireless communication with the microcontroller board and may be deployed over a BLUETOOTH™ network, a WI-FI network, a cloud-based network or a mobile communication network.

In another embodiment of the present invention, there is a wearable postural sensor for protecting a user from a fall-related injury, said sensor comprising a microcontroller board comprising a microcontroller; at least one non-volatile memory; at least one volatile memory; and a library of algorithms tangibly stored in the non-volatile memory and executable by the microcontroller, said algorithms comprising microcontroller-executable instructions for detecting a fall and for protecting a user from a fall-related injury; an integrated motion processing module comprising a micro-electromechanical triple-axis accelerometer and a micro-electromechanical triple-axis gyroscope in electrical communication with the microcontroller board; a wireless communication module in electrical communication with the microcontroller board; at least one alerting signal module in electrical communication with the microcontroller board; a power source; and an enclosure disposed around the microcontroller board, the integrated motion processing module, the wireless communication module and the power source, said enclosure provided with fasteners disposed on an outer surface to removably secure the portable sensor on the user's body.

In this embodiment, the wearable postural sensor has a shape and size suitable to be worn on any location on the user's body, including but not limited to, around a wrist, a leg, a waist, and a neck.

In this embodiment, the wearable postural sensor comprises a microcontroller board. Any commercially available types of microcontroller boards may be used including, but not limited to a 8051, a peripheral interface controllers (PICx) and, a Alf-Egil Bogen and Vegard Wollan's RISC (AVR) processor, Microcontroller boards that may be employed include, but are not limited to, a Arduino Uno, a ESP-32, a Raspberry Pi, a Intel Edison, a Udoo Neo, a LightBlue Bean, a Adafruit Flora, a Tessel, a Particle Photon and a Mediatek Linkit One.

In this embodiment, the volatile memory may comprise any random access memory (RAM) including, but not limited to a dynamic random-access memory (DRAM), a synchronous dynamic random-access memory (SDRAM) and a static random-access memory (SRAM). In this embodiment, the non-volatile memory may comprise any read only memory (ROM) including, but not limited to a flash memory, an erasable programmable read-only memory (EPROM), an electrically erasable programmable read-only memory (EEPROM), a programmable read-only memory (PROM) and a mask read only memory (MROM).

In this embodiment the library of algorithms comprises microcontroller-executable instructions for detecting the loss of balance and for alerting the user about the loss of balance. The microcontroller-executable instructions may be in a machine language compatible with the microcontroller board being used including, but not limited to C, C++, Python and JavaScript. In one aspect, the microcontroller board is a ESP-32 and the microcontroller-executable instructions are in C++. The library of algorithms may be written and stored in the non-volatile memory using commercial or open-resource programming code editors including, but not limited to Arduino Integrated Development Environment, Atom, Notepad++, Visual Studio Code and Komodo Edit. One of skill in this art would be readily able to select any programing code editor that is compatible with the microcontroller board selected. In one aspect, the microcontroller board is ESP-32, the microcontroller-executable instructions are in C++ and the programming code editor is a Arduino Integrated Development (IDE) Environment editor.

Also in this embodiment the executable instructions, among others, direct the detection module to output raw acceleration and angular velocity data for the wearable postural sensor in the X-, Y- and Z-direction at periodic intervals, direct the microcontroller to calculate from the outputted data, a value for a position, a rotation and a sway velocity of the wearable postural sensor in 3-dimensional space at periodic intervals ("spatio-temporal parameter"), and direct the microcontroller to activate the alerting signal module when a change in a spatio-temporal parameter between two measurements exceeds a set threshold value.

Also in this embodiment, the microcontroller board may be in direct wired electrical communication with the elements in the wearable postural sensor described above, or in wireless communication via a wireless communication module. Alternately, a combination of a wired, a wireless and a cloud-based communication may be used. Wired electrical communication includes, but is not limited to an electrically conductive wire, an inter-integrated circuit (I2C), a serial peripheral interface bus (SPI), an ethernet, a recommended standard 232 (RS-232), a recommended standard 485 (RS-485), an universal asynchronous receiver transmitter (UART), an universal synchronous/asynchronous receiver transmitter (USART) and an universal serial bus (USB). Wireless communication modules are configured for communication without wires and are commercially available as individual chips with specific wireless capabilities or as integrated modules where two or more wireless communication means are embedded on a single chip. In this embodiment, wireless communication includes, but is not limited to an infrared, a broadcast radio, a microwave, a BLUETOOTH™ network, a WI-FI network or a mobile communication network that includes but is not limited to a third-generation network, a fourth-generation network and a fifth-generation network. In one aspect, the wireless communication module is an integrated BLUETOOTH™ and WI-FI combo chip embedded on the microcontroller board. Wire libraries and virtual wire libraries that use industry standard wired, wireless and cloud communication protocols are readily available and one of skill in this art would be able to add instructions in the programming code editor to incorporate these protocols in the library of algorithms.

Further in this embodiment, in one aspect the integrated motion processing module detects motion of the sensor in 3-dimensional space. In one aspect, the integrated motion processing module comprises a micro-electro-mechanical systems triple-axis accelerometer and a micro-electro-mechanical systems triple-axis gyroscope, each independently in electrical communication with the microcontroller board. Alternatively, the integrated motion processing module comprises a single circuit board with embedded micro-electro-mechanical systems triple-axis accelerometer and micro-electro-mechanical systems triple-axis gyroscope in electrical communication with the microcontroller board.

Further in this embodiment, the wearable postural sensor comprises at least one alerting signal module. The alerting signal module may include but is not limited to an auditory alerting signal module, a visual alerting signal module and a vibrotactile alerting signal module. A combination of these alerting signal modules may also be used depending on the requirements of the user. In one aspect, the alerting signal module is a piezoelectric alarm.

Further in this embodiment, there is a power source. The power source may be in direct electrically communication with each of the elements comprised in the. Alternately, the power source is in direct electrical communication with the microcontroller board, which distributes power to the other elements. The power source may be a primary power source (single use) or rechargeable power source and includes but is not limited to a, Lithium-ion Polymer (Li—Po) battery, a Lithium-ion (Li-ion) battery, a Nickel Cadmium (Ni—Cd) battery and Nickel-Metal Hydride (Ni-MH) battery. The power output desired from the power source would depend on the combined power consumption of the microcontroller board and the other elements in the One of skill in this art would be able to readily establish the power requirements for the and select a suitable power source from manufacturer specifications. In one aspect the power source is a Lithium-ion Polymer (Li—Po) battery in direct electrical communication with the microcontroller board and in indirect electrical communication with the integrated motion processing module and the alerting signal module.

Further in this embodiment, the wearable postural sensor comprises an enclosure that is disposed around the integrated motion processing module, the microcontroller board and the power source. The enclosure serves as a housing, protecting the elements described above from damage due to fluids, weather and impact. The enclosure may have any shape and size compatible with the shape and size of the described elements and may partly or fully enclose these elements. The enclosure may be manufactured from any material including, but not limited to a polymer, a metal, a nanomaterial, a plastic composite, a metal composite and a nanocomposite. A combination of these materials may also be used. One of skill in this art would be readily able to use either a mass-produced enclosure available commercially, or fabricate by 3D printing or other means, an enclosure with a size and shape suitable for the intended location on the user's body. Also in this embodiment, the enclosure is provided with fasteners, attached on one surface, which allow the sensor to be removably secured on a user's body, clothing or clothing accessory. Any type of fastener that allows removable attachment of the sensor may be used and one skill in this art would be well aware of commercially available fasteners suitable for this purpose. In one aspect, the fastener is a hook-and-loop fastener comprising a hook portion that is attached by adhesive or screws to a surface of the enclosure and a complementary loop portion that is removably secured to the user's body, clothing or clothing accessory, thereby allowing removable attachment of the sensor to the user.

Further to this embodiment, the wearable postural sensor comprises a display in communication with the microcontroller board. In this embodiment, the display is any kind of visual display for displaying prompts that require a user response, or for outputting data including, but not limited to text and illustration. In this embodiment, the display includes, but is not limited to a liquid crystal display (LCD), a light emitting diode display (LED), an organic light-emitting diode display (OLED), an active-matrix organic light emitting diode display (AMOLED), an electroluminescent display (ELD) and an electronic paper display. In one aspect the display includes a keypad for obtaining a user input, and both the display and the keypad are in direct electrical communication with the microcontroller board. In a second aspect, the display includes a touchscreen layer with a digitizer for obtaining a user input, and both the display and the digitizer are in direct electrical communication with the microcontroller board. In a third aspect of this embodiment, the display is a smart device in electrical or wireless communication with the microcontroller board. Non-limiting examples of such smart devices are smartphones, smartwatches, phablets, tablets, personal digital assistants (PDAs), hand-held devices, computers and any other device that can receive and transmit information either via wires, a wireless network or a cloud-based network.

Further to this embodiment, the wearable postural sensor comprises at least one personal safety device in communication with the microcontroller board, said personal safety device disposed outside the enclosure. In this embodiment, the personal safety device may be any type of commercially available protective device that would protect a user from being injured as a result of a loss in balance. In this embodiment, the personal safety device may be powered by the power source in the wearable postural sensor. Alternatively, the personal safety device may be powered by an independent power source. Examples of personal safety devices include, but are not limited to a hip airbag, an airbag vest, an airbag jacket, a full-body airbag, an airbag helmet, a hip brace and a knee brace. Alternately, a combination of two or more of these personal safety device may be used.

In this embodiment, the personal safety device is configured to be deployed under the direction of the microcontroller board through instructions stored in the non-volatile memory. In one aspect, the personal safety device is in direct electrical communication with the microcontroller board. In another aspect, the personal safety device is in indirect electrical communication with the microcontroller board via a relay. In this aspect, any commercially available relay may be used including but not limited to an electromagnetic relay, a solid-state relay, a MOSFET, or a hybrid relay. In a third aspect, the personal safety device is in wireless communication with the microcontroller board and may be deployed over a BLUETOOTH™ network, a WI-FI network, a cloud-based network or a mobile communication network.

In yet another embodiment of the present invention, there is provided a method for preventing a fall and a fall-related injury comprising the steps of a) removably securing the wearable postural sensor of claim 13 to a user; b) switching on the power source; c) selecting a threshold value for detecting a change in a spatio-temporal parameter for the sensor; d) calculating a change in the spatio-temporal parameter for the sensor; e) actuating at least one of the alerting signal modules when the change in the spatio-temporal parameter for the sensor is greater than the threshold value, thereby alerting the user, thereby preventing the fall and the fall-related injury; and f) repeating steps (d) and (e).

In this embodiment, the step of removably securing the wearable postural sensor involves securing the sensor at any location on the user's body, including but not limited to, around a wrist, a leg, a waist, and a neck.

In this embodiment, in one aspect, the spatio-temporal parameter is a calculated angle between a X-axis, a Y-axis and a Z-axis component of an acceleration vector for the wearable postural sensor (attached to the user) measured by the accelerometer and the resultant acceleration vector. In this aspect, a change in the spatio-temporal parameter is a change in the angle calculated between two measurements. In a second aspect of this embodiment, the spatiotemporal parameter is a calculated planar rotation of the wearable postural sensor (attached to the user) about the X, Y and Z axis, corresponding to rotation of the YZ, XZ and XY planes respectively, of the wearable postural sensor. In this aspect, a change in the spatiotemporal parameter is a change in the planar rotation calculated between two measurements. In a third aspect of this embodiment, the spatio-temporal parameter is a calculated sway velocity of the wearable postural sensor (attached to the user) in a mediolateral and a anteroposterior direction. In this aspect, a change in the spatio-temporal parameter is a change in the sway velocity calculated between two measurements. In all three aspects of this embodiment, a change is calculated by subtracting the most recent measurement from a prior measurement when the calculated difference did not exceed the threshold value (FIG. 7C). Alternatively, a change is calculated by subtracting two successive measurements made at successive time intervals (FIG. 7D) from about 2 millisecond apart to about 300 milliseconds apart.

Also in this embodiment, the method comprises the step of selecting a threshold value for detecting a change in any of the aspects of the spatio-temporal parameter for the wearable postural sensor discussed above. In this embodiment, in one aspect, the threshold value may be inputted by the user using a keypad, in response to a prompt (FIG. 7A) shown on the smart device display. In a second aspect of this embodiment, the user may elect to use a threshold value previously stored in the non-volatile memory of the sensor. In a third aspect of this embodiment, the threshold value is calculated by performing a baseline calibration. The baseline calibration is performed by instructing the user, to walk on a substantially flat surface, while calculating over a time period, an average value for the change in the spatio-temporal parameters for the sensor as discussed above. The averaged value obtained from the baseline calibration is designated the threshold value and may be stored in the non-volatile memory for immediate use and also for future retrieval by the user. In this embodiment, the time period for calculating an averaged value for the change in the spatio-temporal parameter may vary from about 20 seconds to about 300 seconds.

Further in this embodiment, the microcontroller-executable instructions are looped (FIG. 7B) to execute the method steps of calculating (step d) and actuating (step e) as encompassed in the embodiments described above.

Further to this embodiment, the method comprises simultaneously actuating in step e), the at least one personal safety device. In this embodiment, the personal safety device is configured to be deployed under the direction of the microcontroller board through instructions stored in the non-volatile memory. In one aspect, the personal safety device is in direct electrical communication with the microcontroller board. In another aspect, the personal safety device is in indirect electrical communication with the microcontroller board via a relay. In this aspect, any commercially available relay may be used including but not limited to an electromagnetic relay, a solid-state relay, a MOSFET, or a hybrid relay. In a third aspect, the personal safety device is in wireless communication with the microcontroller board and may be deployed over a BLUETOOTH™ network, a WI-FI network, a cloud-based network or a mobile communication network.

Provided herein is a wearable postural sensor for protecting a user from a fall-related injury comprising a microcontroller board, an integrated motion processing module, at least one alerting signal module in electrical communication with the microcontroller board, a power source and an enclosure disposed around the microcontroller board, the integrated motion processing module and the power source. The microcontroller board comprises a microcontroller at least one non-volatile memory, at least one volatile memory and a library of algorithms tangibly stored in the non-volatile memory and executable by the microcontroller. The algorithms comprise microcontroller-executable instructions for detecting a fall and for protecting a user from a fall-related injury. The integrated motion processing module comprises a micro-electromechanical triple-axis accelerometer and a micro-electromechanical triple-axis gyroscope in electrical communication with the microcontroller board. Also described is a display in communication with the microcontroller board in the wearable postural sensor for the purpose of user inputting a threshold value and displaying the spatio-temporal changes described herein. Also described is a personal safety device, which may be deployed by the wearable postural sensor to protect the user from injury during a fall. Further described herein is a method for preventing a fall and a fall-related injury using the wearable postural sensor. Particularly, embodiments of the present invention are better illustrated with reference to the Figure(s), however, such reference is not meant to limit the present invention in any fashion. The embodiments and variations described in detail herein are to be interpreted by the appended claims and equivalents thereof.

FIG. 1 is one configuration of a wearable postural sensor 1 showing a microcontroller board 3 in electrical communication with an integrated motion processing module 4, an alerting signal module 5, a battery 6 and a power control switch 9. The microcontroller board comprises a microcontroller 3a, a micro-USB communications port 3b, for connecting the microcontroller board to a computer's universal serial bus (USB) port to upload an algorithm comprising microcontroller-executable instructions from the programming code editor, and an embedded BLUETOOTH™ 3c and WI-FI 3d chip for wireless and cloud communication. The integrated motion processing module comprises an integrated triple axis accelerometer 4a and a triple axis gyroscope 4b.

Figure 2:
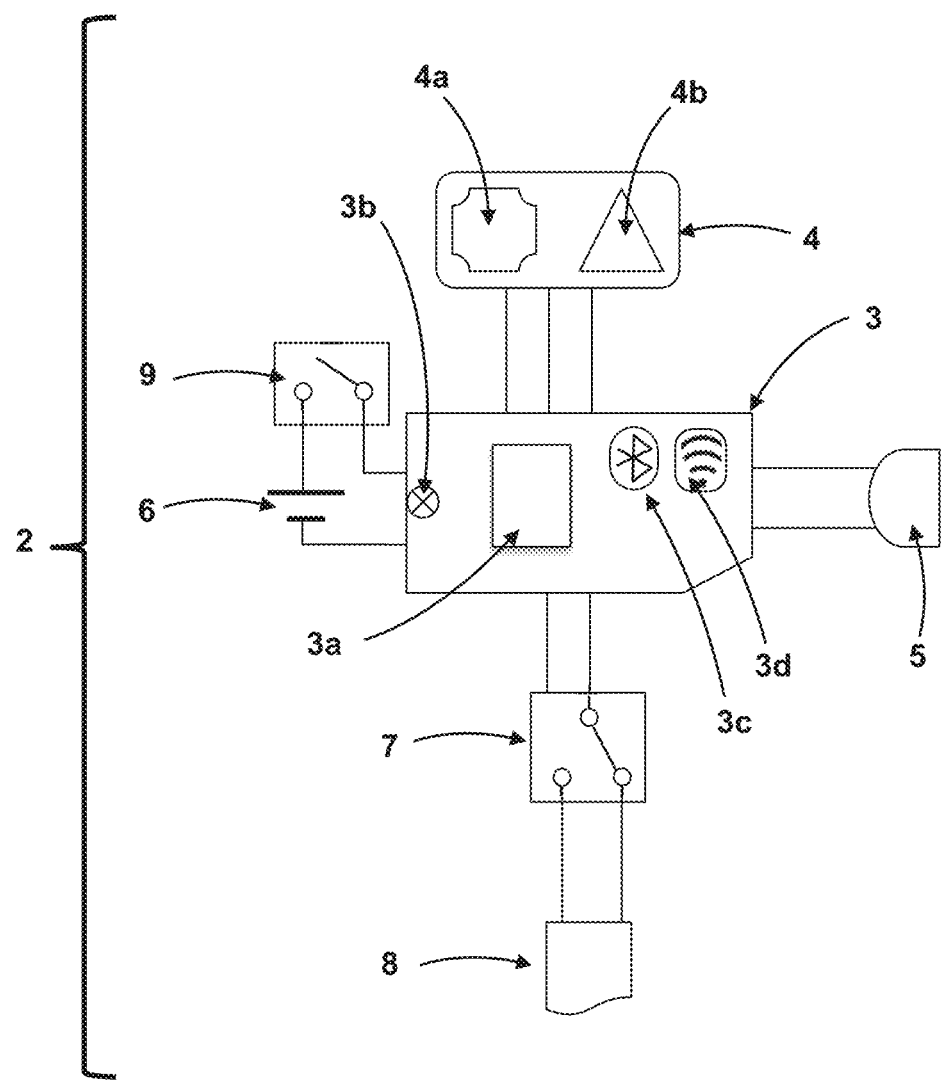
FIG. 2 is a schematic representation of a second configuration of a wearable postural sensor showing an integrated motion processing module, an alerting signal module, a relay, a personal safety device, a battery and a power switch in direct or indirect electrical communication with the microcontroller board.

FIG. 2 is a second configuration of a wearable postural sensor 2 showing a microcontroller board 3 in electrical communication with an integrated motion processing module 4, an alerting signal module 5, a battery 6, a power control switch 9 and a relay 7 in direct electrical communication with a personal safety device 8. The microcontroller board comprises a microcontroller 3a, a micro-USB communications port 3b, for connecting the microcontroller board to a computer's universal serial bus (USB) port to upload an algorithm comprising microcontroller-executable instructions from the programming code editor, and an embedded BLUETOOTH™ 3c and a WI-FI 3d chip for wireless and cloud communication. The integrated motion processing module comprises an integrated triple axis accelerometer 4a and a triple axis gyroscope 4b. The relay is triggered by the microcontroller-executable instructions to activate the personal safety device, which protects the user from a bodily injury during a fall.

Figure 3A:
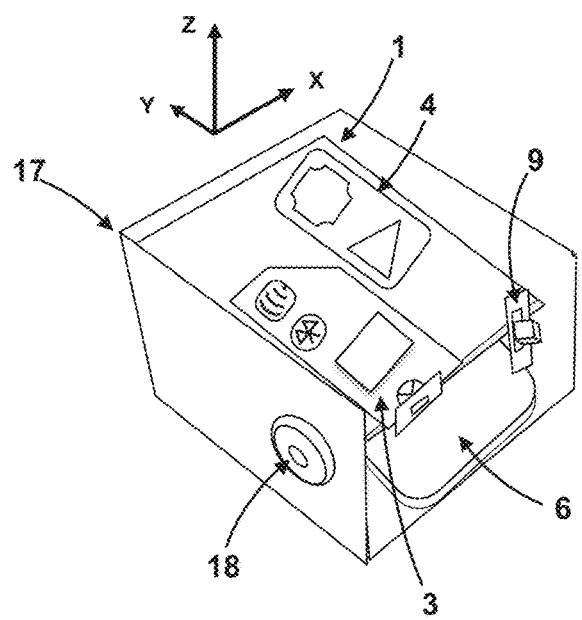
FIGS. 3A-3C show an assembled wearable postural sensor inside an enclosure.

With continued reference to FIG. 1, FIG. 3A is a top view of an enclosure 17 with a top and front panel removed showing encompassed, the wearable postural sensor 1 comprising the microcontroller board 3, the integrated motion processing module 4, the battery 6, the power control switch 9 and an auditory alerting signal module 18.

Figure 3B:
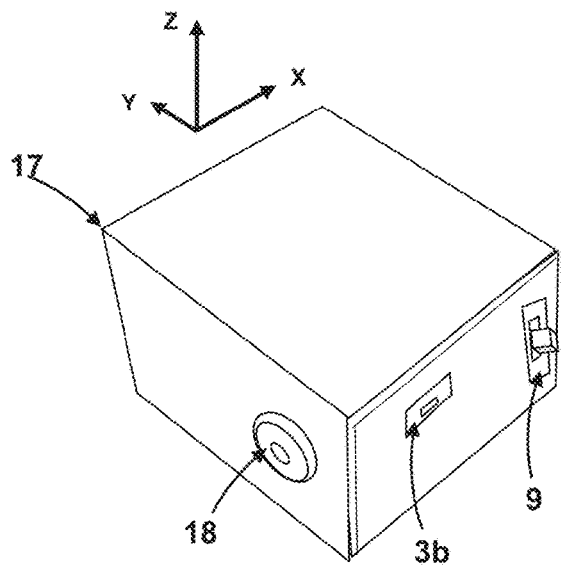

With continued reference to FIG. 3A, FIG. 3B is a top view of a fully assembled enclosure 17 surrounding the wearable postural sensor, showing the power control switch 9 and the micro-USB communications port 3a attached to the front panel and the auditory alerting signal module 18 attached on a left side panel. The integrated motion processing module is oriented with respect to the enclosure such that the Z-axis is perpendicular, and the X- and Y-axis are parallel to the top of the enclosure.

Figure 3C:
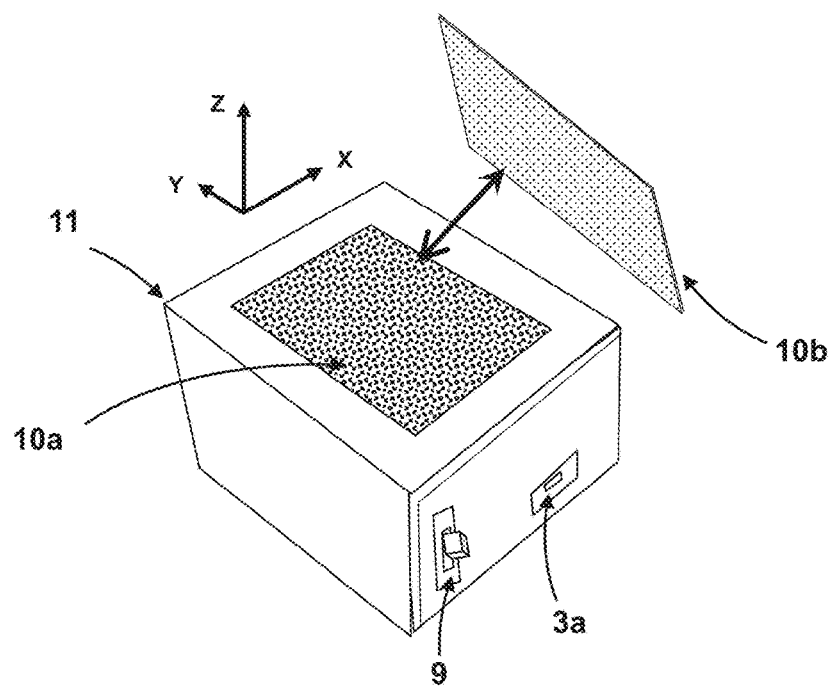

With continued reference to FIG. 3B, FIG. 3C is a bottom side up view of the enclosure to which is attached the hook portion 10a of a Velcro® hook-and-loop fastener. The hook portion attaches to complementary loop portion 10b that is secured to the user's body, whereby the wearable postural sensor is removably attached to the user.

Figure 4A:
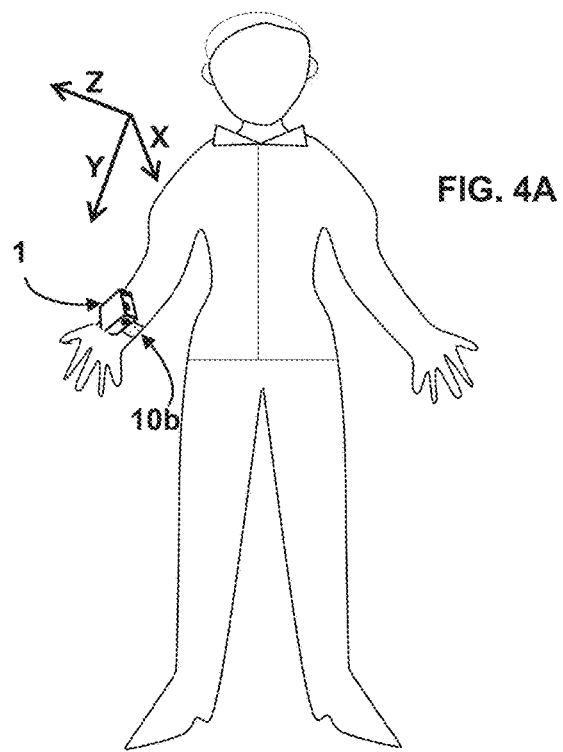
FIGS. 4A-4C is a representation of the wearable postural sensor attached to a user's body using hook and loop fasteners.

With continued reference to FIGS. 3B and 3C, FIG. 4A shows the bottom side of the wearable postural sensor removably secured to the loop portion 10b of a Velcro® hook-and-loop quick-release fastener removably attached around a user's right wrist.

Figure 4B:
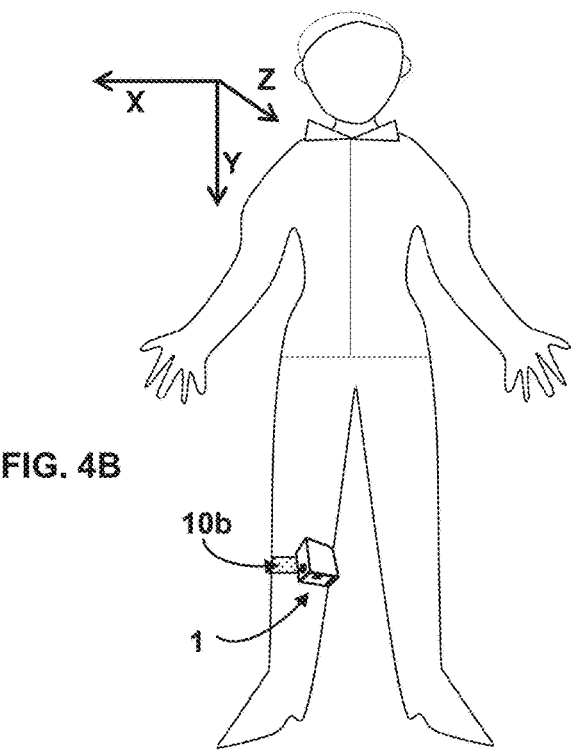

With continued reference to FIGS. 3B and 3C, FIG. 4B shows the bottom side of the wearable postural sensor removably secured to the loop portion 10b of a Velcro® hook-and-loop quick-release fastener removably attached around a user's right leg.

Figure 4C:
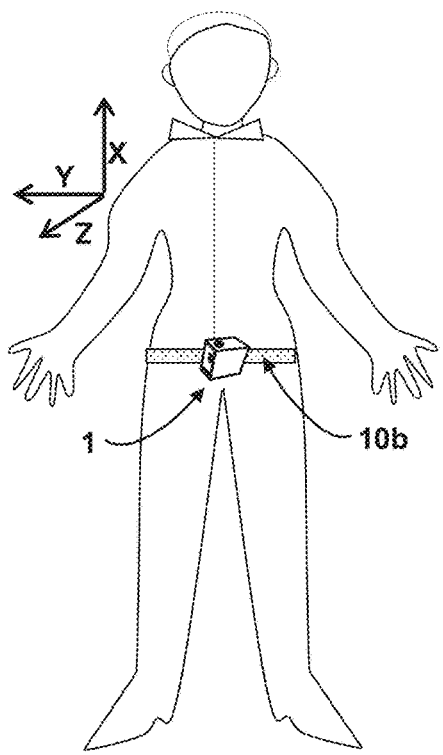

With continued reference to FIGS. 3B and 3C; FIG. 4C shows the bottom side of the wearable postural sensor removably secured to the loop portion 10b of a Velcro® hook-and-loop quick-release fastener removably attached on a user's belt below the navel.

Figure 5:
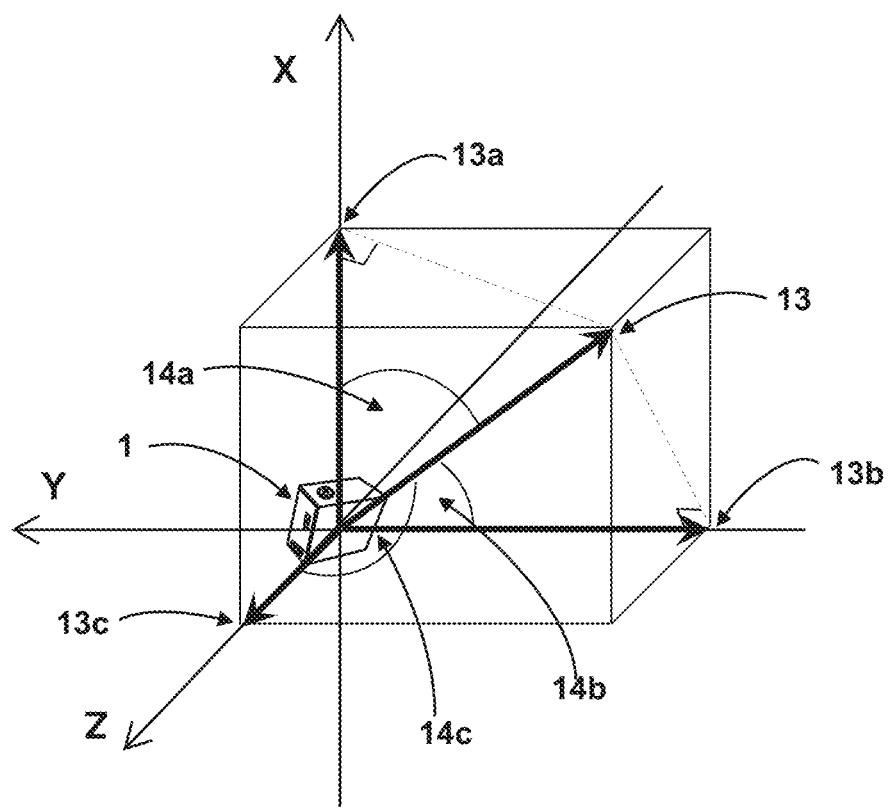
FIG. 5 is a pictorial representation of the wearable postural sensor in 3-dimensional space showing the relation between resultant acceleration vector and the X-, Y- and Z-components of the acceleration vector.

FIG. 5 is a pictorial representation of the wearable postural sensor in 3-dimensional space showing the relation between resultant acceleration vector 13, its X component 13a, Y component 13b and Z component 13c, corresponding to the accelerometer outputs in the X- Y- and Z-direction respectively. Also shown are the angles 14a, 14b and 14c between the resultant acceleration vector and the X, Y and Z components respectively. These relationships are used by the algorithm to compute sensor position, planar rotation and sway velocity.

Figure 6:
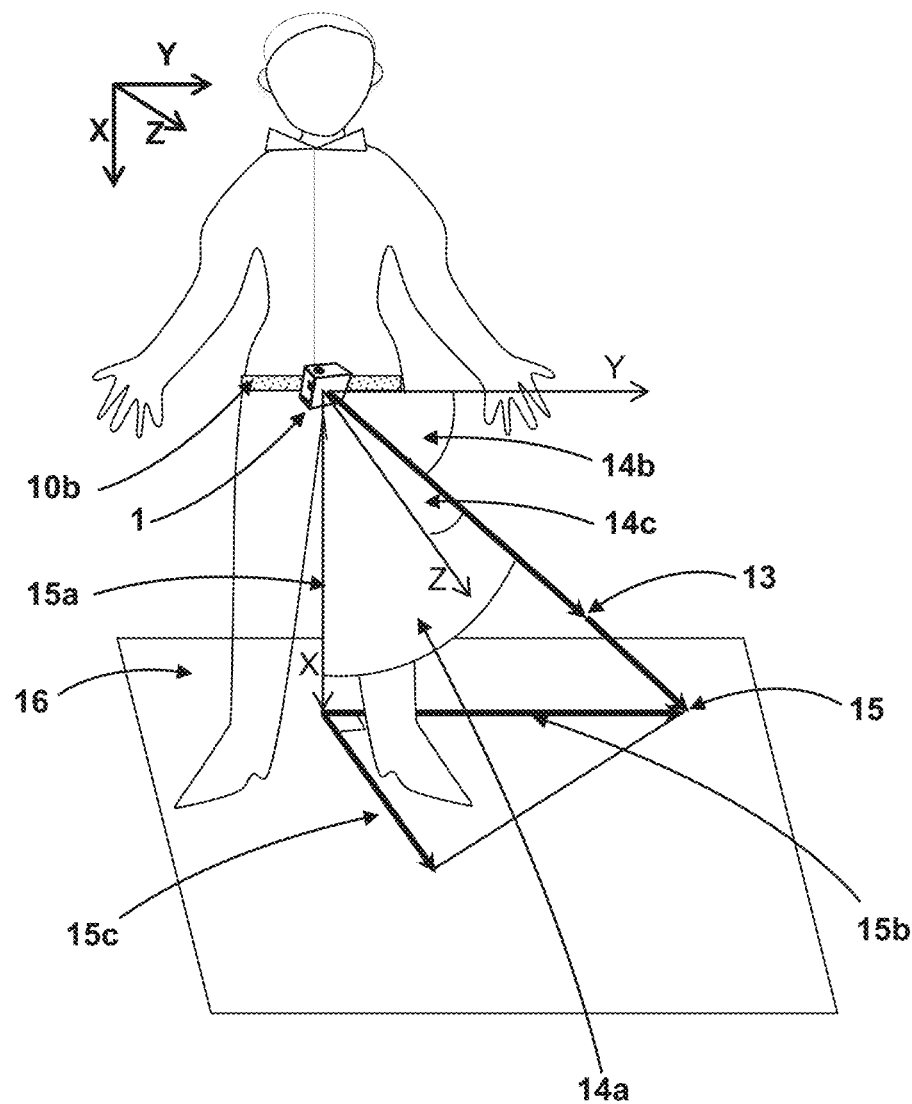
FIG. 6 is a pictorial representation of the wearable postural sensor attached to a user's waist showing the relation between the resultant acceleration vector and the projected sway path in the Y- and Z-direction.

With continued reference to FIG. 5, FIG. 6 is a pictorial representation of the wearable postural sensor attached to a user's waist showing the relation between the vector 15 that is collinear to the resultant acceleration vector 13, distance traveled in a mediolateral direction 15b along the Y axis and distance traveled in a anteroposterior direction 15c along the Z axis on a projected sway path (projected YZ plane) 16.

Figure 7A:
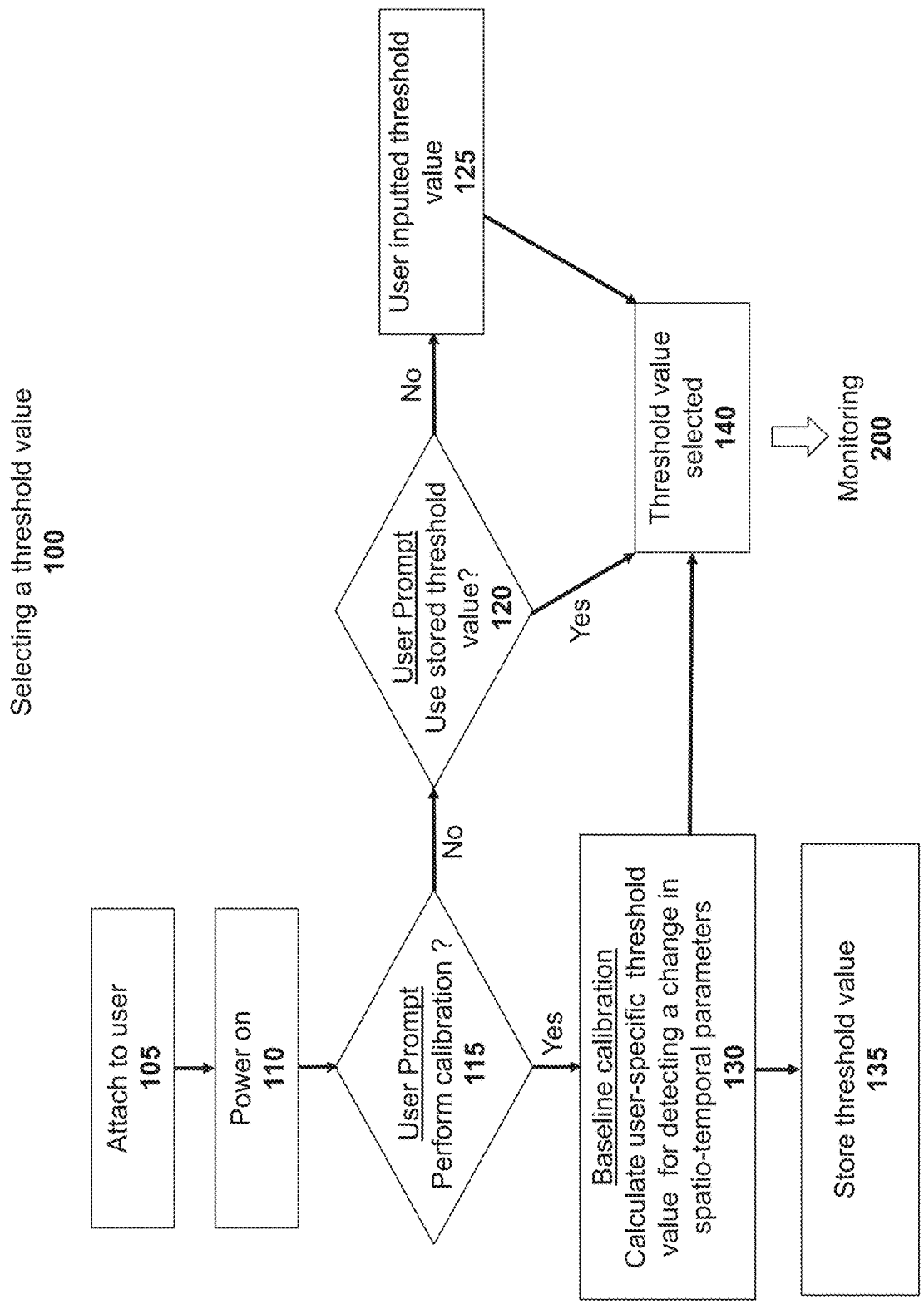
FIGS. 7A-7D show algorithm flow charts for operating the wearable postural sensor and detecting a potential fall.

FIG. 7A is a flow chart for selecting a threshold value 100 for the user. The method comprises attaching the sensor to the user 105, powering on the sensor 110, prompting the user 115, to perform a baseline calibration 130, or use a stored threshold value 120, or input a new threshold value 125. Performing either of these steps results in a threshold value being selected 140 before monitoring 200 begins. A threshold value calculated from the baseline calibration is stored 135 in a non-volatile memory.

Figure 7B:
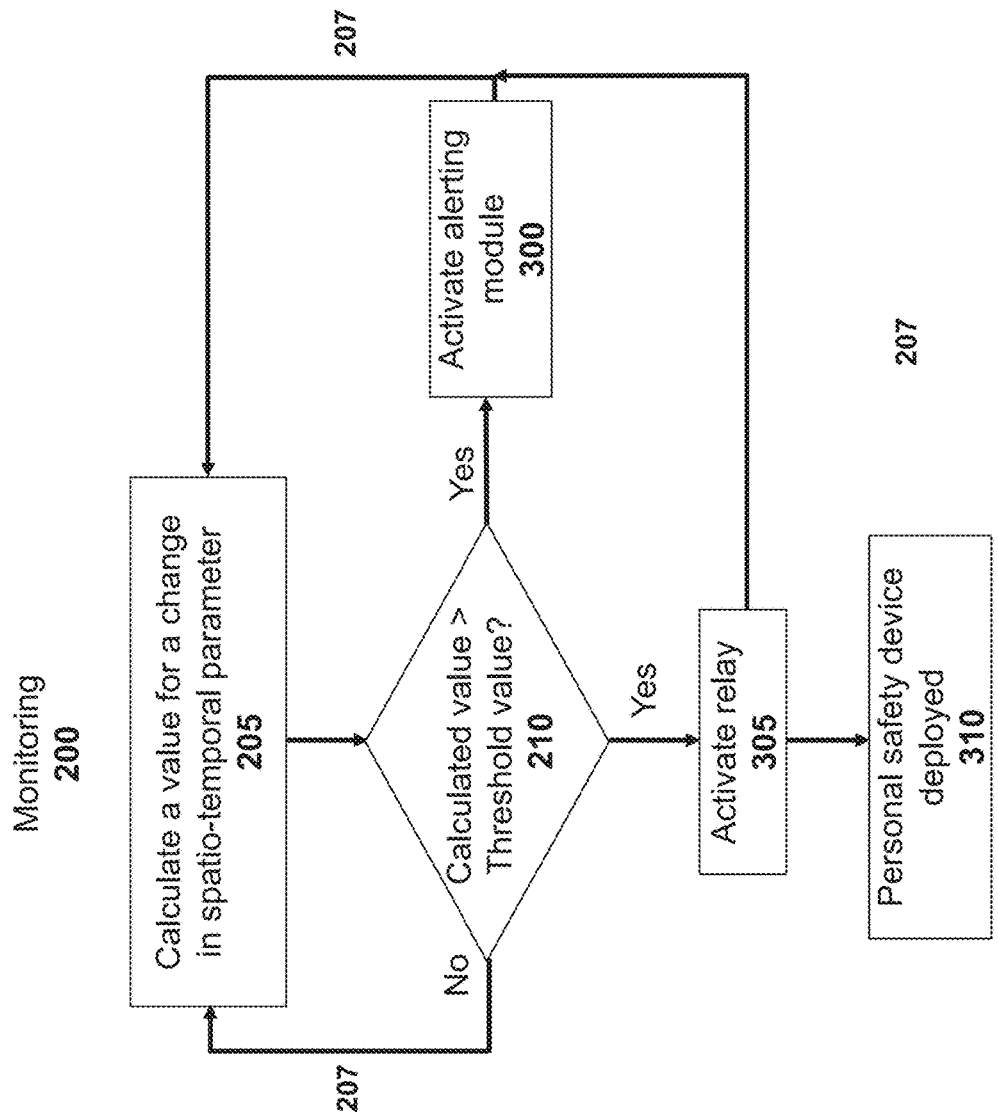
Figure 7C:
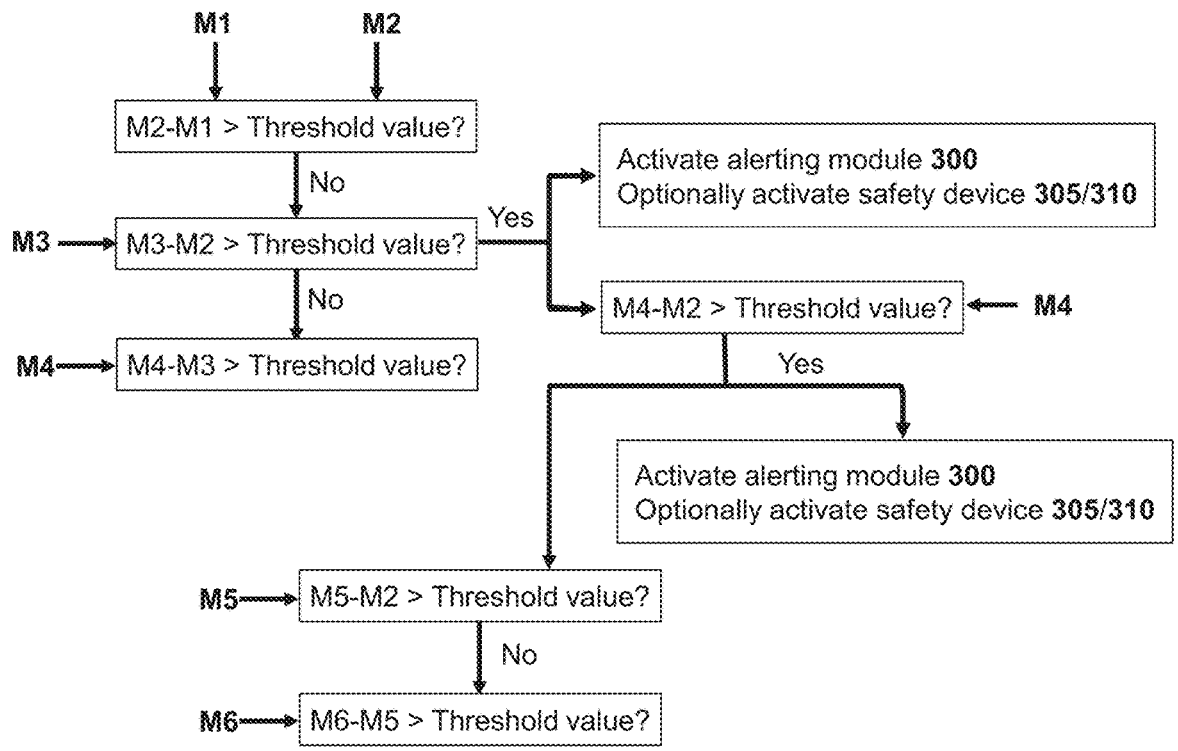

With continued reference to FIG. 7A, FIG. 7B shows a flow chart for monitoring 200 comprising steps of calculating a value for a change in spatio-temporal parameter 205 and determining whether 210, the calculated value is greater than the threshold value selected 140. If the calculated value is not greater than the threshold value selected, the monitoring loop 207 is executed. If the calculated value is greater than the threshold value selected, the alerting signal module(s) is activated 300, followed by the monitoring loop 207. Concurrent to activating the alerting signal module, the algorithm may optionally direct the microcontroller to activate the relay 305 thereby a personal safety device is deployed 310.

FIG. 7C is a representative flow chart showing one method for treating the measurements of spatio-temporal parameters. The algorithm subtracts a first measurement M1 (subtrahend) from a second measurement M2 (minuend). If the result is not greater than the threshold value, the second measurement M2 is stored in the volatile memory and is used as the new subtrahend, which would be subtracted from the next measurement M3 (new minuend). Next, if the result for M3-M2 is greater than the threshold value, M2 is retained as the subtrahend and next measurement M4 becomes the minuend. M2 is retained as the subtrahend until a subtraction result does not exceed the threshold value as shown for measurement M5, when M5 becomes the new subtrahend for the next subtraction.

Figure 7D:
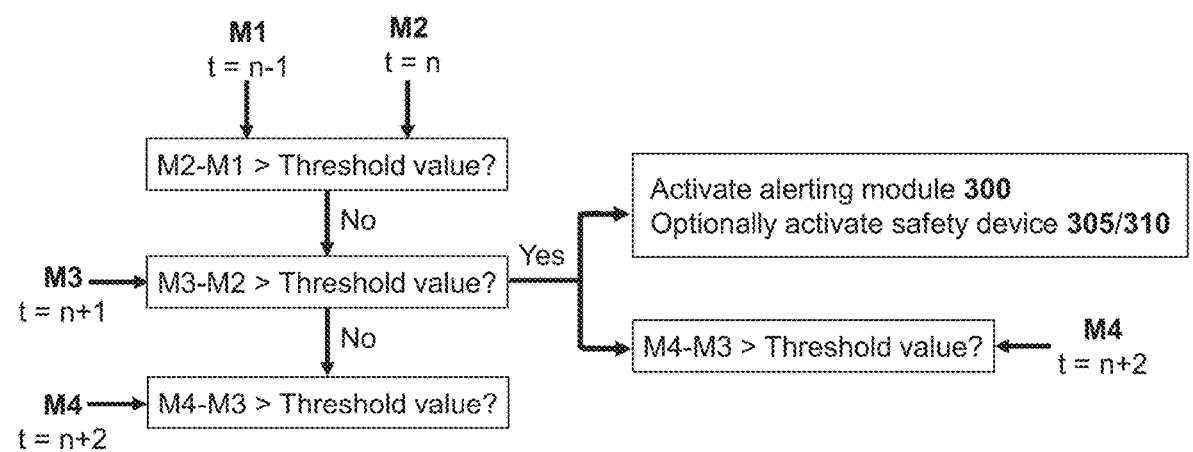

With continued reference to FIG. 7C, FIG. 7D is a representative flow chart showing an alternate method for treating the measurements of spatio-temporal parameters. The algorithm subtracts a first measurement M1 (subtrahend) made at time "n−1" from a second measurement M2 (minuend) made at time "n". If the result is not greater than the threshold value, the second measurement M2 is stored in the volatile memory and is used as the new subtrahend, which would be subtracted from the next measurement M3 (new minuend) made as the next successive time "n+1". Next, if the result for M3-M2 is greater than the threshold value, M3 becomes the new subtrahend for subtraction from the next measurement M4 (new minuend) made as the next successive time "n+2". Thus, this method differs from the method illustrated in FIG. 7C in that the subtrahend changes for each successive measurement time whether or not the threshold value is exceeded.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. The terms in the claims have their plain, ordinary meaning unless otherwise explicitly and clearly defined by the patentee.

The following examples are given for the purpose of illustrating various embodiments of the invention and are not meant to limit the present invention in any fashion. One skilled in the art will appreciate readily that the present invention is well adapted to carry out the objects and obtain the ends and advantages mentioned, as well as those objects, ends and advantages inherent herein. Changes therein and other uses which are encompassed within the spirit of the invention as defined by the scope of the claims will occur to those skilled in the art.

EXAMPLE 1

Materials
1) MPU-6050-integrated motion processing module. MPU-6050 (InvenSense Inc., Sunnyvale, Calif.) has a 3-axis microelectromechanical system (MEMS) gyroscope and a 3-axis MEMS accelerometer integrated on a single circuit board. MPU-6050 combines acceleration and rotational motion information into a single data stream, which is electrically transmitted to the microcontroller using the I2C protocol. Using an integrated accelerometer and gyroscope as in MPU-6050, rather than independent accelerometers and gyroscopes is advantageous since cross-axis misalignment is eliminated thereby allowing comparison of accelerometer and gyroscope data in real-time.
2) ESP32-Microcontroller board. ESP32 (Espressif Systems Ltd. Shanghai, China) is a dual-core system comprising embedded flash, Wi-Fi-and-Bluetooth, a polymer lithium battery connector jack and a micro-USB port.
3) Passive Low Level Trigger Buzzer Alarm Sound Module (auditory alerting signal module).
4) 3.7-Volt polymer lithium battery.
5) Amazon-Fire Tablet was used as the display in wireless communication with ESP32.
6) A plastic enclosure for the sensor was designed and printed using a 3D printer. The enclosure has openings on an outer surface for the alarm, a power switch for operating the, and a micro-USB communication port for uploading the algorithms comprising microcontroller-executable instructions into the non-volatile flash memory using Arduino IDE programming editor. The enclosure has two compartments on the interior—a lower battery compartment and an upper compartment for ESP32 and MPU-6050.
7) Arduino IDE programming editor installed on a standard personal computer was used to write the microcontroller-executable instructions in C++ language, compile them into machine language and upload the code to the flash memory in the microcontroller board using a micro-USB cable.

Circuit Design

The ESP32 Microcontroller board is electrically connected to the MPU-6050, the alarm and the battery as shown in FIG. 1 and Table 1. In this circuit, the SDA (data line), SCL (clock line) pins in MPU-6050 and the alarm may be connected to any general purpose input output interphase (GPIO).

TABLE 1

Pin connections for the ESP32 microcontroller board

ESP32 Pins

| | MPU-6050 Pins |
|---|---|
| Pin 21 | SDA |
| Pin 22 | SCL |
| Pin GND | GND |
| Pin 3V3 | VCC |
| Pin 23 | Alarm |
| Battery jack | 3.7-Volt Lithium-ion Polymer battery |

Programing Design

Wire libraries comprising instructions for I2C, wireless and MPU-6050 communication were downloaded from open resources (GitHub) and installed in the Arduino IDE folder on the computer.

A new sketch file was opened in the Arduino IDE editor and algorithms comprising C++ language instructions to initiate the wire libraries, initiate the MPU-6050, communications port and alarm (auditory alerting signal module) were written to the setup function. During initialization MPU-6050 is set up for the accelerometer to read a full-scale range of ±2 g, and the gyroscope to read a full-scale range of ±250°/s. This was followed by writing instructions to the loop function that comprised the following:

A) Communicating with the Display

Instructions in the setup function established wireless communication between the microcontroller board in the sensor and the Amazon-Fire Tablet (smart device display). The tablet is used for receiving user inputs, making changes to threshold values and for displaying computed data.

B) Selecting a Threshold Value:

The instructions prompt the user via the tablet to either enter a threshold value, accept a previously saved threshold value from the flash memory or perform a baseline calibration to obtain a threshold value for the user (FIG. 7A). Threshold values vary with the body location the sensor is secured to and therefore, changing the sensor location would require selecting a new threshold value or re-performing the baseline calibration to obtain a new threshold value.

The threshold value that may be entered would depend on whether the goal of the algorithm is to monitor a change in rotation of the sensor (planar rotation algorithm, threshold range=23°-200° for the sensor secured around the waist) or a change in linear sway velocity of the sensor (sway velocity algorithm, threshold range=10 cm/s to 2000 cm/s for the sensor secured around the waist). Alternately, the user may elect to use a threshold value saved during a baseline calibration performed previously. The user may also choose to perform a new baseline calibration to calculate the threshold value. Baseline calibration is performed by recording (performed for 20 seconds to 300 seconds), changes to spatio-temporal parameters (discussed below) as the user walks on a floor, street or lawn where the surface is sufficiently flat. The microcontroller-executable instructions calculate an averaged value for the change in the spatio-temporal parameters, which could be a change in rotation angle (rotation angle algorithm), a change in planar rotation about the X- Y- and Z-axis (planar rotation algorithm) or a change in averaged sway velocity along the X- Y- and Z-axis (sway velocity algorithm) as described below.

C) Reading Raw Data:

In this step the algorithm instructs the microcontroller to read raw acceleration and angular velocity values as a single data stream from MPU-6050 and break it up into acceleration on each of X- Y- and Z-axis and angular velocity about each of X- Y- and Z-axis.

D) Normalization:

In this step, the raw acceleration and angular velocity data is converted to normalized values by dividing it by scale factors provided by the MPU-6050 manufacturer. The scale factor is 16384 for the accelerometer and 131 for the gyroscope. Normalized acceleration is expressed in 'g' units and normalized angular velocity in '°/s'.

E) Calculating a Realtime Spatiotemporal Parameter Change for the Sensor:

In this step the algorithm instructs the microcontroller to calculate from normalized acceleration and angular velocity data, a change in angle between a resultant acceleration vector and the X-axis component, the Y-axis component and the Z-axis component of this resultant acceleration vector (rotation angle algorithm) or a change in sensor rotation (planar rotation algorithm), or, a change in sway velocity (velocity algorithm).

1. Change in Sensor Angle—the Rotation Angle Algorithm

The angle between the resultant acceleration vector and the X, Y and Z component of the resultant acceleration vector, which are obtained from the accelerometer was calculated using the equations;

$$Px = \arccosine\left(\frac{Ax}{A}\right) * \frac{180}{\pi} \qquad (1)$$

$$Py = \text{arc cosine}\left(\frac{Ay}{A}\right) * \frac{180}{\pi} \quad (2)$$

$$Pz = \text{arc cosine}\left(\frac{Az}{A}\right) * \frac{180}{\pi} \quad (3)$$

where Ax (13a), Ay (13b) and Az (13c) are the X-, Y- and Z-components respectively of the resultant acceleration vector 'A' (13) and correspond to the normalized accelerometer outputs for the X-, Y- and Z-axis, Px (14a), Py (14b) and Pz (14c) are the angles in degrees between the resultant acceleration vector 'A' and the X, Y and Z components respectively (FIG. 5). The resultant acceleration vector 'A' is calculated using the equation $$A = \sqrt{(Ax)^2(Ay)^2 + (Az)^2} \quad (4)$$

A change in the spatio-temporal parameter would then be calculated using the equation;

$$\Delta Px = Px_1 - Px_2 \quad (5)$$

$$\Delta Py = Py_1 - Py_2 \quad (6)$$

$$\Delta Pz = Pz_1 - Pz_2 \quad (7)$$

where the subscript "1" and "2" refer to two measurements. As discussed in the embodiments above and illustrated in FIGS. 7C and 7D, the measurements may be either (1) the most recent measurement and a prior measurement when ΔP did not exceed the threshold value (Method 1), or, (2) two successive measurements made at successive time intervals (Method 2).

2. Change in Sensor Rotation—the Planar Rotation Algorithm (i) Change in Sensor Rotation from Normalized Acceleration:

Rotation of the sensor about each axis is calculated from acceleration using the equations;

$$RAx = a\tan2(Az, Ay) * \frac{180}{\pi} \quad (8)$$

$$RAy = a\tan2(Az, Ax) * \frac{180}{\pi} \quad (9)$$

$$RAz = a\tan2(Ay, Ax) * \frac{180}{\pi} \quad (10)$$

Where RAx, RAy and RAz are the rotation in degrees about the X-, Y- and Z-axis, corresponding to rotation of the YZ plane, XZ plane and XY plane respectively; Ax (13a), Ay (13b) and Az (13c) are the X-, Y- and Z-components respectively of the resultant acceleration vector 'A' (13) and correspond to the normalized accelerometer outputs for the X-, Y- and Z-axis and "atan 2" refers to the 2-argument arctangent which returns the angle in radians made by a vector in the Euclidian plane. A change in the spatio-temporal parameter would then be calculated using the equation;

$$\Delta RAx = RAx_1 - Rax_2 \quad (11)$$

$$\Delta RAy = Ray_1 - Ray_2 \quad (12)$$

$$\Delta RAz = RAz_1 Raz_z \quad (13)$$

where the subscript "1" and "2" refer to two measurements. As discussed in the embodiments above and illustrated in FIGS. 7C and 7D, the measurements may be either (1) the most recent measurement and a prior measurement when the ARA did not exceed the threshold value (Method 1), or, (2) two successive measurements made at successive time intervals (Method 2).

(ii) Change in Sensor Rotation from Normalized Angular Velocity:

To calculate rotation from normalized angular velocity, the initial estimated sensor rotation is set equal to the values obtained from the accelerometer data described above using equations (8)-(10).

Thus, at time $t_{n-1}$, $$RGx_{n-1} = RAx_{n-1} \quad (14)$$

$$RGy_{n-1} = RAy_{n-1} \quad (15)$$

$$RGz_{n-1} = RAz_{n-1} \quad (16)$$

where $RGx_{n-1}$, $RGy_{n-1}$ and $RGz_{n-1}$ are the rotation in degrees about the X-, Y- and Z-axis at time n–1.

At time $t_n$, $$RGx_n = RGx_{n-1} + (Gx*(t_n - t_{n-1})) \quad (17)$$

$$RGy_n = RGy_{n-1} + (Gy*(t_n - t_{n-1})) \quad (18)$$

$$RGz_n = RGz_{n-1} + (Gz*(t_n - t_{n-1})) \quad (19)$$

where $RGx_n$, $RGy_n$ and $RGz_n$ are the rotation in degrees about the X-, Y- and Z-axis at time $t_n$ and Gx, Gy and Gz are the normalized gyroscope outputs in degrees per second.

To offset errors due to drifting in the calculated planar rotation from equations (17)-(19), RGx, RGy, and RGz are reset as in equations (14)-(16) when their values go above or below 180°.

A change in the spatio-temporal parameter would then be calculated using the equation;

$$\Delta RGx = RGx_1 - RGx_2 \quad (20)$$

$$\Delta RGy = RGy_1 - Rgy_2 \quad (21)$$

$$\Delta RGz = RGz_1 - RGz_2 \quad (22)$$

where the subscript "1" and "2" refer to two measurements. As discussed in the embodiments above and illustrated in FIGS. 7C and 7D, the measurements may be either (1) the most recent measurement and a prior measurement when ΔRG did not exceed the threshold value (Method 1), or, (2) two successive measurements made at successive time intervals (Method 2). For purposes of calculating a change, the planar rotation values obtained from acceleration (RAx, RAy, RAz) and angular velocity (RGx, RGy, RGz) data may be used individually, or, averaged (e.g. RAGx=0.5*(RAx+RGx)) to obtain an averaged planar rotation.

3. Change in Sway Velocity—the Velocity Algorithm

The velocity algorithm is used when the goal is to monitor for potential falls by monitoring changes in mediolateral and anteroposterior sway velocities for the sensor when attached to a user. For the sensor secured at the waist and oriented such that the Y- and Z-axis are parallel to the projected sway path (16) (the surface, user is walking on) and perpendicular to each other, and the X-axis is perpendicular to the projected sway path (FIG. 6), displacement is calculated using the equations;

$$S^y = D * \cos\left(Py * \frac{\pi}{180}\right) \quad (23)$$

$$S^z = D * \cos\left(Pz * \frac{\pi}{180}\right) \quad (24)$$

where Py (14*b*) and Pz (14*c*) are the angles in degrees between the resultant acceleration vector 'A' (13) and the Y and Z components respectively of the resultant acceleration vector, obtained from equations (2) and (3); (15*b*) and $S^z$ (15*c*) are distance traveled in centimeters by the sensor on the Y- and Z-axis, corresponding to the mediolateral sway and anteroposterior sway respectively, and D' (15) is a vector collinear to the resultant acceleration vector 'A'. D' is calculated using the equation;

$$D = \frac{S^x}{-\cos(Px)} * \frac{180}{\pi} \quad (25)$$

where Px (14*a*) is the angle in degrees between the resultant acceleration vector 'A' and the X component of the resultant acceleration vector and is obtained from equation (1), $S^x$ (15*a*) is the perpendicular distance in centimeters between the sensor and the projected sway path (projected YZ plane) and is a constant during the measurements.

The algorithm uses the distance travelled, calculated at different times during monitoring to calculate sway velocities using the equation;

$$SV^y = \frac{\text{displacement}}{\Delta \text{time}} = \frac{S_{n-1}^y - S_n^y}{t_{n-1} - t_n} \quad (26)$$

$$SV^z = \frac{\text{displacement}}{\Delta \text{time}} = \frac{S_{n-1}^z - S_n^z}{t_{n-1} - t_n} \quad (27)$$

Mean sway velocities $MSV^y$ and $MSV^z$ in the Y- and Z-direction respectively are calculated by averaging the consecutive sway velocities obtained.

A change in the spatio-temporal parameter in this case is either (1) the difference between the most recent mean sway velocity calculated and a prior value for mean sway velocity when ΔMSV did not exceed the threshold value, or, (2) the difference between two successive calculations of mean sway velocity made at successive time intervals.

$$\Delta MSV^y MSV_1^y - MSV_2^y \quad (28)$$

$$\Delta MSV^z MSV_1^z - MSV_2^z \quad (29)$$

where $MSV_1$ and $MSV_2$ are two measurements of mean sway velocities, calculated using either method described above.

F) Actuating the Alerting Signal Module:

In this step the algorithm instructs the microcontroller to determine whether the change in the spatio-temporal parameter calculated in (E) exceeded the selected threshold value in (B). If this is not true, the algorithm loops back to step (C) to obtain a new set of acceleration and angular velocity data and repeat the succeeding steps described above (FIG. 7B). On the other hand, if the change in the spatio-temporal parameter exceeded the selected threshold value, the microcontroller is instructed to actuate the alerting signal module. The algorithm may further include instructions to concurrently actuate other alerting signal modules and/or personal safety device(s).

The microcontroller-executable instructions in the algorithms are well adapted for using the disclosed embodiments with any user requiring gait monitoring, fall prevention training including gait training and conditioned reflux training, and to prevent falls and fall-related injuries. The algorithms achieve this by allowing customization of a threshold value that is user-specific as well as body location-specific through baseline calibrations. Moreover, the algorithms are also designed to allow an user to change the threshold value manually during monitoring to increase or decrease sensitivity of the balance sensor as desired. Furthermore, as described in the embodiments, the present invention is adapted for using more than one type of alerting signal module and for concurrently using more than one type of alerting signal module; features particularly beneficial to users with hearing and visual impairments; and for deploying personal safety devices to reduce the risk of debilitating bodily injury due to a fall. In other aspects, the microcontroller-executable instructions in the algorithms may also trigger other actions including, but not limited to activating peripheral devices via wired or wireless communication and sending alerts remotely via wired or wireless communication to one or more parties such as for example, a caregiver and/or a family member.

EXAMPLE 2

Securing the Sensor to the User.

The sensor is secured to the user at the following locations:

1. Wrist: The sensor is secured around the wrist using hook-and-loop fasteners (FIG. 4A) and is oriented such that the KY plane of the MPU-6050 is parallel to the arm and the Z axis is perpendicular to the arm.

2. Lower leg: The sensor is secured around the lower leg against the calf muscle, about 10 cm below the knee using hook-and-loop fasteners (FIG. 4B). At this location, the sensor is oriented such that the Y axis is parallel to the long axis of the tibia, X axis is perpendicular to the tibia and the Z axis is perpendicular to the tibia, projecting away from the user.

3 Waist: The sensor is secured on a belt at the waist, below the navel, close to the body's natural center of gravity (CoG) using hook-and-loop fasteners (FIG. 4C). At this location the sensor is oriented such that the X axis of the MPU-6050 is parallel to the long axis of the body, the Y axis is perpendicular to the long axis in the mediolateral direction and the Z axis is perpendicular to the long axis projecting in the anteroposterior direction (FIGS. 4C and 6).

EXAMPLE 3

Sensor Response to Body Movements

The ability of the postural sensor to detect body movements was established by monitoring for changes in sensor position and rotation in real-time.

1. Sensor Location—Wrist

Figure 8A:
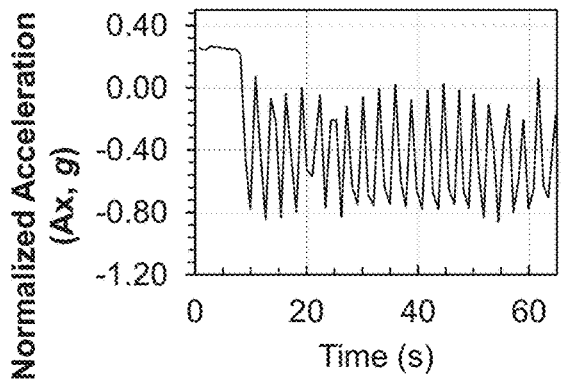
FIGS. 8A-8L show motion dependent changes to acceleration, angular velocity, rotation angle and planar rotation for the wearable postural sensor attached to a user's wrist as shown in FIG. 4A.
Figure 8D:
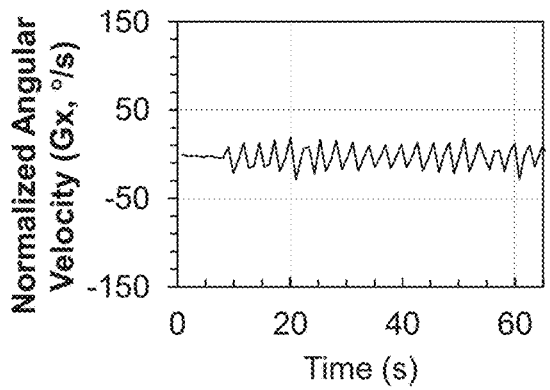
Figure 8B:
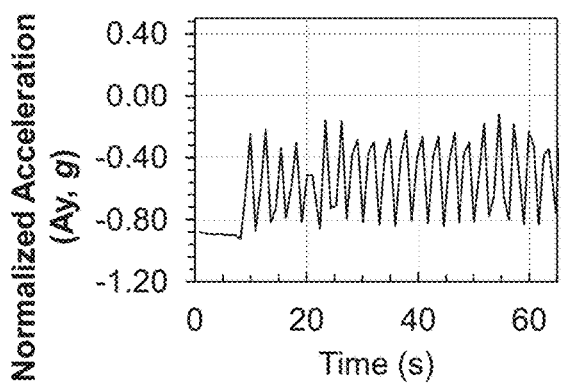
Figure 8E:
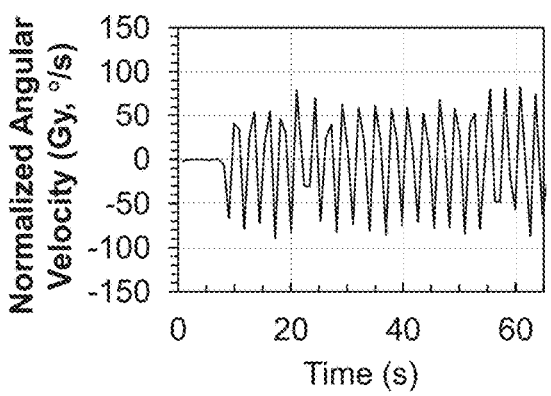
Figure 8C:
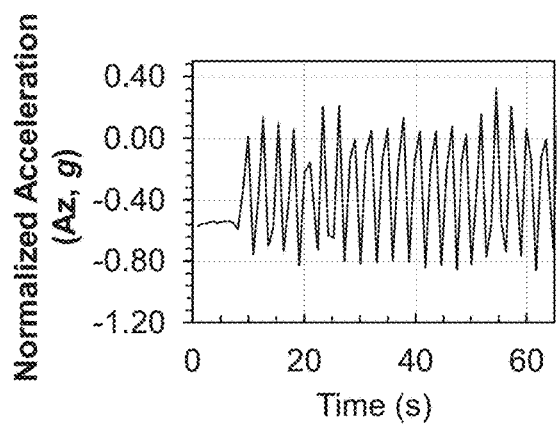
Figure 8F:
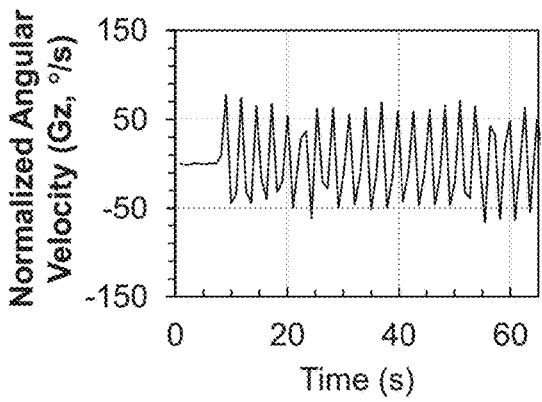
Figure 8G:
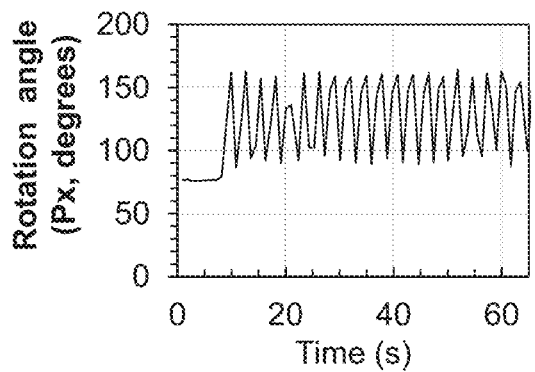
Figure 8J:
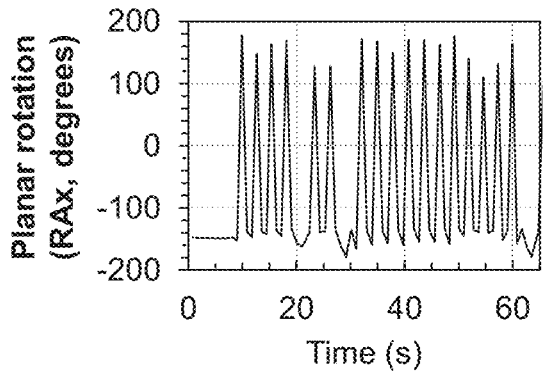
Figure 8H:
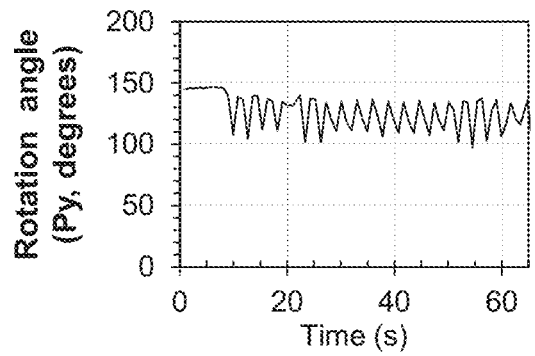
Figure 8K:
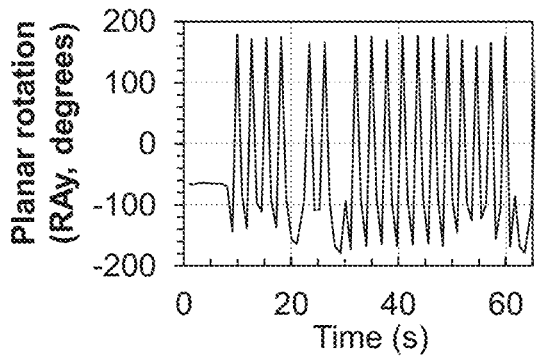
Figure 8I:
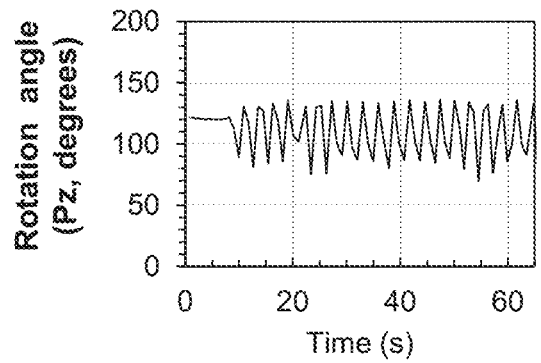
Figure 8L:
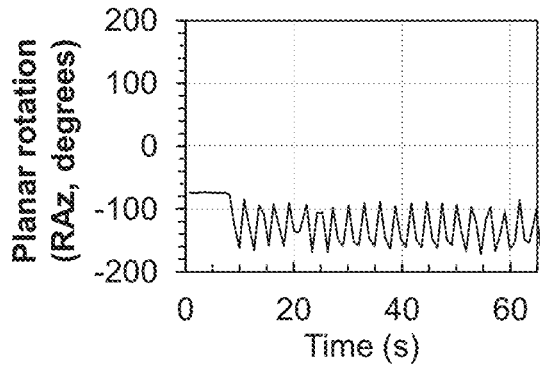
Figure 9A:
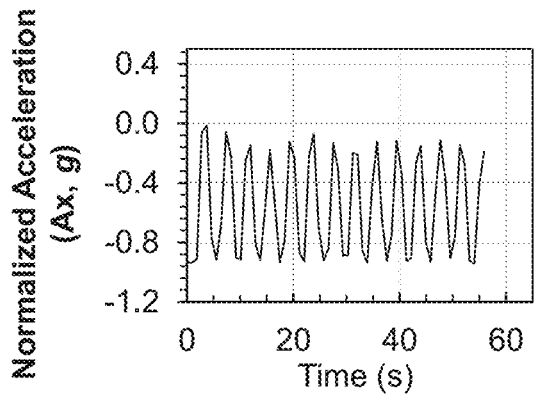
FIGS. 9A-9L show motion dependent changes to acceleration, angular velocity, rotation angle and planar rotation for the wearable postural sensor attached to a user's lower leg as shown in FIG. 4B, which is bent repetitively.
Figure 9B:
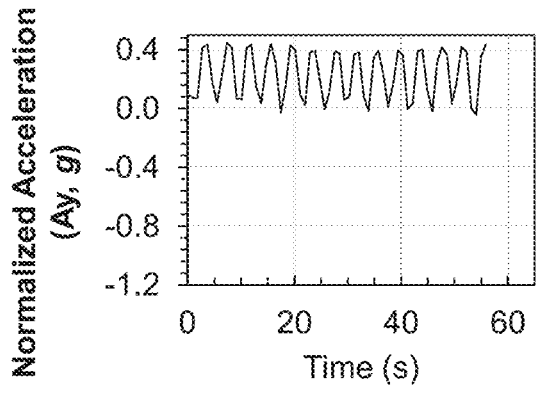
Figure 9C:
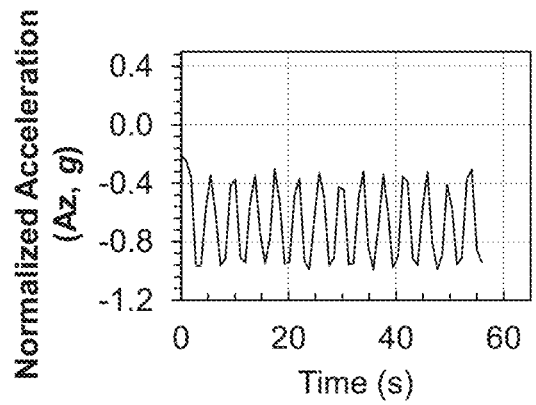
Figure 9D:
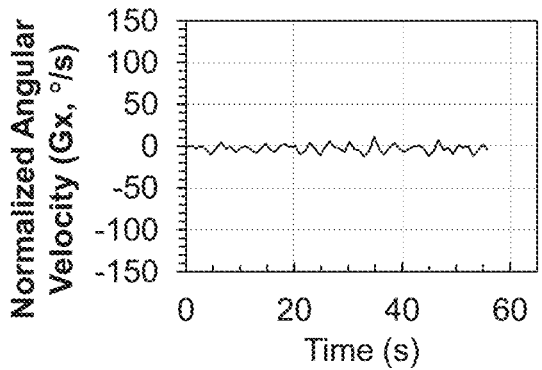
Figure 9E:
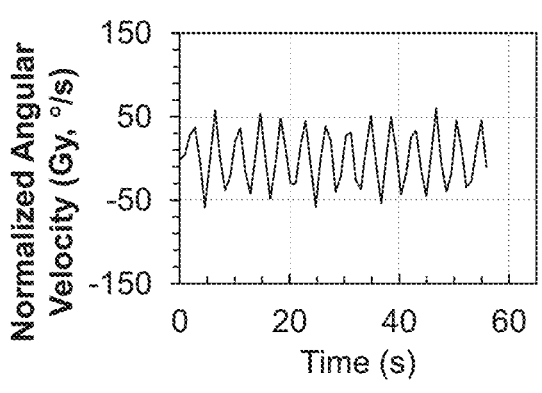
Figure 9F:
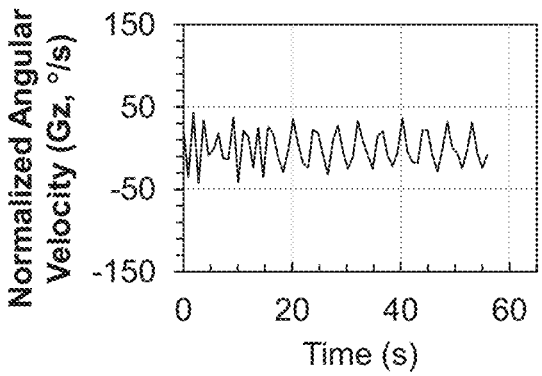
Figure 9G:
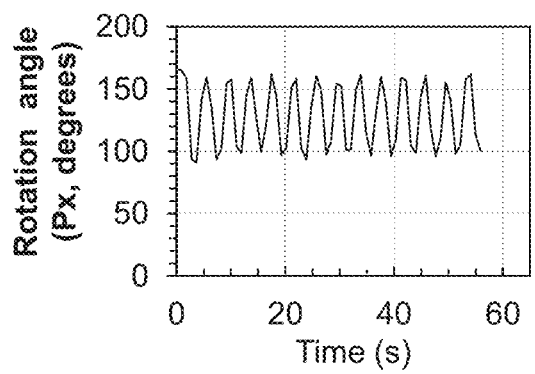
Figure 9J:
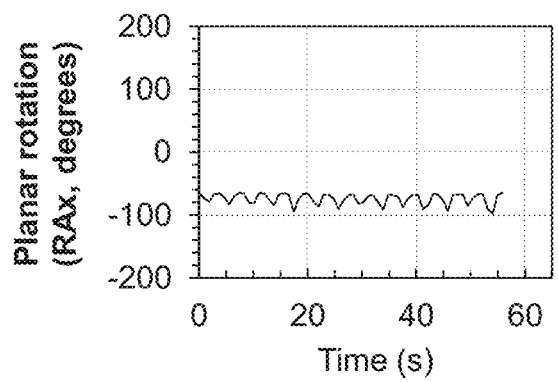
Figure 9H:
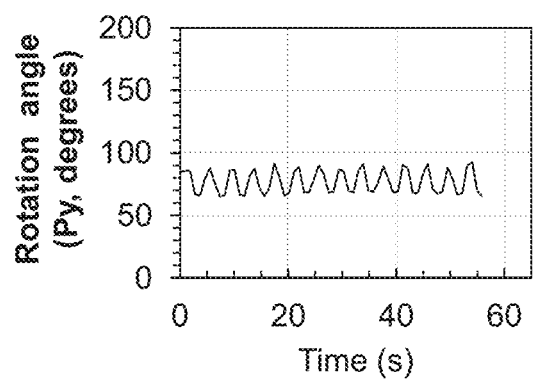
Figure 9K:
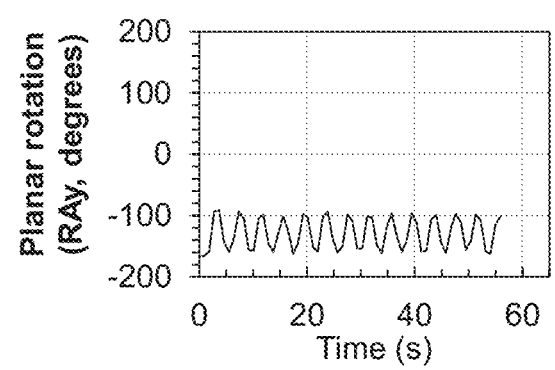
Figure 9I:
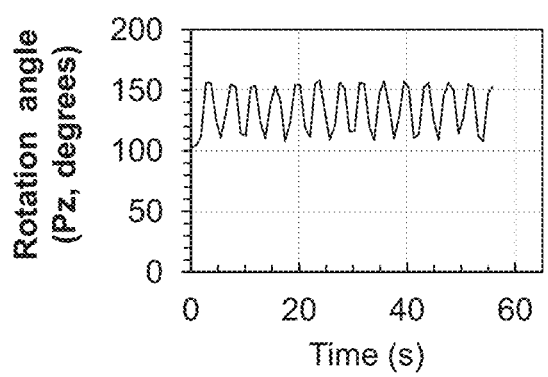
Figure 9L:
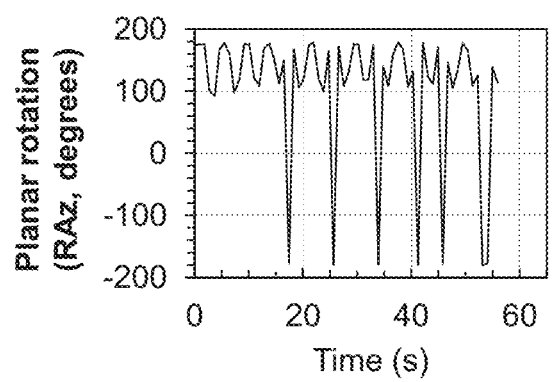
Figure 10A:
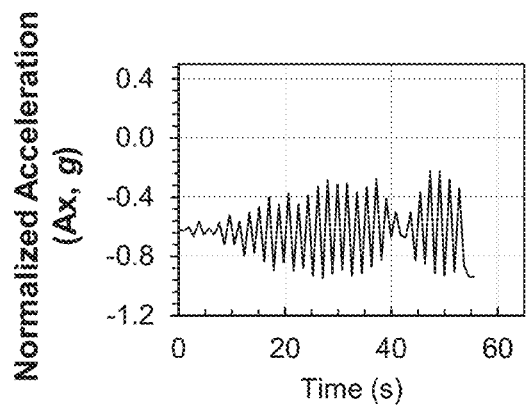
FIGS. 10A-10L show motion dependent changes to acceleration, angular velocity, rotation angle and planar rotation for the wearable postural sensor attached to a user's lower leg when bent repetitively at a faster rate than for FIGS. 9A-9L.
Figure 10B:
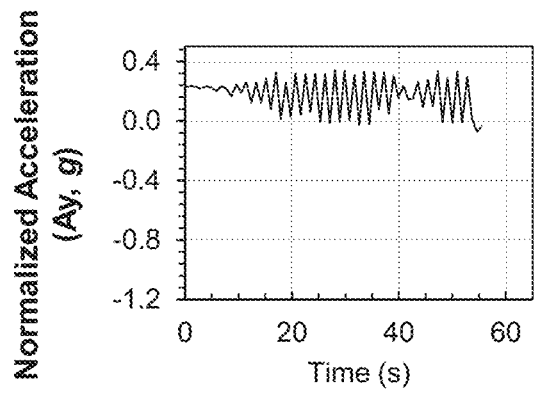
Figure 10C:
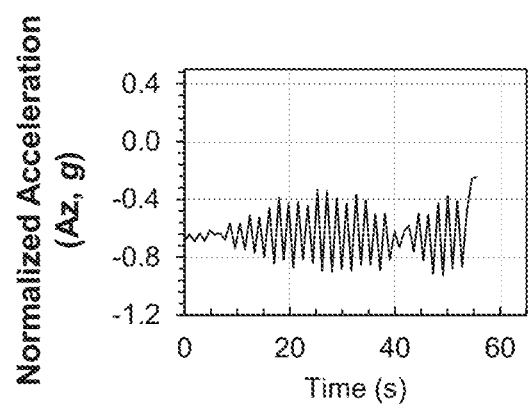
Figure 10D:
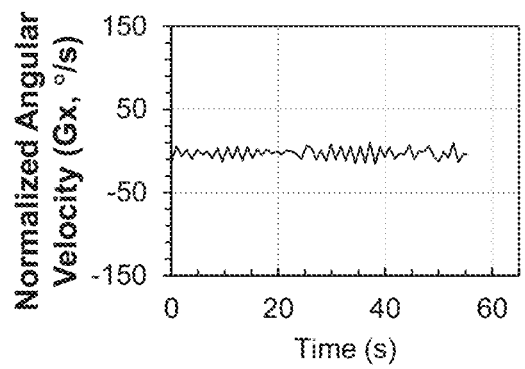
Figure 10E:
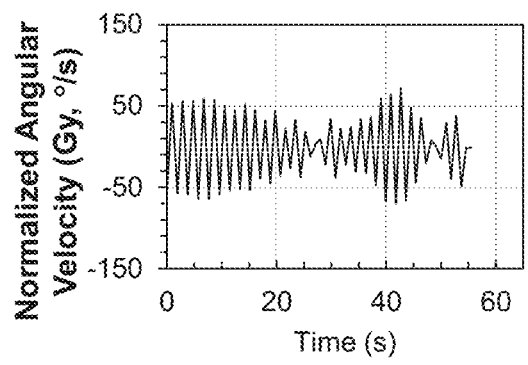
Figure 10F:
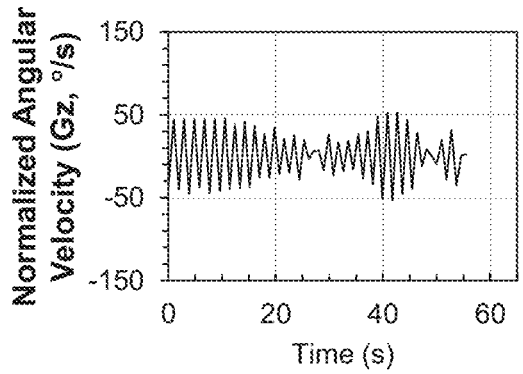
Figure 10G:
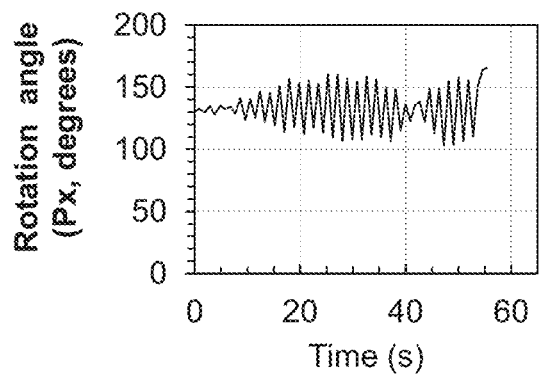
Figure 10J:
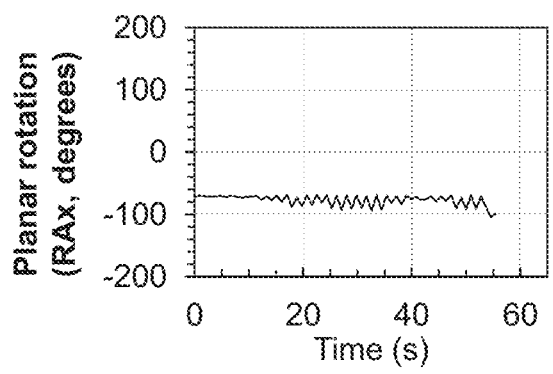
Figure 10H:
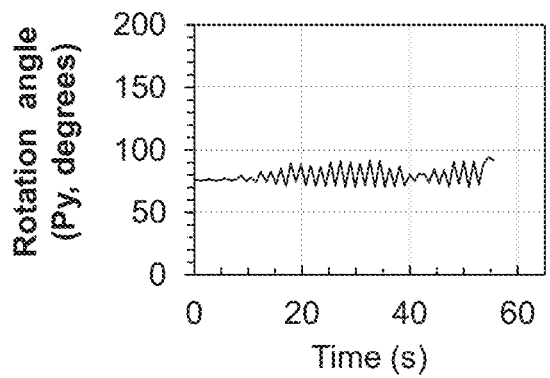
Figure 10K:
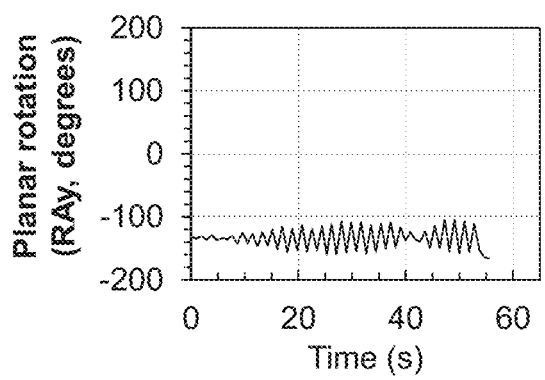
Figure 10I:
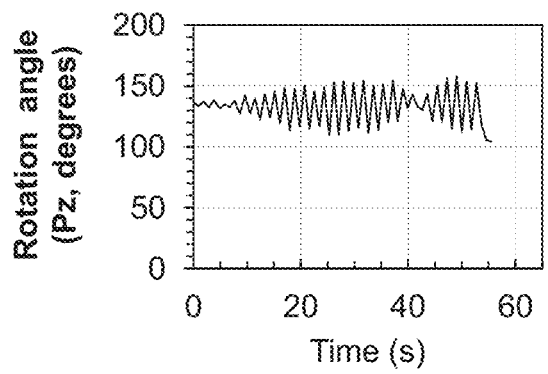
Figure 10L:
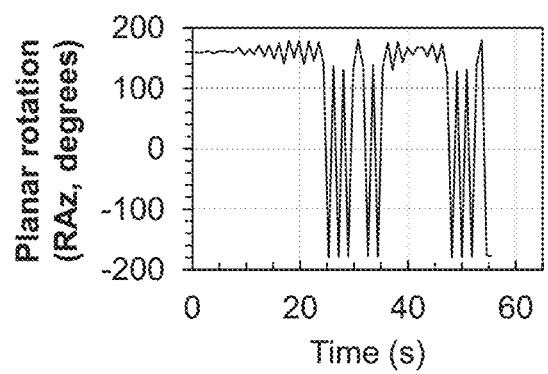

First, the sensor was secured to the wrist as shown in FIG. 4A and the arm repetitively bent at the elbow for 60 seconds. A repetitive profile characteristic of a wave pattern was evident, corresponding to changes in acceleration and angular velocity reported by MPU-6050 (FIGS. 8A-8F). The angle Px, Py and Pz between the resultant acceleration vector and its X, Y and Z components measured by the accelerometer was computed using equations (1)-(3) described above and are shown in FIGS. 8G-8I. The change in Px, Py and Pz between successive time intervals is shown in Table 2. Rotation RAx, RAy and RAz of the sensor about the X-, Y- and Z-axis (that is, rotation of the YZ, XZ and XY planes) was computed using equations (8)-(10) as described above and are shown in FIGS. 8J-8L. The change in RAx, RAy and RAz between successive time intervals is shown in Table 3.

TABLE 2

Sensor location: Wrist
Change in angle between the resultant acceleration vector and its X, Y and Z components measured by the accelerometer between successive intervals of 36 ms. Values in bold correspond to a change in angle between successive measurements that is above an absolute threshold value of 28.

| # | ΔPx | ΔPy | ΔPz |
|---|---|---|---|
| 1 | 0.7 | 1.1 | −0.9 |
| 2 | −1.2 | −0.4 | −0.3 |
| 3 | 0.1 | 0.9 | −0.8 |
| 4 | 0.1 | −0.6 | 0.7 |
| 5 | 0.3 | 0.7 | −0.5 |
| 6 | 0.3 | 0.2 | −0.1 |
| 7 | 0.0 | −0.3 | 0.4 |
| 8 | 2.3 | −0.4 | 1.5 |
| 9 | 43.4 | −7.3 | −8.9 |
| 10 | 39.9 | −30.8 | −23.5 |
| 11 | −76.1 | 31.2 | 41.4 |
| 12 | 35.3 | −3.0 | −13.4 |
| 13 | 41.6 | −31.4 | −36.1 |
| 14 | −69.2 | 34.7 | 49.2 |
| 15 | 9.9 | 0.5 | −3.5 |
| 16 | 53.5 | −27.8 | −43.1 |
| 17 | −65.1 | 24.9 | 49.2 |
| 18 | 28.5 | −1.6 | −13.9 |
| 19 | 38.1 | −24.3 | −33.3 |
| 20 | −68.7 | 23.7 | 49.5 |
| 21 | 43.6 | −2.8 | −28.9 |
| 22 | 2.9 | −0.6 | −4.7 |
| 23 | −44.1 | 8.4 | 28.5 |
| 24 | 69.1 | −38.1 | −54.7 |
| 25 | −59.0 | 36.0 | 54.2 |
| 26 | −0.5 | −1.2 | 1.5 |
| 27 | 60.2 | −35.2 | −55.2 |
| 28 | −66.2 | 33.3 | 58.9 |
| 29 | 51.6 | −14.0 | −34.4 |
| 30 | 11.5 | −9.3 | −10.2 |
| 31 | −66.3 | 24.0 | 44.5 |
| 32 | 58.3 | −16.9 | −38.0 |
| 33 | 7.2 | −6.5 | −10.0 |
| 34 | −67.7 | 24.1 | 47.6 |
| 35 | 56.4 | −14.7 | −33.4 |
| 36 | 12.3 | −10.5 | −15.3 |
| 37 | −70.1 | 26.1 | 47.8 |
| 38 | 54.9 | −13.7 | −30.1 |
| 39 | 17.3 | −16.6 | −22.7 |
| 40 | −67.3 | 28.8 | 54.0 |
| 41 | 52.9 | −14.1 | −33.7 |
| 42 | 13.9 | −11.9 | −14.2 |
| 43 | −69.9 | 25.3 | 48.8 |
| 44 | 57.0 | −15.7 | −32.2 |
| 45 | 13.0 | −9.8 | −16.5 |
| 46 | −72.0 | 26.5 | 47.6 |
| 47 | 56.1 | −14.0 | −30.4 |
| 48 | 16.7 | −13.9 | −19.4 |
| 49 | −70.8 | 26.2 | 51.5 |
| 50 | 57.8 | −14.9 | −34.8 |
| 51 | 10.0 | −7.5 | −12.8 |
| 52 | −66.5 | 23.2 | 46.8 |
| 53 | 38.9 | −6.3 | −19.6 |
| 54 | 33.3 | −26.3 | −35.8 |
| 55 | −68.9 | 33.0 | 54.6 |
| 56 | 19.2 | −1.1 | −8.4 |
| 57 | 43.9 | −36.6 | −56.2 |
| 58 | −46.6 | 38.0 | 56.7 |
| 59 | −16.3 | 1.9 | 5.7 |
| 60 | 65.4 | −34.7 | −56.3 |
| 61 | −24.4 | 24.5 | 33.3 |
| 62 | −36.3 | 9.3 | 22.5 |
| 63 | 62.4 | −29.7 | −46.2 |

TABLE 2-continued

Sensor location: Wrist
Change in angle between the resultant acceleration vector and its X, Y and Z components measured by the accelerometer between successive intervals of 36 ms. Values in bold correspond to a change in angle between successive measurements that is above an absolute threshold value of 28.

| # | ΔPx | ΔPy | ΔPz |
|---|---|---|---|
| 64 | −11.3 | 9.6 | 14.9 |
| 65 | −64.2 | 17.6 | 35.5 |

TABLE 3

Sensor location: Wrist
Change in sensor rotation about the X-, Y- and Z-axis between successive intervals of 100 ms. Values in bold correspond to a change in rotation between successive measurements that is above an absolute threshold value of 28.

| # | ΔRAx | ΔRAy | ΔRAz |
|---|---|---|---|
| 1 | −1.0 | −0.6 | −1.0 |
| 2 | 1.4 | 2.1 | −0.1 |
| 3 | −0.3 | 0.3 | −0.9 |
| 4 | 0.0 | −0.7 | 0.7 |
| 5 | −0.5 | −0.2 | −0.6 |
| 6 | −0.3 | −0.4 | −0.1 |
| 7 | 0.1 | −0.2 | 0.4 |
| 8 | −2.5 | −4.6 | 1.2 |
| 9 | −48.5 | −74.0 | −5.1 |
| 10 | −36.7 | 323.3 | 330.5 |
| 11 | 77.3 | −263.5 | −317.0 |
| 12 | −41.0 | −54.4 | −8.2 |
| 13 | −39.4 | 309.6 | 296.3 |
| 14 | 70.4 | −266.8 | −288.4 |
| 15 | −12.3 | −15.7 | −2.3 |
| 16 | −50.7 | 284.9 | 305.8 |
| 17 | 65.1 | −266.4 | −301.0 |
| 18 | −32.8 | −43.2 | −8.6 |
| 19 | −33.4 | 311.8 | 314.2 |
| 20 | 69.1 | −265.6 | −303.2 |
| 21 | −46.0 | −67.6 | −22.3 |
| 22 | −1.8 | −6.7 | −5.9 |
| 23 | 44.7 | 70.7 | 23.1 |
| 24 | −75.1 | 258.9 | 268.5 |
| 25 | 61.9 | −273.9 | −267.9 |
| 26 | 0.3 | 1.2 | 1.4 |
| 27 | −62.7 | 273.2 | 266.3 |
| 28 | 70.2 | −264.1 | −263.3 |
| 29 | −50.7 | −69.4 | −25.3 |
| 30 | −9.9 | −11.9 | −19.0 |
| 31 | 65.2 | 85.9 | 43.9 |
| 32 | −57.9 | −78.5 | −30.8 |
| 33 | −6.7 | 348.8 | 337.2 |
| 34 | 67.8 | −267.1 | −306.9 |
| 35 | −57.8 | −76.7 | −24.1 |
| 36 | −11.1 | 342.6 | 327.5 |
| 37 | 70.9 | −263.9 | −304.3 |
| 38 | −57.5 | −75.5 | −20.4 |
| 39 | −17.4 | 334.3 | 306.9 |
| 40 | 68.2 | −265.6 | −285.1 |
| 41 | −53.1 | −71.8 | −24.5 |
| 42 | −12.5 | 343.7 | 329.9 |
| 43 | 69.8 | −267.6 | −304.6 |
| 44 | −59.3 | −73.7 | −19.9 |
| 45 | −10.6 | 341.4 | 324.7 |
| 46 | 72.8 | −264.9 | −305.9 |
| 47 | −59.2 | −75.2 | −19.5 |
| 48 | −14.9 | 337.8 | 318.0 |
| 49 | 71.3 | −265.4 | −296.8 |
| 50 | −59.3 | −76.0 | −24.1 |
| 51 | −8.1 | 345.5 | 333.9 |
| 52 | 65.8 | −271.1 | −310.7 |
| 53 | −43.8 | −53.8 | −10.4 |
| 54 | −31.3 | 316.1 | 284.7 |
| 55 | 70.4 | −267.1 | −274.9 |
| 56 | −23.5 | −27.7 | −4.4 |

TABLE 3-continued

Sensor location: Wrist
Change in sensor rotation about the X-, Y- and Z-
axis between successive intervals of 100 ms. Values in bold
correspond to a change in rotation between successive
measurements that is above an absolute threshold value of 28.

| # | ΔRAx | ΔRAy | ΔRAz |
|---|---|---|---|
| 57 | −51.3 | 284.9 | 250.0 |
| 58 | 54.5 | −281.7 | −250.4 |
| 59 | 20.2 | 23.9 | 2.5 |
| 60 | −69.6 | 263.7 | 269.4 |
| 61 | 26.7 | −321.2 | −283.2 |
| 62 | 36.4 | 50.5 | 14.0 |
| 63 | −59.4 | 280.5 | 302.3 |
| 64 | 10.0 | −343.7 | −322.6 |
| 65 | 67.2 | 82.1 | 23.7 |

2. Sensor Location—Lower Leg

The sensor was attached at the lower leg as shown in FIG. 4B, and repetitively bent at the knee from 180° to 90° angle in a relatively slow pace (FIGS. 9A-9L, Tables 4 and 5) or fast pace (FIGS. 10A-10L, Tables 6 and 7) and the various parameters calculated as described for the wrist location. As seen from these data, a faster paced leg movement elicits a higher frequency wave pattern (FIGS. 10A-10L compared to the slower leg movement (FIGS. 9A-9L).

TABLE 4

Sensor location: Lower leg, Slow leg movements
Change in angle between the resultant acceleration vector and its X, Y and
Z components measured by the accelerometer between successive intervals
of 100 ms. Values in bold correspond to a change in angle between
successive measurements that is above an absolute threshold value of 30.

| # | ΔPx | ΔPy | ΔPz |
|---|---|---|---|
| 1 | −1.5 | 1.5 | 2.1 |
| 2 | −6.6 | 0.0 | 6.8 |
| 3 | −64.6 | −18.8 | 45.3 |
| 4 | −2.8 | −1.2 | −0.9 |
| 5 | 51.3 | 13.5 | −29.9 |
| 6 | 17.1 | 8.4 | −15.2 |
| 7 | −23.7 | −11.8 | 20.4 |
| 8 | −42.3 | −10.7 | 23.9 |
| 9 | 9.5 | 0.9 | −2.4 |
| 10 | 52.2 | 20.0 | −37.8 |
| 11 | 2.6 | 0.4 | −2.5 |
| 12 | −53.5 | −20.1 | 39.9 |
| 13 | −6.0 | −0.8 | 2.0 |
| 14 | 47.5 | 15.6 | −31.0 |
| 15 | 13.9 | 6.8 | −12.5 |
| 16 | −33.4 | −15.6 | 28.1 |
| 17 | −26.3 | −6.9 | 14.7 |
| 18 | 22.7 | 6.3 | −11.7 |
| 19 | 39.7 | 19.9 | −33.8 |
| 20 | −17.4 | −10.7 | 15.9 |
| 21 | −47.8 | −15.0 | 31.0 |
| 22 | 5.7 | 1.7 | −0.8 |
| 23 | 48.0 | 17.1 | −35.1 |
| 24 | 7.8 | 4.0 | −7.2 |
| 25 | −56.0 | −20.2 | 43.2 |
| 26 | −8.7 | 0.0 | 3.3 |
| 27 | 41.8 | 10.2 | −25.8 |
| 28 | 25.2 | 11.6 | −22.9 |
| 29 | −11.5 | −7.2 | 10.6 |
| 30 | −51.8 | −14.8 | 36.9 |
| 31 | 10.7 | 0.7 | −5.1 |
| 32 | 46.2 | 17.6 | −36.1 |
| 33 | −1.2 | −1.0 | 1.0 |
| 34 | −51.9 | −16.0 | 39.8 |
| 35 | 0.8 | −0.9 | −1.3 |
| 36 | 47.8 | 16.8 | −35.2 |
| 37 | 11.6 | 5.7 | −11.2 |
| 38 | −45.9 | −21.0 | 38.0 |
| 39 | −18.7 | −1.4 | 10.6 |
| 40 | 34.2 | 7.8 | −21.4 |
| 41 | 29.1 | 12.9 | −25.9 |
| 42 | −19.8 | −9.5 | 18.0 |
| 43 | −43.6 | −11.6 | 29.0 |
| 44 | 12.2 | 1.2 | −5.6 |
| 45 | 50.7 | 20.9 | −40.8 |
| 46 | −2.5 | −2.2 | 2.4 |
| 47 | −51.7 | −20.4 | 39.4 |
| 48 | −6.7 | 0.0 | 3.4 |
| 49 | 45.7 | 14.8 | −31.1 |
| 50 | 16.7 | 8.8 | −15.7 |
| 51 | −42.3 | −19.9 | 35.9 |
| 52 | −22.4 | −4.2 | 11.3 |
| 53 | 14.5 | 2.2 | −6.2 |
| 54 | 45.1 | 18.7 | −35.9 |
| 55 | −14.2 | −8.6 | 12.3 |
| 56 | −43.6 | −12.8 | 28.7 |
| 57 | 7.7 | 1.3 | −2.7 |
| 58 | 52.3 | 22.2 | −40.4 |
| 59 | 4.0 | 2.3 | −4.2 |
| 60 | −48.4 | −22.8 | 40.1 |
| 61 | −13.2 | −4.2 | 5.0 |
| 62 | 43.5 | 15.5 | −28.4 |
| 63 | 19.7 | 11.9 | −18.4 |
| 64 | −24.8 | −14.6 | 22.5 |
| 65 | −39.0 | −11.1 | 26.0 |
| 66 | 20.0 | 5.3 | −10.5 |

TABLE 5

Sensor location: Lower leg, Slow leg movements
Change in sensor rotation about the X-, Y- and Z-
axis between successive intervals of 100 ms. Values in
bold correspond to a change in rotation between successive
measurements that is above an absolute threshold value of 30.

| # | ΔRAx | ΔRAy | ΔRAz |
|---|---|---|---|
| 1 | 1.4 | 2.1 | −8.3 |
| 2 | −0.1 | 6.8 | −4.9 |
| 3 | −76.5 | 64.7 | 11.6 |
| 4 | −7.0 | 3.0 | 1.2 |
| 5 | 74.8 | −52.6 | −6.5 |
| 6 | 10.7 | −15.9 | −10.9 |
| 7 | −16.3 | 21.9 | 13.7 |
| 8 | −63.4 | 43.8 | 4.4 |
| 9 | 20.9 | −10.4 | −0.3 |
| 10 | 57.1 | −51.2 | −15.2 |
| 11 | 0.5 | −2.5 | −0.0 |
| 12 | −55.2 | 52.5 | 15.1 |
| 13 | −12.4 | 6.5 | 0.3 |
| 14 | 60.9 | −47.7 | −8.9 |
| 15 | 8.4 | −12.9 | −9.9 |
| 16 | −25.1 | 31.4 | 16.1 |
| 17 | −40.7 | 27.4 | 2.9 |
| 18 | 37.7 | −23.7 | −3.1 |
| 19 | −327.9 | −37.8 | −26.9 |
| 20 | 347.4 | 16.2 | 21.0 |
| 21 | −62.8 | 48.2 | 8.5 |
| 22 | 13.5 | −6.1 | −1.3 |
| 23 | 54.2 | −47.4 | −12.1 |
| 24 | 4.6 | −7.4 | −7.2 |
| 25 | −58.5 | 55.1 | 18.4 |
| 26 | −20.5 | 9.4 | −0.5 |
| 27 | 64.9 | −42.7 | −5.3 |
| 28 | −344.3 | −23.9 | −16.9 |
| 29 | 351.7 | 10.8 | 14.3 |
| 30 | −63.2 | 51.9 | 8.3 |
| 31 | 21.7 | −11.4 | 0.2 |

TABLE 5-continued

Sensor location: Lower leg, Slow leg movements
Change in sensor rotation about the X-, Y- and Z-
axis between successive intervals of 100 ms. Values in
bold correspond to a change in rotation between successive
measurements that is above an absolute threshold value of 30.

| # | ΔRAx | ΔRAy | ΔRAz |
|---|---|---|---|
| 32 | 45.7 | −45.0 | −14.1 |
| 33 | −1.1 | 1.0 | 1.8 |
| 34 | −56.6 | 51.5 | 11.1 |
| 35 | 0.6 | −0.9 | 1.0 |
| 36 | 55.5 | −47.2 | −12.6 |
| 37 | −353.6 | −11.3 | −12.2 |
| 38 | 320.2 | 44.2 | 25.1 |
| 39 | −33.8 | 19.9 | −0.7 |
| 40 | 52.8 | −35.1 | −3.4 |
| 41 | 19.1 | −27.6 | −15.9 |
| 42 | −12.2 | 18.7 | 13.8 |
| 43 | −60.3 | 44.3 | 5.9 |
| 44 | 25.4 | −13.0 | −0.1 |
| 45 | −311.8 | −49.3 | −22.5 |
| 46 | 357.6 | 2.5 | 5.6 |
| 47 | −53.6 | 50.5 | 18.2 |
| 48 | −13.3 | 7.2 | −0.6 |
| 49 | 59.9 | −45.7 | −9.6 |
| 50 | −349.4 | −16.1 | −16.8 |
| 51 | 324.9 | 40.7 | 25.1 |
| 52 | −40.9 | 23.6 | 1.7 |
| 53 | 29.6 | −15.5 | −0.8 |
| 54 | 43.0 | −43.7 | −17.4 |
| 55 | −11.0 | 12.9 | 12.4 |
| 56 | −57.6 | 44.2 | 6.4 |
| 57 | 16.4 | −8.2 | −0.6 |
| 58 | −305.5 | −51.1 | −23.2 |
| 59 | 2.4 | −4.1 | −7.5 |
| 60 | 316.4 | 46.8 | 30.1 |
| 61 | −25.5 | 13.8 | 2.7 |
| 62 | 55.4 | −43.5 | −9.4 |
| 63 | −346.0 | −18.9 | −25.4 |
| 64 | 341.8 | 23.5 | 27.9 |
| 65 | −51.0 | 39.5 | 5.1 |
| 66 | 34.9 | −20.8 | −2.8 |

TABLE 6

Sensor location: Lower leg, Faster leg movements
Change in angle between the resultant acceleration vector and its X, Y and
Z components measured by the accelerometer between successive intervals
of 100 ms. Values in bold correspond to a change in angle between
successive measurements that is above an absolute threshold value of 30.

| # | ΔPx | ΔPy | ΔPz |
|---|---|---|---|
| 1 | 2.0 | −1.2 | −2.5 |
| 2 | −3.0 | 0.6 | 3.2 |
| 3 | 5.3 | 1.0 | −4.8 |
| 4 | −7.0 | −1.4 | 6.3 |
| 5 | 7.1 | 0.4 | −6.9 |
| 6 | −2.7 | 1.6 | 3.4 |
| 7 | 2.0 | −1.7 | −2.7 |
| 8 | −5.3 | 0.4 | 5.5 |
| 9 | 12.1 | 3.7 | −10.6 |
| 10 | −17.4 | −4.9 | 15.2 |
| 11 | 16.6 | 3.4 | −14.9 |
| 12 | −14.6 | −3.8 | 12.8 |
| 13 | 20.9 | 8.0 | −17.7 |
| 14 | −24.6 | −8.2 | 21.2 |
| 15 | 23.1 | 8.1 | −19.7 |
| 16 | −26.1 | −9.6 | 21.6 |
| 17 | 31.8 | 12.3 | −26.7 |
| 18 | −36.9 | −14.4 | 29.8 |
| 19 | 42.6 | 18.5 | −35.0 |
| 20 | −38.7 | −14.5 | 34.1 |
| 21 | 35.5 | 13.6 | −30.9 |
| 22 | −41.2 | −16.9 | 33.8 |
| 23 | 42.9 | 16.3 | −35.6 |

TABLE 6-continued

Sensor location: Lower leg, Faster leg movements
Change in angle between the resultant acceleration vector and its X, Y and
Z components measured by the accelerometer between successive intervals
of 100 ms. Values in bold correspond to a change in angle between
successive measurements that is above an absolute threshold value of 30.

| # | ΔPx | ΔPy | ΔPz |
|---|---|---|---|
| 24 | −37.6 | −16.3 | 31.0 |
| 25 | 35.7 | 15.0 | −29.3 |
| 26 | −39.7 | −15.3 | 32.5 |
| 27 | 47.0 | 19.2 | −39.6 |
| 28 | −51.0 | −18.8 | 43.1 |
| 29 | 50.8 | 19.5 | −42.9 |
| 30 | −53.7 | −20.8 | 43.9 |
| 31 | 50.4 | 20.1 | −40.6 |
| 32 | −48.6 | −20.0 | 39.5 |
| 33 | 46.1 | 19.3 | −36.9 |
| 34 | −46.4 | −17.7 | 38.4 |
| 35 | 50.5 | 19.6 | −42.5 |
| 36 | −46.5 | −21.1 | 38.4 |
| 37 | 44.2 | 20.8 | −36.1 |
| 38 | −46.3 | −20.9 | 37.6 |
| 39 | 39.9 | 15.3 | −31.6 |
| 40 | −43.4 | −15.0 | 34.3 |
| 41 | 42.2 | 16.3 | −33.0 |
| 42 | −33.4 | −15.5 | 26.7 |
| 43 | 21.2 | 9.0 | −15.9 |
| 44 | −13.7 | −5.4 | 11.2 |
| 45 | 13.1 | 6.1 | −10.3 |
| 46 | 2.3 | −0.6 | −2.5 |
| 47 | −16.1 | −6.4 | 13.0 |
| 48 | 26.5 | 10.6 | −22.4 |
| 49 | −35.5 | −11.6 | 29.8 |
| 50 | 35.7 | 11.2 | −30.2 |
| 51 | −45.7 | −13.7 | 35.6 |
| 52 | 51.8 | 20.0 | −41.1 |
| 53 | −51.7 | −17.4 | 43.1 |
| 54 | 54.8 | 17.7 | −46.2 |
| 55 | −51.2 | −20.4 | 41.7 |
| 56 | 48.8 | 20.3 | −39.3 |
| 57 | −45.1 | −18.2 | 38.1 |
| 58 | 40.7 | 16.7 | −33.6 |
| 59 | 12.9 | 5.0 | −13.5 |
| 60 | 1.4 | −2.0 | −1.0 |
| 61 | 0.8 | −2.2 | −0.7 |
| 62 | 3.0 | 0.9 | −3.0 |
| 63 | 0.1 | 1.7 | −0.4 |
| 64 | −0.1 | 2.4 | −0.8 |
| 65 | 1.8 | −6.5 | −0.7 |
| 66 | −0.2 | −0.6 | 0.1 |

TABLE 7

Sensor location: Lower leg, Faster leg movements
Change in sensor rotation about the X-, Y- and Z-
axis between successive intervals of 100 ms. Values in bold
correspond to a change in rotation between successive
measurements that is above an absolute threshold value of 30.

| # | ΔRAx | ΔRAy | ΔRAz |
|---|---|---|---|
| 1 | −0.8 | −2.4 | 2.2 |
| 2 | −0.4 | 3.3 | −1.7 |
| 3 | 3.1 | −5.4 | 0.3 |
| 4 | −4.4 | 7.1 | −0.2 |
| 5 | 3.2 | −7.5 | 1.7 |
| 6 | 1.1 | 3.2 | −3.1 |
| 7 | −1.5 | −2.5 | 3.0 |
| 8 | −1.4 | 5.7 | −2.2 |
| 9 | 8.1 | −11.9 | −1.6 |
| 10 | −12.4 | 17.2 | 1.8 |
| 11 | 10.4 | −16.8 | 0.3 |
| 12 | −9.8 | 14.5 | 0.7 |
| 13 | 15.8 | −20.1 | −5.5 |
| 14 | −18.2 | 24.0 | 4.9 |
| 15 | 18.0 | −22.4 | −5.3 |

TABLE 7-continued

Sensor location: Lower leg, Faster leg movements
Change in sensor rotation about the X-, Y- and Z-
axis between successive intervals of 100 ms. Values in bold
correspond to a change in rotation between successive
measurements that is above an absolute threshold value of 30.

| # | ΔRAx | ΔRAy | ΔRAz |
|---|---|---|---|
| 16 | −22.2 | 25.4 | 6.4 |
| 17 | 25.8 | −30.7 | −9.7 |
| 18 | −33.7 | 35.7 | 11.2 |
| 19 | 38.3 | −41.1 | −19.1 |
| 20 | −28.7 | 37.6 | 15.3 |
| 21 | 27.7 | −34.4 | −13.6 |
| 22 | −38.5 | 40.0 | 16.4 |
| 23 | 37.8 | −41.7 | −14.6 |
| 24 | −32.3 | 36.0 | 15.6 |
| 25 | 30.8 | −34.3 | −13.1 |
| 26 | −35.2 | 38.5 | 12.6 |
| 27 | −320.4 | −45.6 | −21.5 |
| 28 | 316.0 | 49.9 | 20.5 |
| 29 | −315.3 | −49.7 | −22.5 |
| 30 | 308.8 | 52.6 | 23.6 |
| 31 | −309.5 | −49.3 | −21.4 |
| 32 | 312.4 | 47.5 | 21.6 |
| 33 | 46.8 | −44.9 | −19.8 |
| 34 | −44.9 | 45.4 | 18.0 |
| 35 | −313.0 | −49.6 | −23.2 |
| 36 | 316.4 | 45.2 | 25.3 |
| 37 | −316.7 | −42.8 | −24.2 |
| 38 | 313.9 | 45.0 | 24.0 |
| 39 | 39.8 | −38.9 | −12.3 |
| 40 | −44.5 | 42.6 | 11.5 |
| 41 | 45.9 | −41.3 | −14.3 |
| 42 | −33.3 | 32.1 | 14.8 |
| 43 | 23.8 | −20.6 | −6.6 |
| 44 | −12.6 | 13.2 | 3.9 |
| 45 | 13.4 | −12.5 | −5.0 |
| 46 | −0.3 | −2.5 | 1.5 |
| 47 | −14.8 | 15.5 | 4.5 |
| 48 | 21.1 | −25.4 | −8.5 |
| 49 | −30.5 | 34.8 | 8.1 |
| 50 | 30.0 | −35.1 | −7.2 |
| 51 | −49.2 | 45.4 | 8.7 |
| 52 | −303.5 | −51.0 | −21.1 |
| 53 | 307.4 | 51.1 | 18.4 |
| 54 | −307.0 | −54.2 | −19.4 |
| 55 | 309.7 | 50.2 | 22.6 |
| 56 | −309.8 | −47.8 | −22.1 |
| 57 | 318.4 | 44.1 | 20.3 |
| 58 | 40.0 | −39.7 | −17.1 |
| 59 | −354.8 | −13.4 | −16.9 |
| 60 | −2.1 | −1.0 | 6.8 |
| 61 | 357.7 | −0.7 | 8.7 |
| 62 | −359.0 | −3.0 | −4.9 |
| 63 | 1.8 | −0.4 | −9.4 |
| 64 | 2.5 | −0.8 | −13.8 |
| 65 | 353.4 | −0.7 | 37.2 |
| 66 | −0.7 | 0.1 | 3.8 |

3. Sensor Location—Waist

Figure 11A:
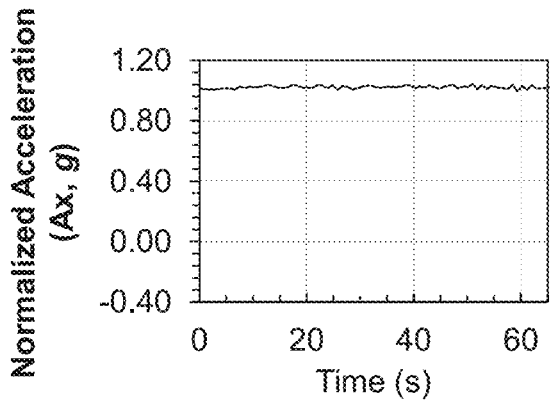
FIGS. 11A-11L show motion dependent changes to acceleration, angular velocity, rotation angle and planar rotation for the wearable postural sensor attached to a user's waist as shown in FIG. 4C.
Figure 11D:
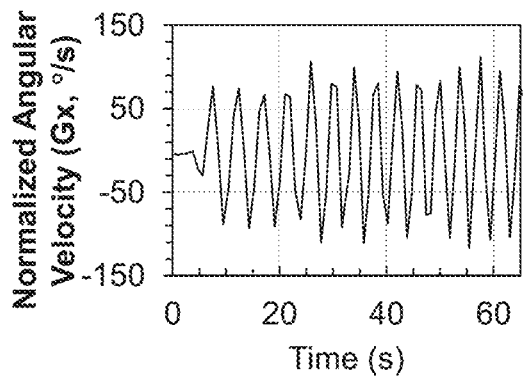
Figure 11B:
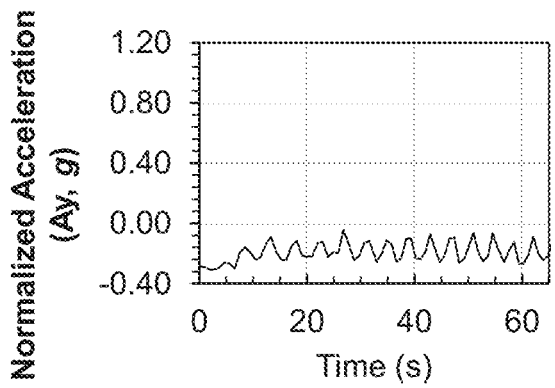
Figure 11E:
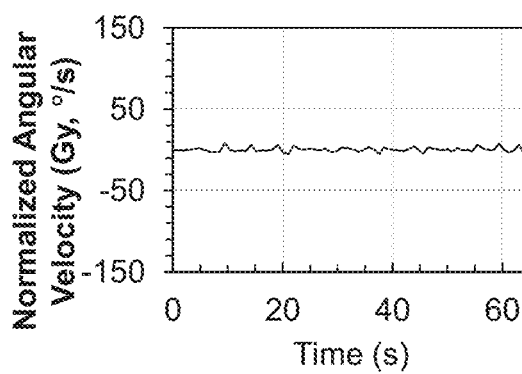
Figure 11C:
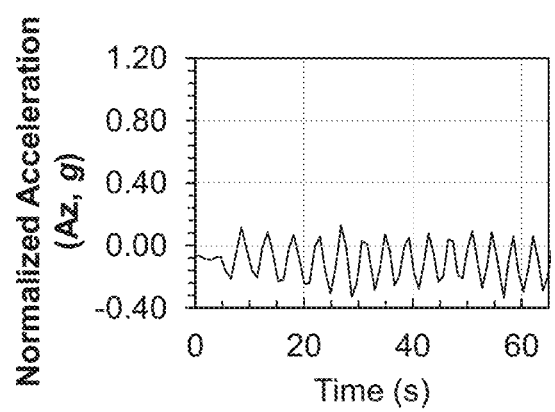
Figure 11F:
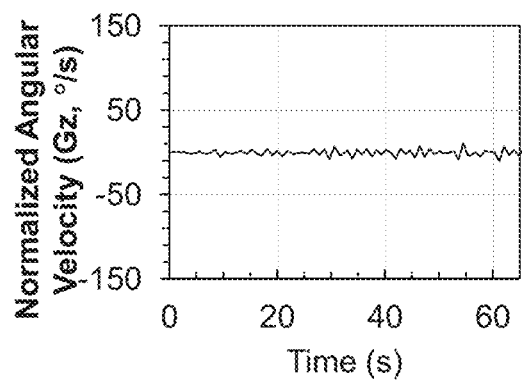
Figure 11G:
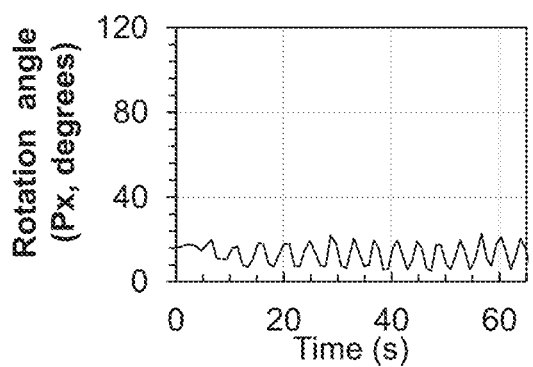
Figure 11J:
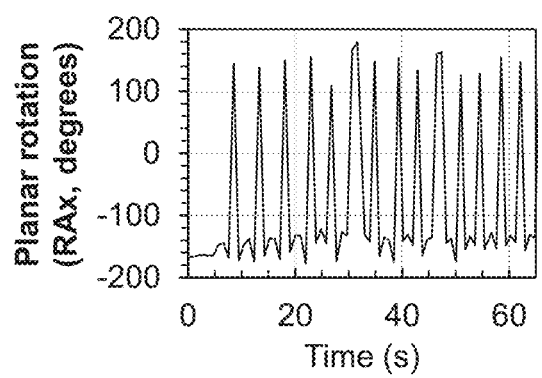
Figure 11H:
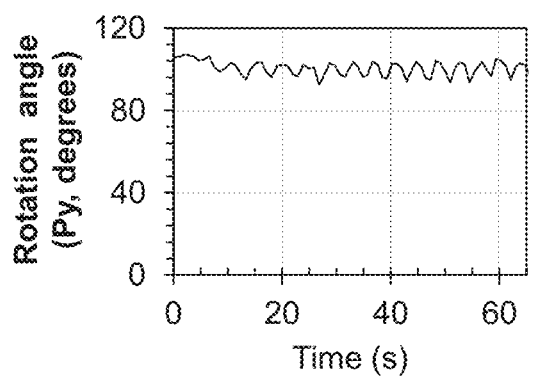
Figure 11K:
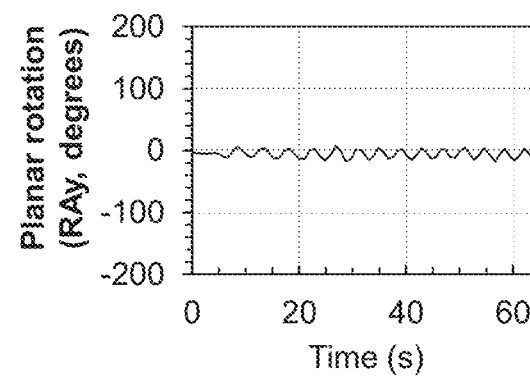
Figure 11I:
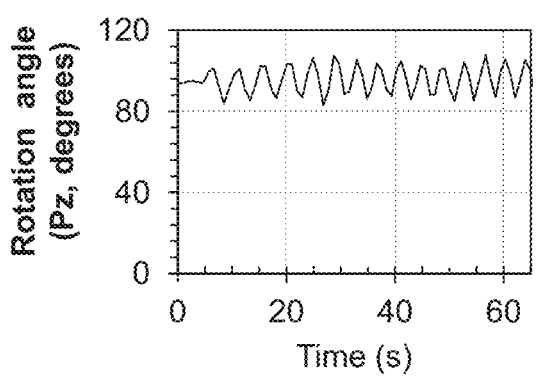
Figure 11L:
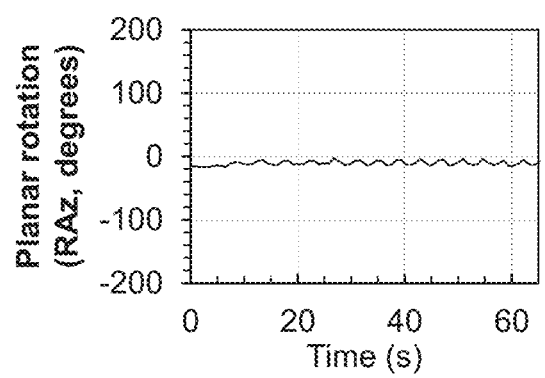

For the waist position, the sensor was attached at the waist to a belt, below the navel as shown in FIG. 4C and an upper torso twist experiment was performed. The results are shown in FIGS. 11A-11L and in Tables 8 and 9. As shown in FIG. 11A, the X-component of the acceleration was found to be ~1 g throughout the experiment, which is expected since, at the waist location, the X axis of the MPU-6050 is oriented parallel to the long axis of the body and perpendicular to the ground, Because of this sensor orientation, as expected, changes to both angular velocity and planar rotation were observed to be significant about the X-axis, but not Y- or Z-axis (FIGS. 11D-11F and 11J-11L).

Taken together, these data demonstrate the ability of the wearable postural sensor to monitor changes to sensor position and rotation in 3-dimensional space.

TABLE 8

Sensor location: Waist
Change in angle between the force vector measured by the accelerometer
and the X-, Y- and Z- axis at successive intervals of 100 ms.
Values in bold correspond to a change in rotation between successive
measurements that is above an absolute threshold value of 8.

| # | ΔPx | ΔPy | ΔPz |
|---|---|---|---|
| 1 | 0.1 | 0.0 | 0.2 |
| 2 | 1.2 | 1.0 | 0.9 |
| 3 | 0.0 | 0.0 | 0.2 |
| 4 | −1.0 | −0.8 | −0.7 |
| 5 | −1.9 | −1.8 | −0.4 |
| 6 | 2.7 | 0.5 | 5.3 |
| 7 | 2.6 | 1.5 | 2.3 |
| 8 | −9.1 | −5.6 | −9.2 |
| 9 | 0.0 | −1.8 | −8.6 |
| 10 | −0.2 | 1.8 | 7.8 |
| 11 | 5.2 | 2.7 | 7.2 |
| 12 | 0.7 | −1.0 | 2.4 |
| 13 | −8.7 | −4.4 | −10.3 |
| 14 | −1.0 | −2.8 | −5.4 |
| 15 | 3.9 | 5.3 | 7.3 |
| 16 | 7.4 | 2.7 | 9.6 |
| 17 | −0.1 | 0.1 | −0.3 |
| 18 | −9.6 | −4.9 | −10.6 |
| 19 | −1.3 | −2.2 | −5.0 |
| 20 | 5.7 | 5.8 | 8.2 |
| 21 | 5.1 | 0.0 | 8.6 |
| 22 | 0.0 | −0.1 | 0.1 |
| 23 | −10.7 | −4.6 | −12.9 |
| 24 | 0.0 | −0.6 | −3.3 |
| 25 | 7.9 | 5.6 | 11.8 |
| 26 | 4.2 | −2.1 | 7.5 |
| 27 | −5.9 | 0.9 | −8.6 |
| 28 | −6.0 | −8.6 | −14.8 |
| 29 | 0.1 | 5.1 | 7.9 |
| 30 | 14.5 | 5.4 | 16.8 |
| 31 | −4.3 | −1.0 | −4.5 |
| 32 | −10.4 | −4.7 | −14.8 |
| 33 | −1.0 | −0.8 | 1.6 |
| 34 | 14.3 | 7.2 | 15.3 |
| 35 | −6.9 | −2.6 | −7.0 |
| 36 | −6.3 | −4.6 | −12.2 |
| 37 | 0.3 | 1.2 | 5.8 |
| 38 | 11.8 | 6.2 | 11.8 |
| 39 | −3.3 | −1.3 | −3.4 |
| 40 | −10.4 | −6.6 | −9.8 |
| 41 | 0.3 | −0.3 | −3.2 |
| 42 | 10.1 | 7.2 | 12.6 |
| 43 | 3.3 | −0.1 | 4.8 |
| 44 | −7.0 | −2.0 | −8.1 |
| 45 | −6.8 | −6.6 | −10.8 |
| 46 | 4.0 | 5.4 | 6.8 |
| 47 | 9.1 | 4.4 | 10.0 |
| 48 | −3.0 | −2.3 | −1.8 |
| 49 | −9.9 | −5.9 | −12.8 |
| 50 | −0.6 | −0.5 | 0.5 |
| 51 | 12.3 | 9.2 | 11.7 |
| 52 | −0.4 | −1.5 | 1.2 |
| 53 | −8.4 | −4.0 | −10.6 |
| 54 | −2.8 | −5.3 | −5.7 |
| 55 | 5.9 | 7.3 | 10.0 |
| 56 | 7.8 | 2.5 | 9.3 |
| 57 | −5.3 | −1.1 | −6.7 |
| 58 | −8.6 | −8.6 | −12.3 |
| 59 | 3.9 | 5.2 | 8.8 |
| 60 | 12.8 | 4.8 | 13.5 |
| 61 | −11.2 | −3.5 | −12.4 |
| 62 | −4.0 | −3.4 | −8.3 |
| 63 | 10.2 | 8.2 | 12.3 |

TABLE 8-continued

Sensor location: Waist
Change in angle between the force vector measured by the accelerometer and the X-, Y- and Z- axis at successive intervals of 100 ms.
Values in bold correspond to a change in rotation between successive measurements that is above an absolute threshold value of 8.

| # | ΔPx | ΔPy | ΔPz |
|---|---|---|---|
| 64 | 3.5 | −1.0 | 6.4 |
| 65 | −6.9 | −2.6 | −7.0 |
|  | −8.4 | −6.4 | −11.7 |

TABLE 9

Sensor location: Waist
Change in sensor rotation between about the X-, Y- and Z- axis at successive intervals of 100 ms. Values in bold correspond to a change in rotation between successive measurements that is above an absolute threshold value of 100.

| # | ΔRAx | ΔRAy | ΔRAz |
|---|---|---|---|
| 1 | 0.0 | −0.2 | 0.7 |
| 2 | −1.0 | −0.9 | 2.0 |
| 3 | 0.0 | −0.2 | 0.8 |
| 4 | 0.8 | 0.7 | −1.4 |
| 5 | 1.8 | 0.5 | 0.3 |
| 6 | −0.6 | −5.5 | 16.6 |
| 7 | −1.6 | −2.5 | 3.4 |
| 8 | 5.9 | 9.6 | −23.3 |
| 9 | 1.8 | 8.7 | 312.2 |
| 10 | −1.7 | −7.9 | −316.3 |
| 11 | −2.8 | −7.4 | 25.3 |
| 12 | 1.0 | −2.5 | 9.0 |
| 13 | 4.6 | 10.5 | −36.4 |
| 14 | 2.7 | 5.4 | 311.9 |
| 15 | −5.3 | −7.4 | −303.0 |
| 16 | −3.0 | −9.8 | 28.3 |
| 17 | −0.1 | 0.3 | −0.9 |
| 18 | 5.2 | 11.0 | −33.0 |
| 19 | 2.2 | 5.0 | 320.0 |
| 20 | −5.8 | −8.4 | −308.2 |
| 21 | −0.3 | −8.8 | 26.7 |
| 22 | 0.1 | −0.1 | 0.4 |
| 23 | 4.9 | 13.2 | −45.6 |
| 24 | 0.6 | 3.4 | 333.0 |
| 25 | −5.7 | −12.1 | −299.6 |
| 26 | 1.8 | −7.5 | 22.1 |
| 27 | −0.5 | 8.7 | −22.8 |
| 28 | 8.7 | 14.9 | 253.7 |
| 29 | −5.1 | −7.9 | −282.7 |
| 30 | −6.1 | −17.2 | 47.4 |
| 31 | 1.4 | 4.7 | −5.8 |
| 32 | 5.0 | 15.1 | 299.0 |
| 33 | 0.8 | −1.6 | 12.7 |
| 34 | −7.7 | −15.8 | −311.1 |
| 35 | 3.0 | 7.3 | −11.3 |
| 36 | 4.8 | 12.3 | 291.0 |
| 37 | −1.1 | −5.9 | −313.7 |
| 38 | −6.6 | −12.2 | 30.7 |
| 39 | 1.5 | 3.6 | −5.4 |
| 40 | 6.8 | 10.0 | −34.7 |
| 41 | 0.3 | 3.2 | 329.1 |
| 42 | −7.4 | −12.9 | −296.0 |
| 43 | −0.1 | −4.9 | 11.2 |
| 44 | 2.4 | 8.3 | −17.2 |
| 45 | 6.7 | 10.9 | 281.4 |
| 46 | −5.4 | −6.9 | −297.8 |
| 47 | −4.8 | −10.4 | 26.8 |
| 48 | 2.5 | 2.0 | 0.8 |
| 49 | 6.1 | 13.1 | 296.7 |
| 50 | 0.5 | −0.5 | 3.2 |
| 51 | −9.4 | −12.0 | −307.5 |
| 52 | 1.5 | −1.2 | 6.2 |
| 53 | 4.3 | 10.8 | −36.3 |
| 54 | 5.3 | 5.8 | 299.5 |
| 55 | −7.3 | −10.1 | −279.5 |
| 56 | −2.9 | −9.6 | 21.7 |
| 57 | 1.4 | 6.9 | −15.0 |
| 58 | 8.7 | 12.5 | 275.9 |
| 59 | −5.2 | −8.9 | −282.7 |
| 60 | −5.4 | −13.9 | 26.8 |
| 61 | 4.2 | 12.9 | −24.8 |
| 62 | 3.4 | 8.4 | 308.0 |
| 63 | −8.4 | −12.6 | −303.6 |
| 64 | 0.6 | −6.5 | 16.2 |
| 65 | 3.0 | 7.4 | −11.2 |

EXAMPLE 4

A. Monitoring Changes to Rotation Angle and Planar Rotation of the Sensor During Fall Simulation.

A fall simulation study was designed. The sensor was strapped to either the wrist, leg or waist and switched on. After communication with the smart device display (Amazon Fire tablet) is established, a threshold value between 20° and 50° is inputted and the user instructed to walk at a normal pace and walk with a staggered (stumbling/wobbling without falling) gait on cue to simulate a loss in balance. Real time changes to rotation angle and planar rotation (the spatiotemporal parameters) were computed during this activity and recorded on the Amazon Fire tablet. Data was analyzed on a computer using Microsoft Excel software by comparing against the selected threshold value.

Figure 12A:
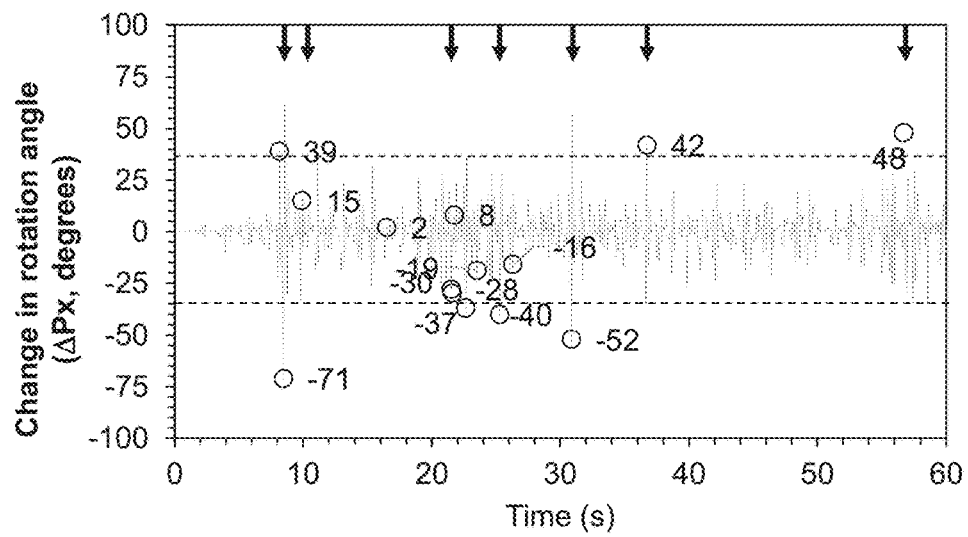
FIGS. 12A-12C show profiles for a change in rotation angle for the postural sensor attached to the waist of a subject during a simulated loss of balance experiment.
Figure 12B:
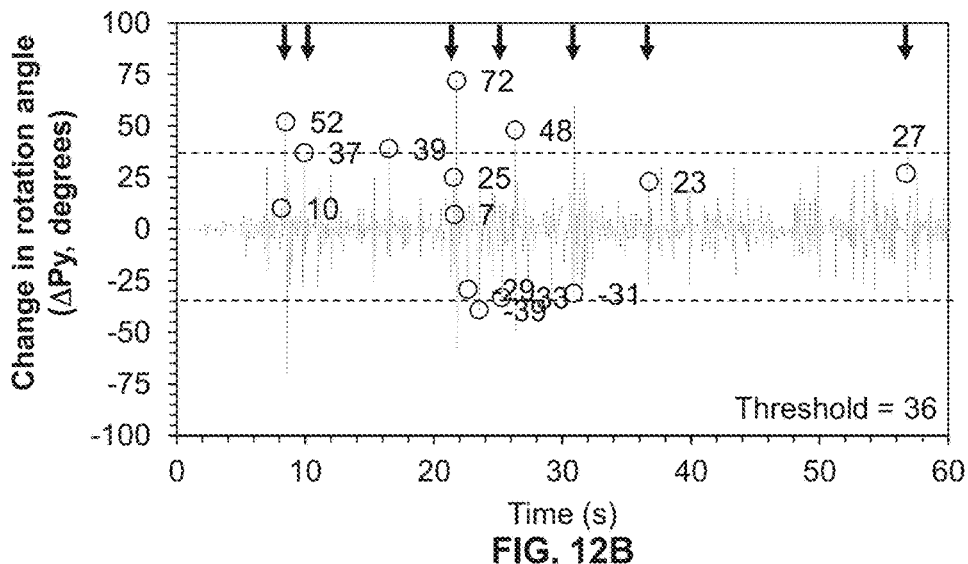
Figure 12C:
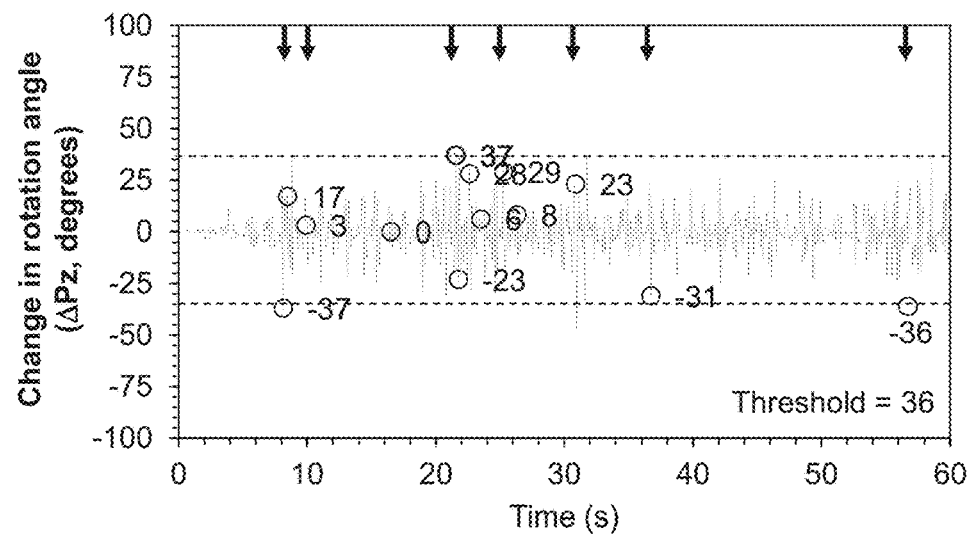

Method 1, Monitoring a Change Between Measurements:

For the sensor attached to the waist, FIGS. 12A-12C show representative profiles for the difference (ΔP) between the most recent rotation angle calculated and a prior value for rotation angle when the prior calculated difference (ΔP) did not exceed the threshold value. The open circles in the graphs show data points from the profile when a staggered gait (arrows) was detected (ΔP is >36° or <−36°) for the X-, Y- or Z-axis.

Figure 13A:
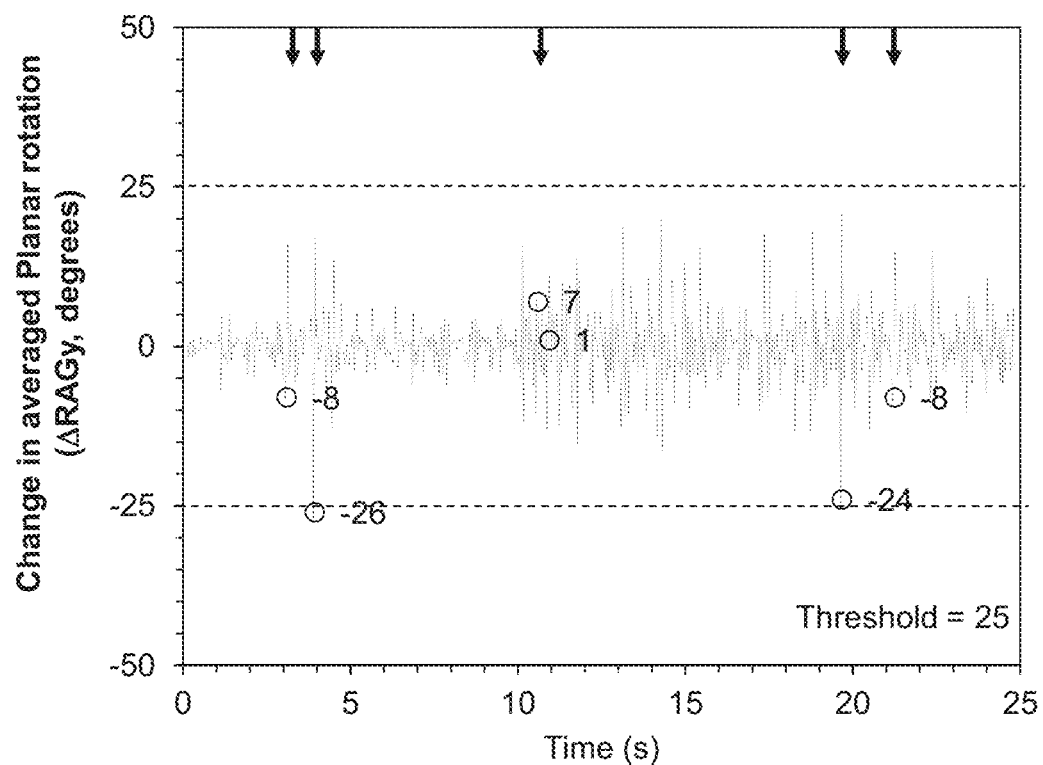
FIGS. 13A and 13B show profiles for a change in planar rotation of the postural sensor attached to the waist of a subject during a simulated loss of balance experiment.
Figure 13B:
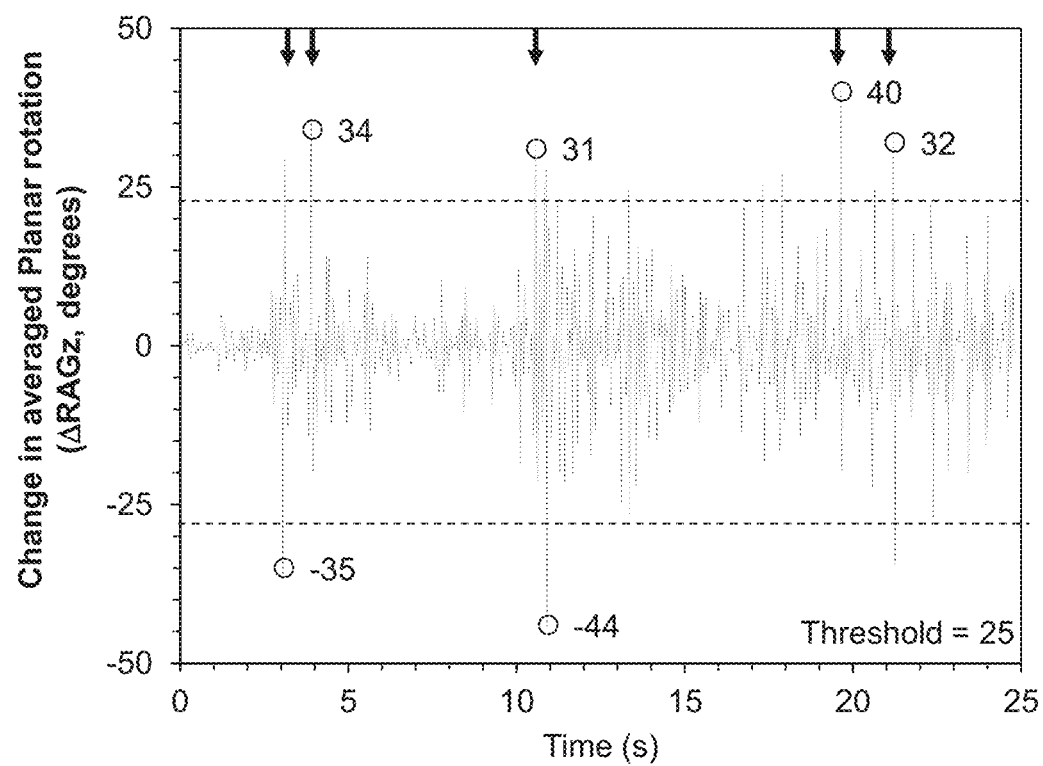

Similarly, for the sensor attached to the waist, FIGS. 13A and 13B are representative profiles for the difference (ΔRAG) between the most recent averaged planar rotation calculated and a prior value for averaged planar rotation when the prior calculated difference (ΔRAG) did not exceed the threshold value (see flowcharts in FIGS. 7C and 7D). The open circles in the graphs show data points from the profile when a staggered gait (arrows) was detected (ΔRAG is >28° or <−28°) for the Y- or Z-axis. Planar rotation about the X axis was not monitored because, when secured to the waist, the X-axis of the sensor is perpendicular to the ground, which leads to large changes in planar rotation about the X axis as a user walks, thereby making accurate detection difficult.

Method 2. Monitoring a Change Between Successive Time Intervals:

As seen from Tables 10, 11 and 12 for the sensor secured to the wrist, lower leg and waist respectively, a change exceeding the selected threshold value was observed during a loss of balance but not during normal walking for rotation angles (at least one of ΔPx, ΔPy and ΔPz) and planar rotations—computed from acceleration data (at least one of ΔRAx, ΔRay and ΔRaz) and angular velocity data (at least one of ΔRGx, ΔRGy and ΔRGz). These data demonstrate that the instructions in the algorithm allows correlating a monitored change in a spatiotemporal parameter with a loss in balance ("LOB") when the change exceeds the threshold value.

TABLE 10

Sensor location: Wrist
Change in rotation angle and planar rotation between successive time intervals of 100 ms.
Values in bold correspond to a change that is above an absolute threshold value of 20.

| | Rotation Angle | | | Planar Rotation | | | | | | |
|---|---|---|---|---|---|---|---|---|---|---|
| | Accelerometer | | | | Accelerometer | | | | Gyroscope | |
| | ΔPx | ΔPy | ΔPz | | ΔRAx | ΔRAy | ΔRAz | | ΔRGx | ΔRGy | ΔRGz |
| Walk | −1.4 | 2.1 | −1.4 | Walk | −9.5 | −1.4 | 2.1 | Walk | −6.1 | 1.0 | −3.5 |
| Walk | −2.0 | 1.7 | 0.9 | Walk | 1.3 | 1.0 | 1.8 | Walk | −1.8 | 0.1 | −2.8 |
| Walk | −0.1 | 0.3 | −0.6 | Walk | −2.5 | −0.6 | 0.3 | Walk | −0.3 | 0.2 | 0.6 |
| Walk | 1.2 | −1.0 | −0.7 | Walk | −1.4 | −0.7 | −1.0 | Walk | −0.9 | −0.6 | 0.0 |
| Walk | −0.5 | 0.7 | −0.6 | Walk | −2.9 | −0.6 | 0.7 | Walk | −1.2 | 0.6 | −0.6 |
| Walk | 0.1 | −0.2 | 0.4 | Walk | 1.8 | 0.4 | −0.2 | Walk | −1.1 | −0.4 | 1.6 |
| LOB | 2.1 | −2.4 | 0.5 | LOB | 5.1 | 0.5 | −2.4 | LOB | −1.9 | 1.8 | 5.2 |
| LOB | −2.3 | −14.4 | 10.4 | LOB | 80.0 | 10.3 | 345.5 | LOB | −8.9 | 10.5 | 19.1 |
| LOB | 0.9 | −11.3 | −15.7 | LOB | 84.3 | 344.2 | −11.3 | LOB | 2.1 | −46.8 | 33.6 |
| LOB | −54.1 | −34.3 | −32.4 | LOB | 32.1 | −54.9 | −49.5 | LOB | −12.8 | −15.1 | 17.0 |
| LOB | 17.9 | −1.4 | 28.0 | LOB | −29.3 | 47.4 | 13.4 | LOB | 15.1 | 14.7 | 25.9 |
| Walk | 1.7 | −0.6 | 2.0 | Walk | −1.3 | 2.1 | 0.7 | Walk | −2.1 | −0.2 | −0.4 |
| Walk | 8.1 | 6.1 | 3.6 | Walk | 5.0 | 7.2 | 12.3 | 59 | −12.1 | 11.7 | −7.0 |
| Walk | 16.3 | 6.7 | 13.2 | Walk | 3.2 | 15.5 | 12.7 | 60 | −10.8 | 18.2 | 12.2 |

TABLE 11

Sensor location: Lower leg
Change in rotation angle and planar rotation between successive time intervals of 100 ms.
Values in bold correspond to a change that is above an absolute threshold value of 30.

| | Rotation Angle | | | Planar Rotation | | | | | | |
|---|---|---|---|---|---|---|---|---|---|---|
| | Accelerometer | | | | Accelerometer | | | | Gyroscope | |
| | ΔPx | ΔPy | ΔPz | | ΔRAx | ΔRAy | ΔRAz | | ΔRGx | ΔRGy | ΔRGz |
| Walk | −0.5 | −5.4 | 6.3 | Walk | 6.3 | 8.9 | 0.2 | Walk | 22.0 | −27.0 | −15.8 |
| Walk | 6.1 | −6.3 | 3.5 | Walk | 4.2 | −8.4 | −7.0 | Walk | 1.9 | 8.3 | −6.5 |
| Walk | −11.6 | 16.5 | −12.3 | Walk | −13.2 | 16.3 | 13.2 | Walk | 0.7 | −13.9 | 14.4 |
| Walk | 11.2 | −17.0 | 13.1 | Walk | 14.0 | −14.9 | −12.8 | Walk | 10.1 | 16.0 | −18.6 |
| Walk | −10.5 | 14.6 | −10.8 | Walk | −11.7 | 14.6 | 12.1 | Walk | −9.6 | −10.3 | 29.2 |
| Walk | 9.4 | −15.1 | 12.0 | Walk | 12.8 | −11.8 | −11.0 | Walk | 17.4 | 3.0 | −26.2 |
| Walk | −9.7 | 19.4 | −16.4 | Walk | −17.2 | 7.7 | 11.4 | Walk | −11.0 | −6.3 | 24.1 |
| Walk | 11.2 | −20.6 | 16.8 | Walk | 17.9 | −9.9 | −13.2 | Walk | 17.7 | 19.9 | −12.4 |
| LOB | −6.2 | 13.8 | −11.7 | LOB | −12.6 | 0.2 | 7.9 | LOB | −20.5 | −1.1 | 48.2 |
| LOB | 47.7 | −72.4 | 17.2 | LOB | 75.4 | −27.7 | 278.0 | LOB | −57.8 | −11.2 | 40.1 |
| Walk | 0.7 | −11.9 | −4.0 | Walk | 22.7 | −3.1 | −13.7 | Walk | 19.2 | 7.6 | 3.1 |
| Walk | −1.7 | 2.2 | 2.8 | Walk | −5.2 | 2.6 | 2.2 | Walk | −4.1 | 3.5 | 0.0 |
| Walk | −8.4 | −1.2 | 8.1 | Walk | −1.5 | 8.5 | −3.0 | Walk | −6.8 | 6.8 | −6.8 |
| Walk | 3.5 | 3.4 | −2.3 | Walk | −4.2 | −2.9 | 4.9 | Walk | −2.4 | −4.1 | −2.2 |

TABLE 12

Sensor location: Waist
Change in rotation angle and planar rotation between successive time intervals of 100 ms.
Values in bold correspond to a change that is above an absolute threshold value of 20.

| | Rotation Angle | | | Planar Rotation | | | | | | |
|---|---|---|---|---|---|---|---|---|---|---|
| | Accelerometer | | | | Accelerometer | | | | Gyroscope | |
| | ΔPx | ΔPy | ΔPz | | ΔRAx | ΔRAy | ΔRAz | | ΔRGx | ΔRGy | ΔRGz |
| Walk | 3.2 | −6.1 | −5.8 | Walk | 10.5 | −4.9 | −6.7 | Walk | −1.4 | −4.2 | 2.8 |
| Walk | −4.0 | 5.4 | 6.4 | Walk | −9.7 | 5.6 | 5.6 | Walk | −2.3 | 4.6 | −1.6 |
| Walk | −0.2 | −2.8 | −0.8 | Walk | 4.0 | −0.3 | −3.7 | Walk | −0.9 | −0.7 | 2.9 |
| Walk | 1.2 | −2.0 | −2.1 | Walk | 3.4 | −1.8 | −2.2 | Walk | 8.4 | −3.3 | 5.2 |
| Walk | −4.0 | 4.2 | 5.8 | Walk | −7.3 | 5.2 | 4.3 | Walk | −0.4 | 4.3 | −0.8 |
| LOB1 | −0.1 | 0.3 | 0.2 | LOB1 | −0.4 | 0.1 | 0.4 | LOB1 | 2.6 | 1.3 | −3.9 |
| LOB1 | −10.0 | −6.9 | 6.6 | LOB1 | 6.5 | 9.2 | −14.1 | LOB1 | −28.8 | 6.6 | −16.4 |
| LOB1 | −8.1 | −10.4 | −0.5 | LOB1 | 10.1 | 6.5 | −19.9 | LOB1 | −28.4 | 53.4 | 16.8 |
| LOB1 | −35.2 | −22.1 | −13.8 | LOB1 | 20.6 | 44.5 | −56.1 | LOB1 | −25.8 | 16.0 | −18.5 |
| LOB1 | 12.3 | −28.0 | −25.9 | LOB1 | 26.8 | −22.1 | 15.5 | LOB1 | 7.6 | −10.2 | 23.1 |
| LOB1 | −24.7 | 38.6 | 29.4 | LOB1 | −34.4 | 35.6 | −33.7 | LOB1 | 5.6 | −17.5 | 4.3 |

TABLE 12-continued

Sensor location: Waist
Change in rotation angle and planar rotation between successive time intervals of 100 ms.
Values in bold correspond to a change that is above an absolute threshold value of 20.

| | Rotation Angle | | | Planar Rotation | | | | | | |
|---|---|---|---|---|---|---|---|---|---|---|
| | Accelerometer | | | | Accelerometer | | | | Gyroscope | |
| | ΔPx | ΔPy | ΔPz | | ΔRAx | ΔRAy | ΔRAz | | ΔRGx | ΔRGy | ΔRGz |
| Walk | −2.1 | 6.6 | 4.5 | Walk | −10.6 | 3.6 | 7.9 | Walk | −4.8 | 8.5 | −6.0 |
| Walk | −1.5 | −8.2 | −1.6 | Walk | 11.5 | −0.2 | −10.8 | Walk | −1.7 | −3.4 | 3.2 |
| Walk | −2.8 | 2.1 | 3.8 | Walk | −4.0 | 3.5 | 1.7 | Walk | −1.1 | 1.8 | 1.1 |
| Walk | 1.0 | −0.3 | −1.1 | Walk | 0.8 | −1.1 | −0.1 | Walk | −3.8 | −1.1 | −1.4 |
| Walk | 3.3 | −1.6 | −4.1 | Walk | 3.5 | −4.0 | −0.9 | Walk | −1.2 | −3.4 | 4.3 |
| LOB2 | −1.7 | −7.4 | −1.8 | LOB2 | 9.8 | 0.0 | −10.0 | LOB2 | −18.8 | 0.3 | −9.8 |
| LOB2 | 2.2 | 7.2 | 1.2 | LOB2 | −9.4 | −0.5 | 9.8 | LOB2 | −14.2 | 7.2 | −12.3 |
| LOB2 | −9.6 | 0.6 | 9.7 | LOB2 | −2.6 | 9.9 | −2.3 | LOB2 | −5.9 | 20.3 | −3.2 |
| LOB2 | −23.3 | −5.0 | 17.3 | LOB2 | 3.1 | 23.5 | −36.5 | LOB2 | 1.2 | 31.4 | 8.7 |
| LOB2 | −25.0 | 11.9 | 4.4 | LOB2 | −12.1 | 25.4 | −113.5 | LOB2 | −3.1 | 4.9 | 13.6 |
| LOB2 | −7.5 | −3.2 | −8.2 | LOB2 | 3.6 | 7.6 | 4.0 | LOB2 | −2.4 | 12.2 | 3.0 |
| Walk | 2.1 | 2.3 | −1.4 | Walk | −2.9 | −1.8 | −7.7 | Walk | 2.0 | 2.7 | 0.5 |
| Walk | −1.0 | −5.9 | −1.3 | Walk | 8.5 | −0.3 | 6.3 | Walk | 4.7 | −8.8 | 9.0 |
| Walk | −1.8 | 5.3 | 3.9 | Walk | −8.3 | 3.1 | −8.0 | Walk | 5.3 | 0.4 | 2.5 |
| Walk | 2.8 | −7.0 | −5.8 | Walk | 11.3 | −4.6 | 10.8 | Walk | 2.3 | 0.0 | 2.7 |
| Walk | −2.1 | 9.0 | 5.7 | Walk | −14.0 | 4.2 | −2.4 | Walk | 9.1 | 2.2 | 3.4 |
| LOB3 | −10.2 | −0.7 | 10.1 | LOB3 | 0.5 | 10.2 | −339.0 | LOB3 | −4.8 | 19.2 | −4.2 |
| LOB3 | 6.3 | 12.2 | −7.7 | LOB3 | −14.9 | −6.8 | 15.7 | LOB3 | 32.6 | −2.1 | 15.4 |
| LOB3 | 11.4 | 17.1 | −21.8 | LOB3 | −29.7 | −18.8 | −15.7 | LOB3 | 36.2 | −29.9 | 24.4 |
| LOB3 | 23.7 | −11.4 | −41.1 | LOB3 | 275.5 | 314.5 | 339.7 | LOB3 | 9.6 | −12.8 | 16.0 |
| LOB3 | 9.9 | −20.0 | 3.7 | LOB3 | −89.9 | 4.1 | −0.5 | Walk | 6.2 | 3.1 | 4.7 |
| LOB3 | 2.7 | −0.5 | 4.8 | LOB3 | −33.0 | 4.9 | 2.9 | Walk | −1.9 | 0.6 | 0.1 |
| Walk | −1.6 | 2.4 | 2.4 | Walk | −3.8 | 2.1 | −3.3 | Walk | −3.3 | 2.7 | −4.4 |
| Walk | −0.9 | −2.3 | 0.1 | Walk | 3.0 | 0.5 | 6.3 | Walk | 3.4 | −0.4 | 6.0 |
| Walk | −1.2 | 4.7 | 2.5 | Walk | −6.6 | 1.8 | −4.2 | Walk | 4.3 | −3.6 | 2.1 |
| Walk | 5.4 | −3.8 | −6.4 | Walk | 6.4 | −6.0 | 2.1 | Walk | 2.4 | −3.4 | −1.3 |
| Walk | −0.7 | 1.7 | 1.2 | Walk | −2.7 | 1.0 | 9.8 | Walk | −3.0 | 1.8 | 2.6 |
| LOB4 | 2.0 | 7.2 | −0.9 | LOB4 | −10.4 | −1.4 | −7.0 | LOB4 | −1.2 | 0.6 | −5.7 |
| LOB4 | −1.0 | −5.2 | 0.4 | LOB4 | 7.6 | 0.7 | −346.6 | LOB4 | 0.2 | 3.5 | −3.6 |
| LOB4 | −2.5 | 9.8 | 2.9 | LOB4 | −14.2 | 2.7 | −0.3 | LOB4 | −0.1 | 0.2 | −8.9 |
| LOB4 | 4.8 | 0.1 | −4.8 | LOB4 | −0.6 | −4.8 | 25.0 | LOB4 | 3.7 | −11.0 | −1.7 |
| LOB4 | −5.1 | 20.1 | −4.2 | LOB4 | −28.7 | −0.3 | 0.3 | LOB4 | 14.2 | 9.0 | −0.7 |
| Walk | −1.4 | 0.5 | 1.6 | Walk | −1.2 | 1.6 | −2.1 | Walk | 3.2 | −1.3 | −3.9 |
| Walk | 5.1 | −2.8 | −6.5 | Walk | 6.4 | −6.2 | 6.9 | Walk | −2.5 | −4.6 | 4.0 |
| Walk | −2.8 | 6.2 | 5.3 | Walk | −10.8 | 4.5 | −1.4 | Walk | −5.9 | 4.5 | −6.2 |
| Walk | −0.5 | −1.0 | 0.2 | Walk | 1.4 | 0.3 | 5.6 | Walk | −1.6 | 0.8 | −1.4 |

EXAMPLE 5

Monitoring Changes in Sway Velocity During Fall Simulation

A fall simulation study was designed. The sensor was strapped to waist and switched on. After communication with the display (Amazon Fire tablet) is established, a threshold value between 100 cm/s and 500 cm/s is inputted. The user is instructed to walk at a normal gait on a hard surface and simulate a staggered gait (without falling) on cue. Sway velocities and mean sway velocities were calculated using equations (23)-(29) as discussed above and recorded on the Amazon Fire tablet. Data was analyzed on a computer using Microsoft Excel software by comparing against the selected threshold value.

Figure 14A:
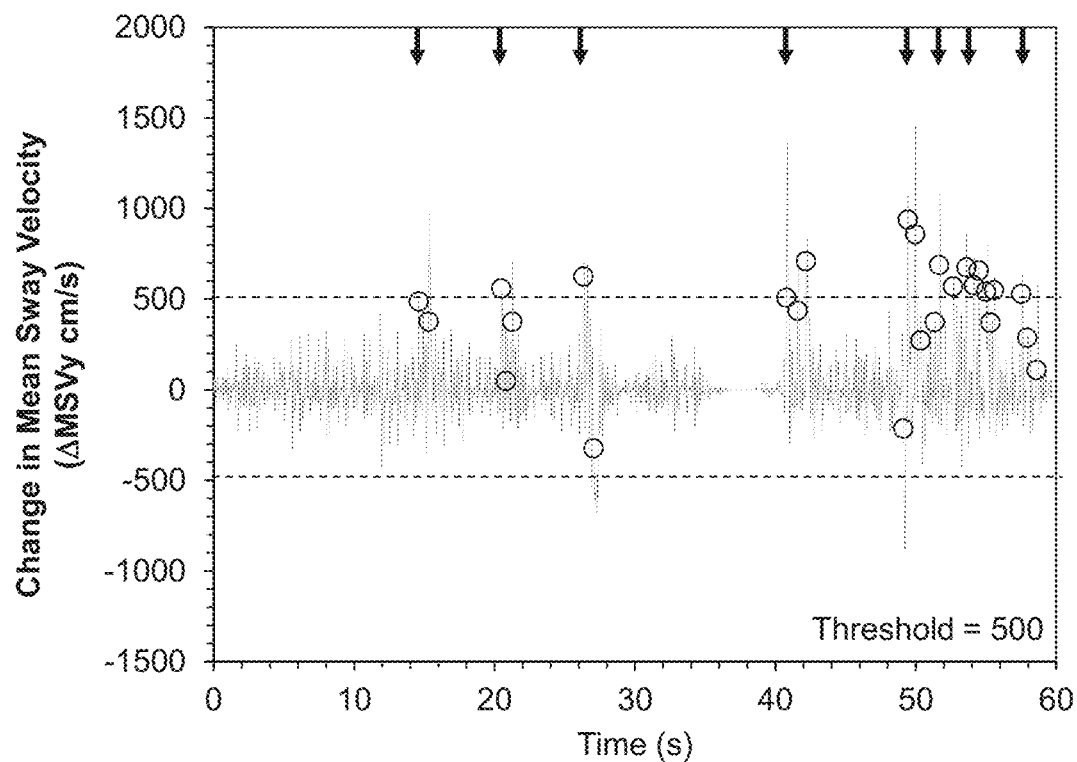
FIGS. 14A and 14B shows profiles for a change in mean sway velocity of the postural sensor when attached to the waist of a subject during a simulated loss of balance experiment.
Figure 14B:
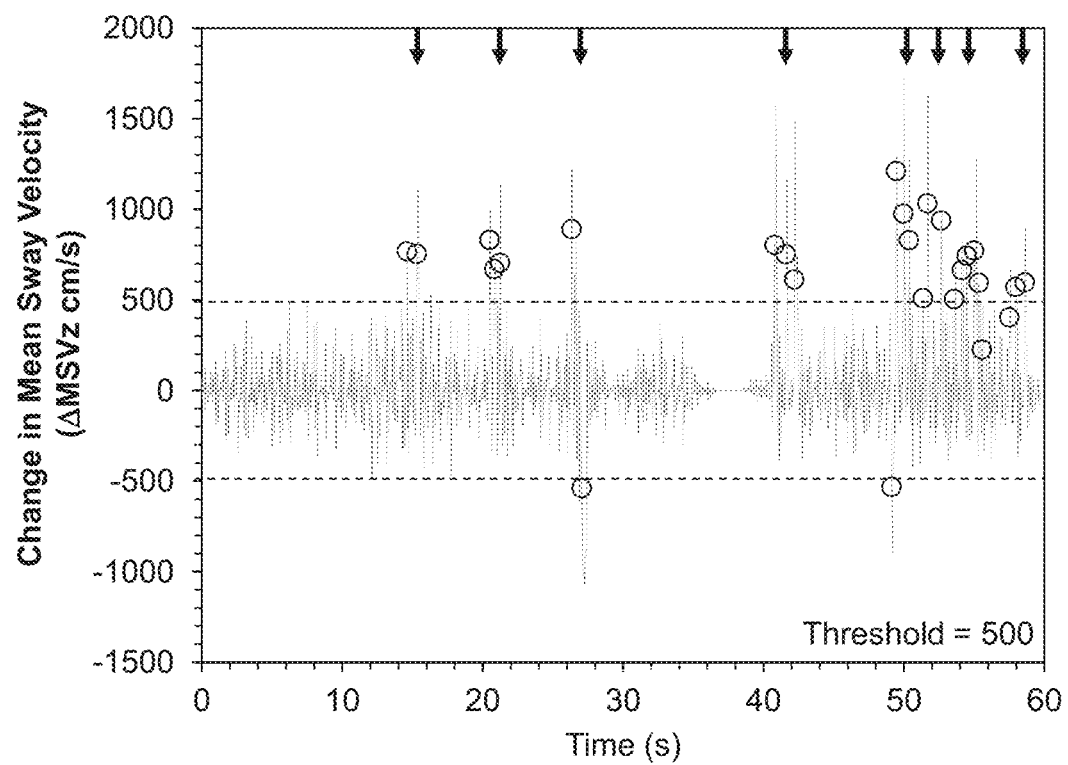

Method 1. Monitoring a Change Between Measurements:

FIGS. 14A and 14B are representative profiles for the difference between the most recent mean sway velocity calculated and a prior value for mean sway velocity when the prior calculated difference did not exceed the threshold value. The open circles in the graphs show data points from the profile when a staggered gait (arrows) was detected (ΔMSV is >500 cm/s or <−500 cm/s) by the postural sensor for the Z-axis (anteroposterior sway) or Y-axis (mediolateral sway).

Figure 15A:
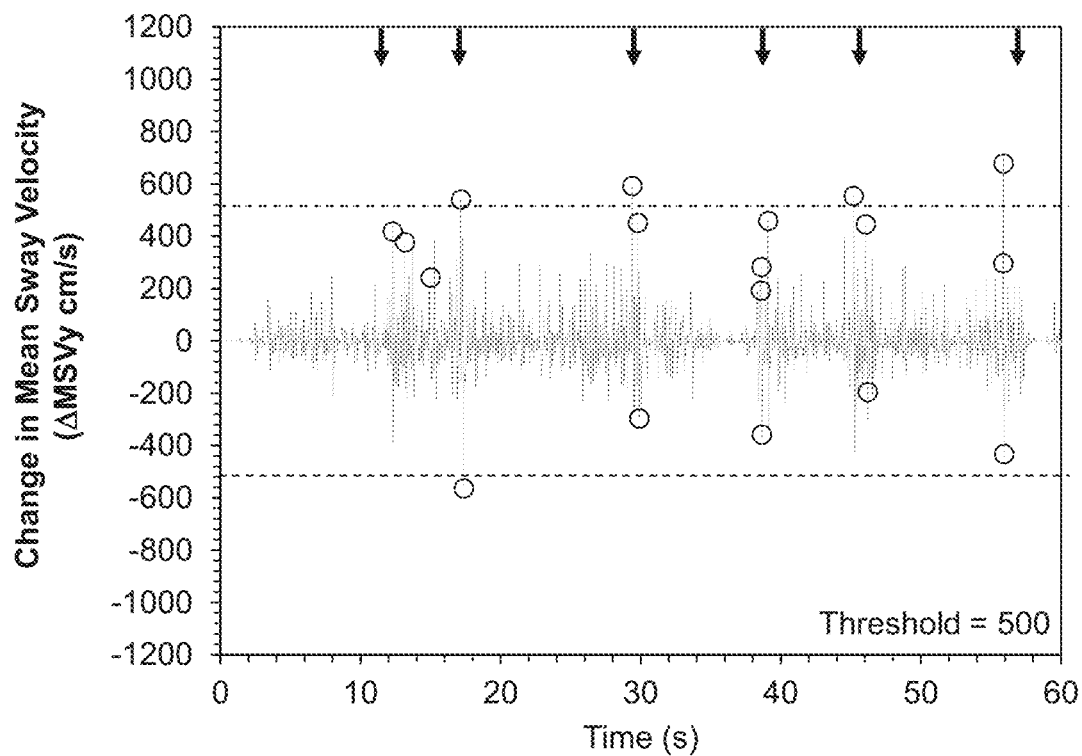
FIGS. 15A and 15B shows profiles for a change in mean sway velocity of the postural sensor when attached to the waist of a subject during a simulated loss of balance experiment.
Figure 15B:
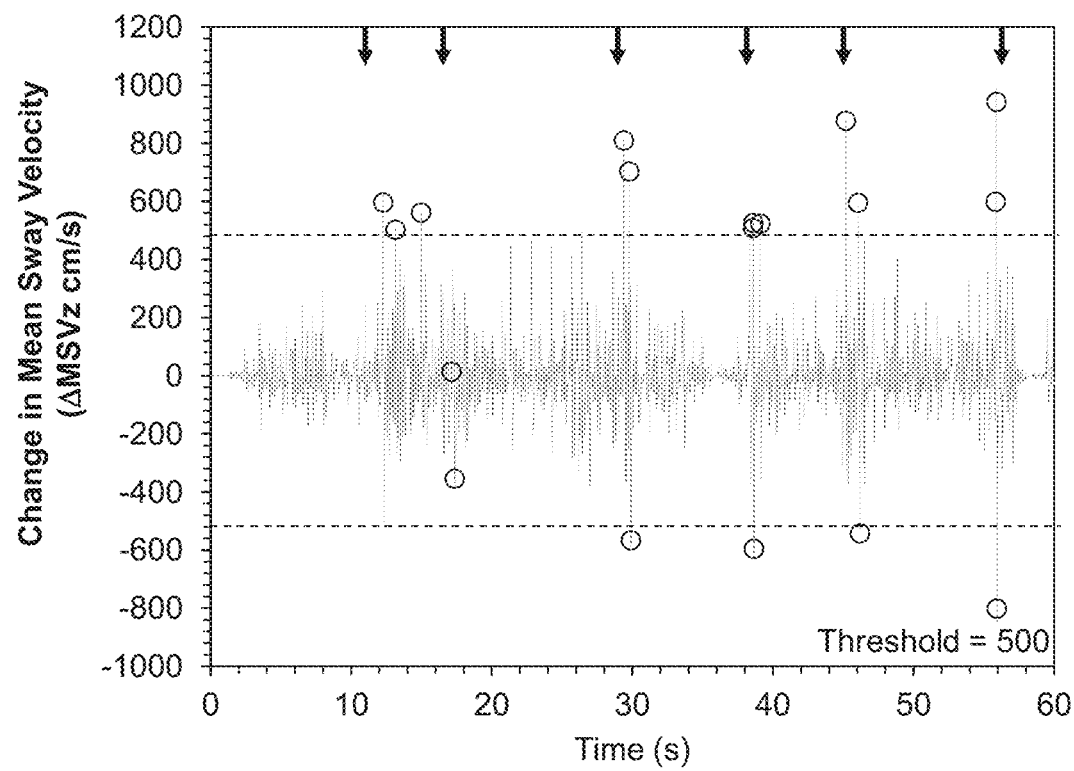

Method 2. Monitoring a Change in Sway Velocity Between Successive Time Intervals:

FIGS. 15A and 15B are representative profiles for the difference between two successive calculations of mean sway velocity made at successive time intervals. The open circles in the graphs show data points from the profile when a staggered gait (arrows) was detected (ΔMSV is >500 cm/s or <−500 cm/s) by the postural sensor for the Z-axis (anteroposterior sway) or Y-axis (mediolateral sway).

What is claimed is:

1. A portable sensor for alerting a user about a loss of balance consisting of:
  a sensor securable on the user's body, said sensor consisting of:
    a detection module consisting of a micro-electromechanical triple-axis accelerometer and a micro-electromechanical triple-axis gyroscope;
    a microcontroller board in electrical communication with the detection module, said microcontroller board consisting of:
      a microcontroller;
      at least one wireless communication module;
      at least one non-volatile memory;
      at least one volatile memory; and
      a library of algorithms with microcontroller-executable instructions for detecting the loss of balance and for alerting the user about the loss of balance tangibly stored in the non-volatile memory;

at least one of, an auditory alerting signal module, a visual alerting signal module, and a vibrotactile alerting signal module in electrical communication with the microcontroller board;

a power source in electrical communication with the microcontroller board; and an enclosure disposed around the sensor.

2. The portable sensor of claim 1, wherein the microcontroller board is in wireless communication with a smart device display.

3. The portable sensor of claim 1, wherein the microcontroller board is in operable communication with at least one personal safety device disposed outside the enclosure.

4. The portable sensor of claim 3, wherein the personal safety device is a wearable airbag or a brace.

5. The portable sensor of claim 1, wherein the auditory alerting signal module is a piezoelectric alarm.

6. The portable sensor of claim 1, wherein the micro-electromechanical triple-axis accelerometer and the micro-electromechanical triple-axis gyroscope are integrated on a single circuit board.

7. The portable sensor of claim 1, wherein the wireless communication module is an embedded chip for wireless communication over a BLUETOOTH™ network, or a WI-FI network, or a mobile communication network, or a combination thereof.

8. The portable sensor of claim 1, wherein the wireless communication module is an integrated BLUETOOTH™ and WI-FI combination chip.

9. A wearable postural sensor system for protecting a user from a fall-related injury, said wearable postural sensor system consisting of:

a microcontroller board consisting of a microcontroller, at least one non-volatile memory, at least one volatile memory, and a library of algorithms with microcontroller-executable instructions for detecting a fall and for protecting a user from a fall-related injury, tangibly stored in the non-volatile memory;

an integrated motion processing module consisting of a micro-electromechanical triple-axis accelerometer and a micro-electromechanical triple-axis gyroscope in electrical communication with the microcontroller board;

a wireless communication module in electrical communication with the microcontroller board;

at least one alerting signal module in electrical communication with the microcontroller board;

a power source;

an enclosure disposed around the microcontroller board, the integrated motion processing module, the wireless communication module and the power source, said enclosure provided with fasteners disposed on an outer surface to removably secure the portable sensor on the user's body; and at least one personal safety device disposed outside the enclosure and in operable communication with the microcontroller board.

10. The wearable postural sensor system of claim 9, wherein the microcontroller board is in wireless communication with a smart device display.

11. The wearable postural sensor system of claim 9, wherein the personal safety device is a wearable airbag or a brace.

12. The wearable postural sensor system of claim 9, wherein the at least one alerting signal module is at least one of, an auditory alerting signal module, a visual alerting signal module, and a vibrotactile alerting signal module.

13. The wearable postural sensor system of claim 9, wherein the wireless communication module is an embedded chip for wireless communication over a BLUETOOTH™ network, a WI-FI network, a mobile communication network, or a combination thereof.

14. A method for preventing a fall and a fall-related injury comprising the steps of:

a) removably securing the wearable postural sensor system of claim 13 to a user;

b) switching on the power source;

c) selecting a threshold value for detecting a change in a spatio-temporal parameter for the sensor;

d) calculating a change in the spatio-temporal parameter for the sensor;

e) actuating one or more of the at least one alerting signal modules when the change in the spatio-temporal parameter for the sensor is greater than the threshold value, thereby alerting the user, thereby preventing the fall and the fall-related injury; and f) repeating steps (d) and (e).

15. The method of claim 14, further comprising, simultaneously actuating in step (e), at least one personal safety device that protects the user from the fall-related injury.

16. The method of claim 15, wherein the personal safety device is a wearable airbag or a brace.

17. The method of claim 14, wherein selecting a threshold value comprises prompting the user on a smart device display for:

inputting a threshold value; or retrieving a threshold value from the non-volatile memory; or calculating a threshold value from a baseline calibration, thereby selecting the threshold value.

18. The method of claim 17, said baseline calibration comprising:

instructing the user to walk on a substantially flat surface; and calculating an average value for the change in the spatio-temporal parameter for the sensor.

19. The method of claim 18, wherein calculating the average value for the change in the spatio-temporal parameter is performed for a time period from about 20 seconds to about 300 seconds.

20. The method of claim 14, wherein the change in the spatio-temporal parameter is a change in rotation angle between a resultant acceleration vector and a X-axis component, a Y-axis component and a Z-axis component of the resultant acceleration vector.

21. The method of claim 14, wherein the change in the spatio-temporal parameter is a change in planar rotation of the sensor about each a X-axis, a Y-axis and a Z-axis.

22. The method of claim 14, wherein the change in the spatio-temporal parameter is a change in linear sway velocity of the sensor along a X-axis, a Y-axis and a Z-axis.

* * * * *